United States Patent [19]
Wada et al.

[11] Patent Number: 5,751,429
[45] Date of Patent: May 12, 1998

[54] COLOR CLASSIFICATION SYSTEM AND METHOD CAPABLE OF AUTOMATICALLY EXCHANGING OPTICAL BAND-PASS FILTERS ACCORDING TO THE OBJECT

[75] Inventors: Tohru Wada, Niiza; Yasushi Hibi, Kokubunji, both of Japan

[73] Assignee: Olympus Optical Co., Ltd., Tokyo, Japan

[21] Appl. No.: 701,123

[22] Filed: Aug. 21, 1996

[30] Foreign Application Priority Data

Aug. 29, 1995  [JP]  Japan ................... 7-220525

[51] Int. Cl.$^6$ .................................. G01N 21/25
[52] U.S. Cl. ................ 356/419; 356/416; 356/417; 348/266
[58] Field of Search .................. 348/370, 371, 348/373, 266; 356/416, 417, 419

[56] References Cited

U.S. PATENT DOCUMENTS

| | | | |
|---|---|---|---|
| 4,859,063 | 8/1989 | Fay et al. | 356/418 |
| 5,221,959 | 6/1993 | Ohyama et al. | |
| 5,422,730 | 6/1995 | Barlow et al. | 356/417 |
| 5,627,648 | 5/1997 | Garrett | 356/416 |

OTHER PUBLICATIONS

Q. Tian et al; Image classification by the Foley-Sammon transform; Jul. 1986; pp. 834–840; Optical Engineering, vol. 25, No. 7.

*Primary Examiner*—Frank G. Font
*Assistant Examiner*—Zandra V. Smith
*Attorney, Agent, or Firm*—Frishauf, Holtz, Goodman, Langer & Chick

[57] ABSTRACT

A color classification system and method for classifying, judging and/or identifying objects by color. An optical system utilizes light from an object to form an image on an imaging device. A plurality of optical band-pass filters each having a different pass band are provided between the object and the imaging device. The optical band-pass filters include a plurality of measurement filters for use in measuring a color of the object and a test filter for use in judging which one of the measurement filters should be applied to the object. A changeover section changes between the optical band-pass filters. A computing circuit performs at least one of a color classification and a color judgment based on a spectral characteristic of the imaged object through a statistical approach, and a control section causes the changeover section to select an effective one of the measurement filters based on a judgment by the computing circuit of a result sensed by the test filter. The plurality of optical band-pass filters are arranged in a plurality of filter sets each of which has at least one filter, and the changeover section includes a filter changeover mechanism for changing between the optical band-pass filters in one of the filter sets, and a filter-set changeover mechanism for changing between the plurality of filter sets.

19 Claims, 33 Drawing Sheets

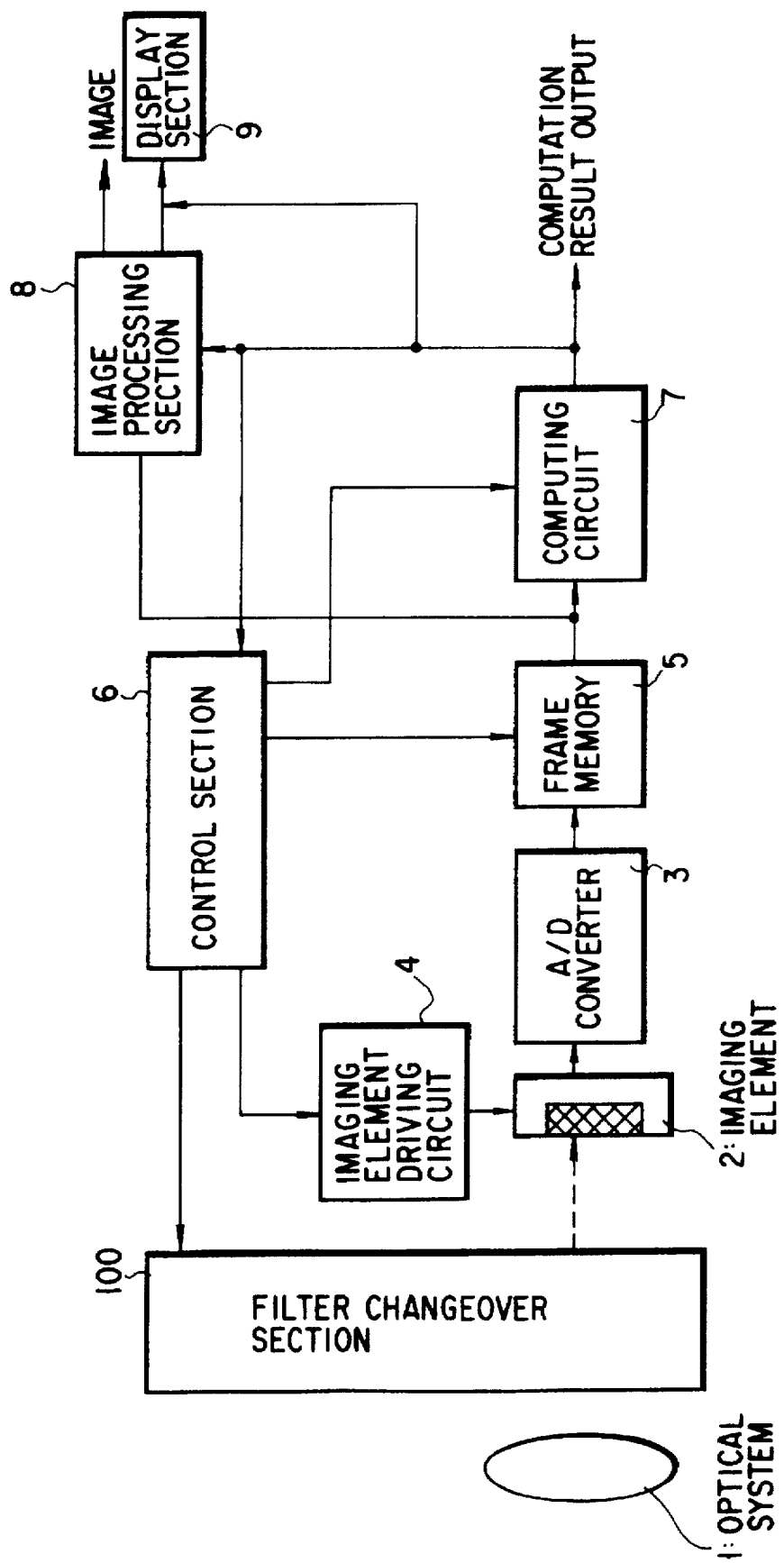
F I G. 1

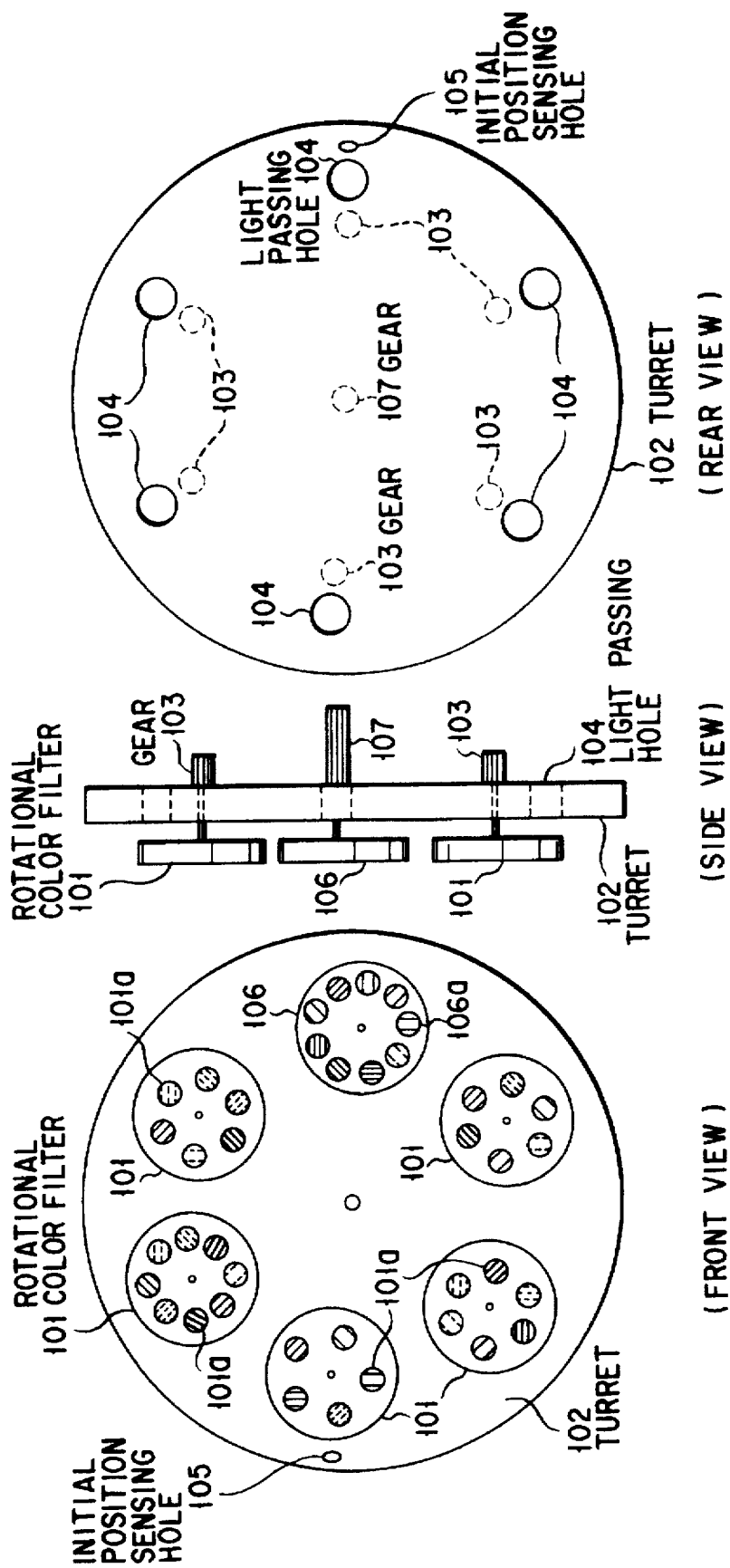

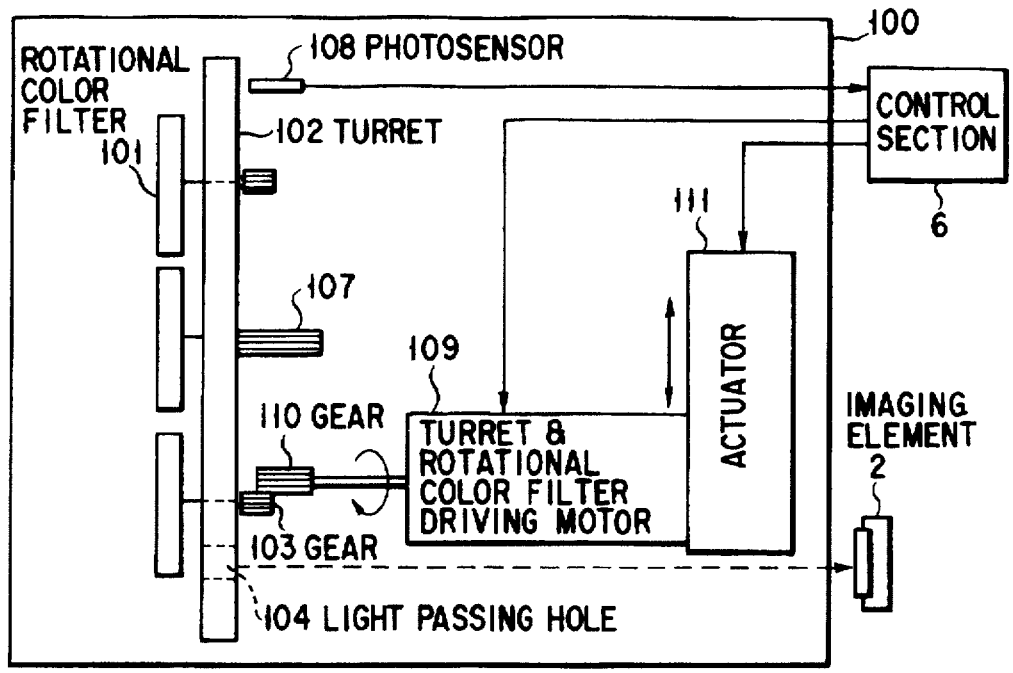
FIG. 3A DURING MEASUREMENT
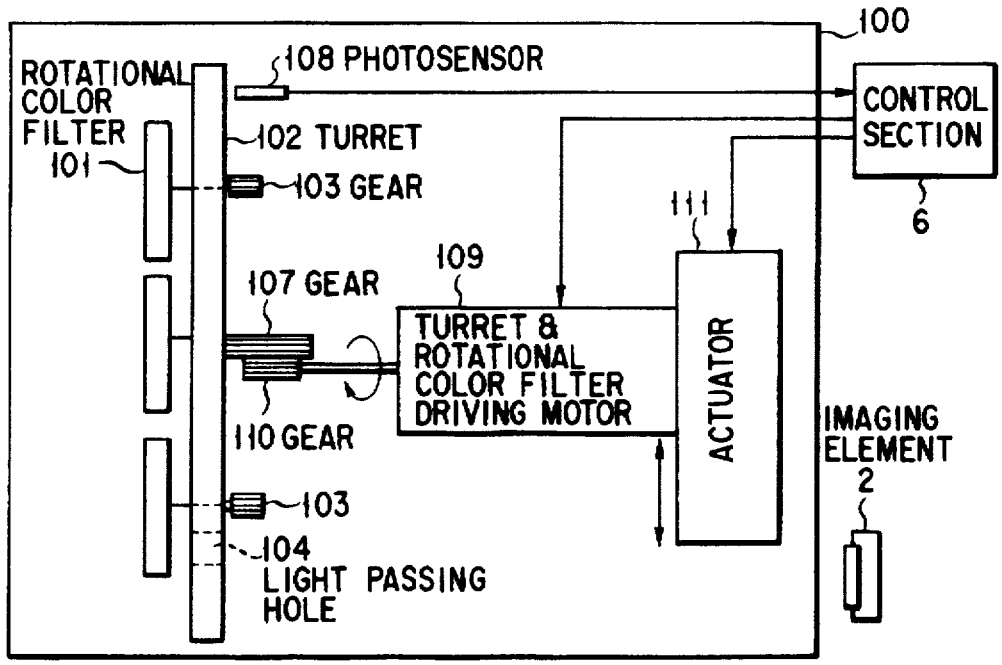
FIG. 3B DURING THE CHANGING OF ROTATIONAL COLOR FILTER

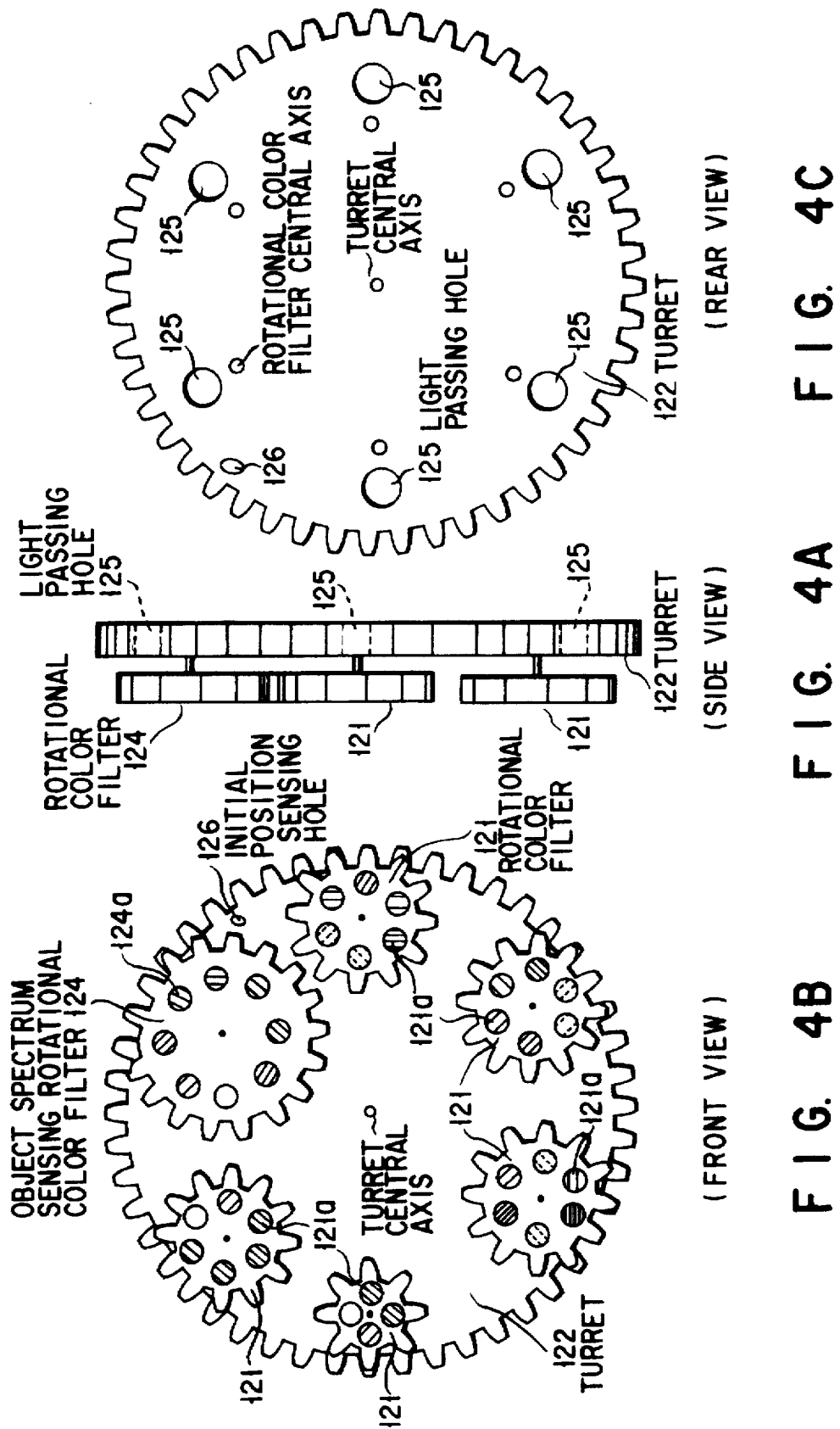

DURING THE CHANGING OF ROTATIONAL COLOR FILTER

DURING MEASUREMENT

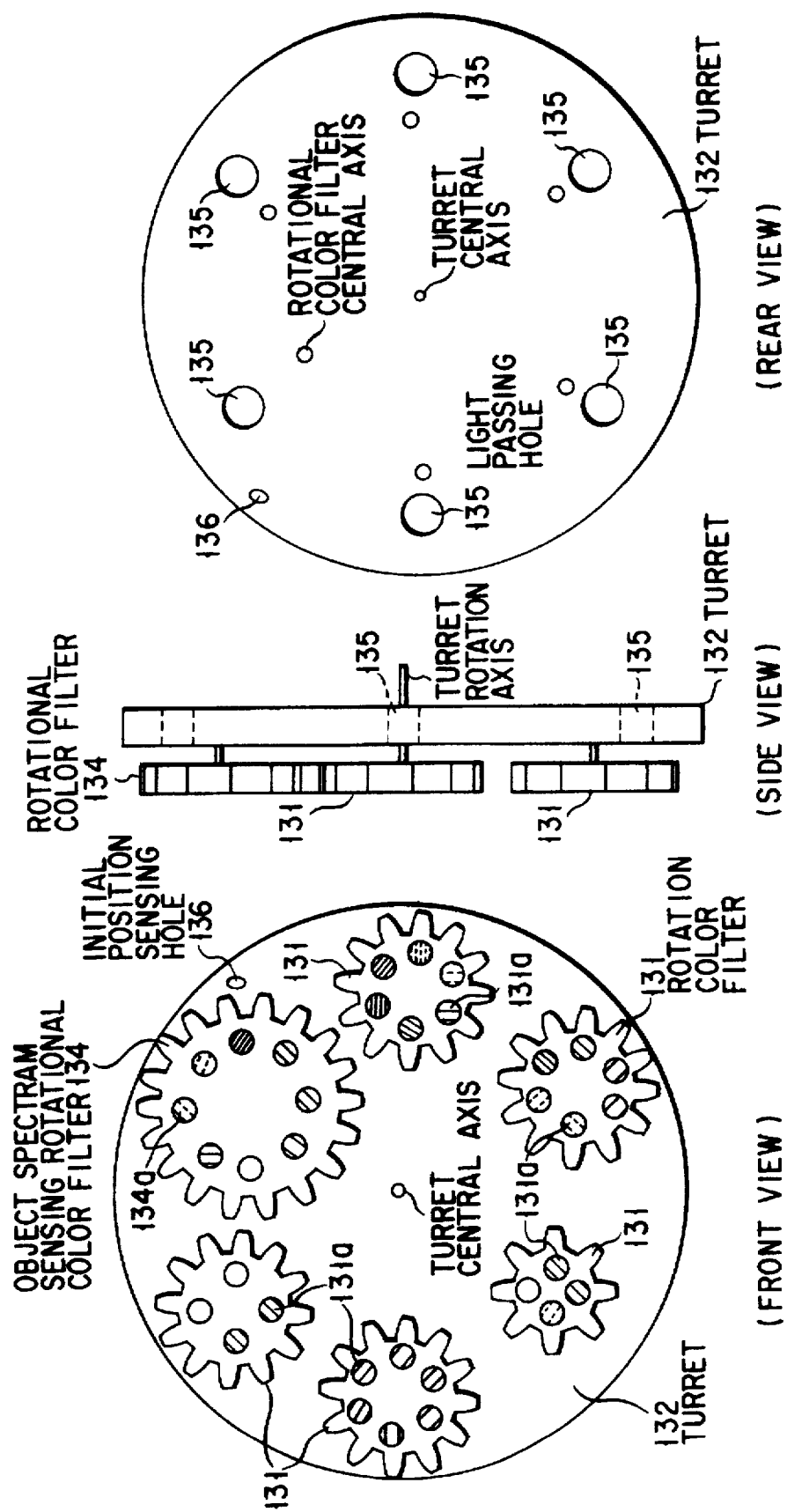

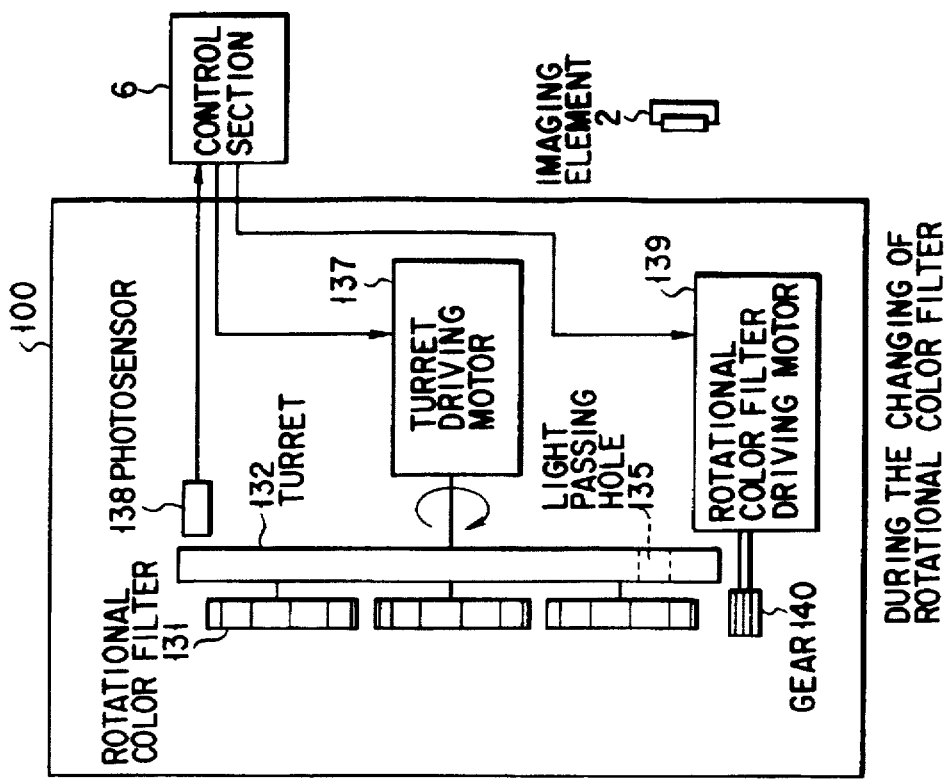
FIG. 7B  DURING THE CHANGING OF ROTATIONAL COLOR FILTER
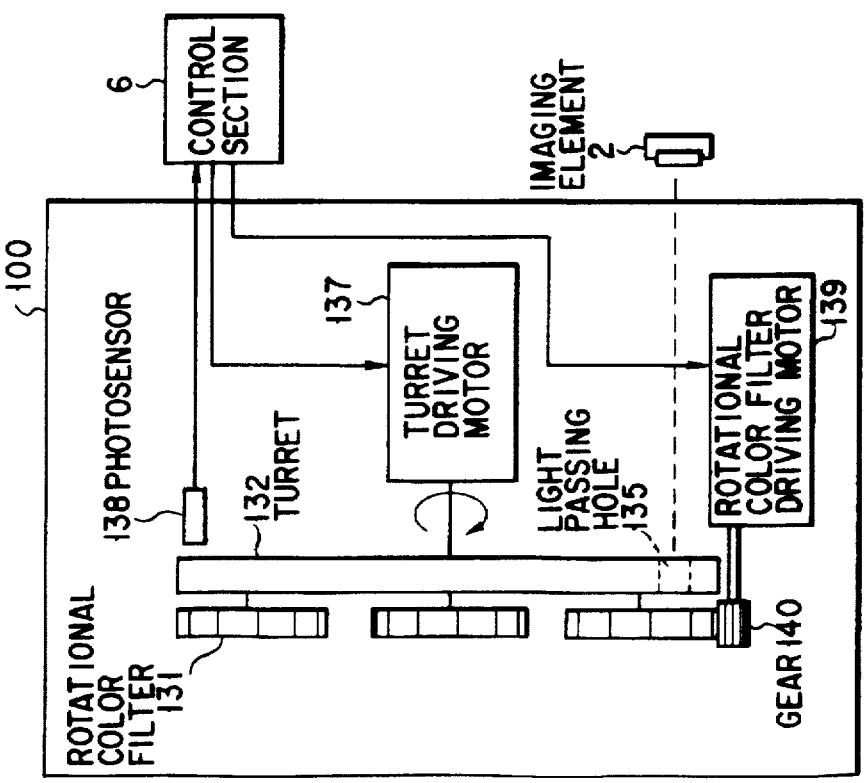
FIG. 7A  DURING MEASUREMENT

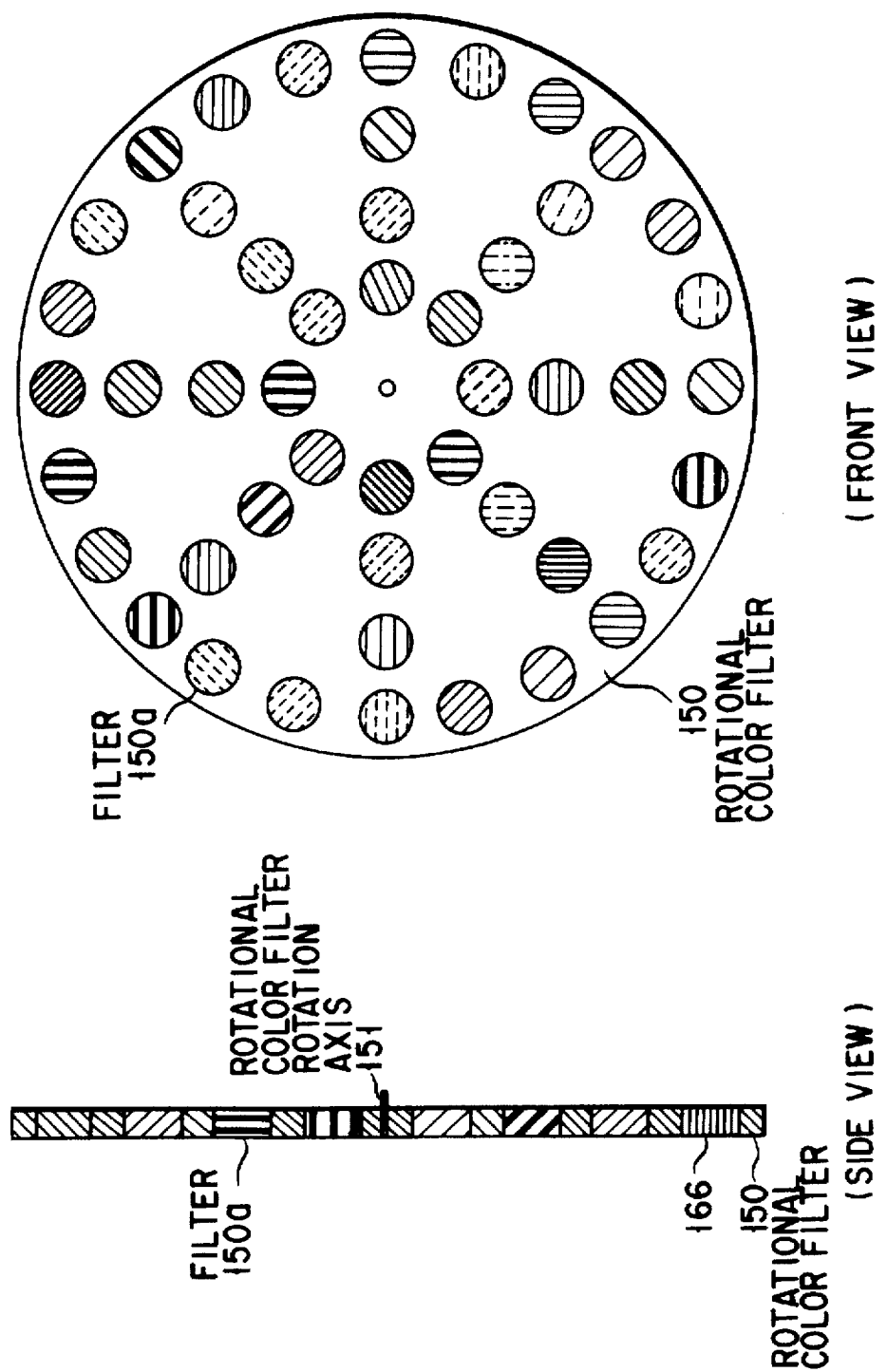
FIG. 8B (FRONT VIEW)
FIG. 8A (SIDE VIEW)

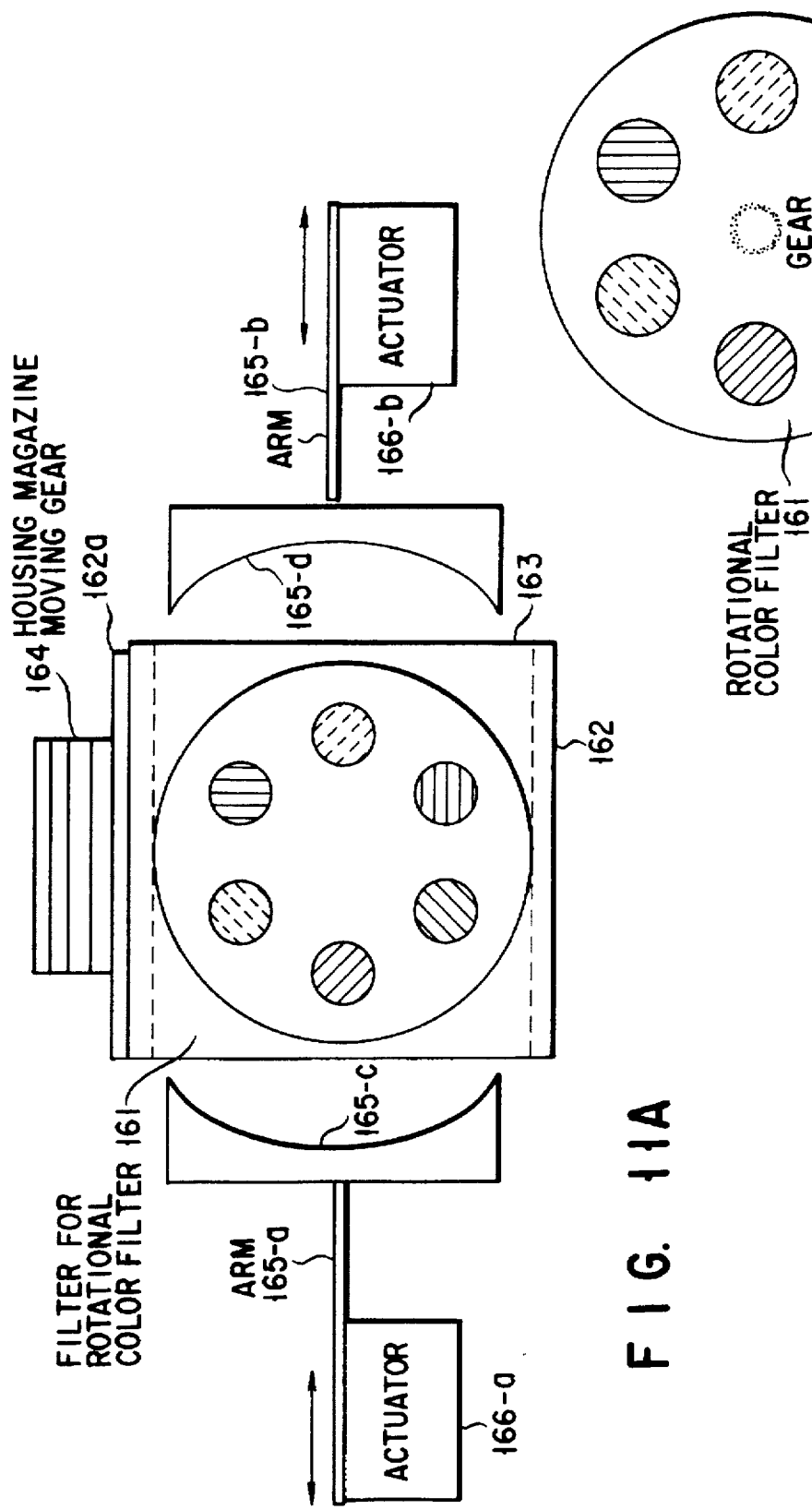
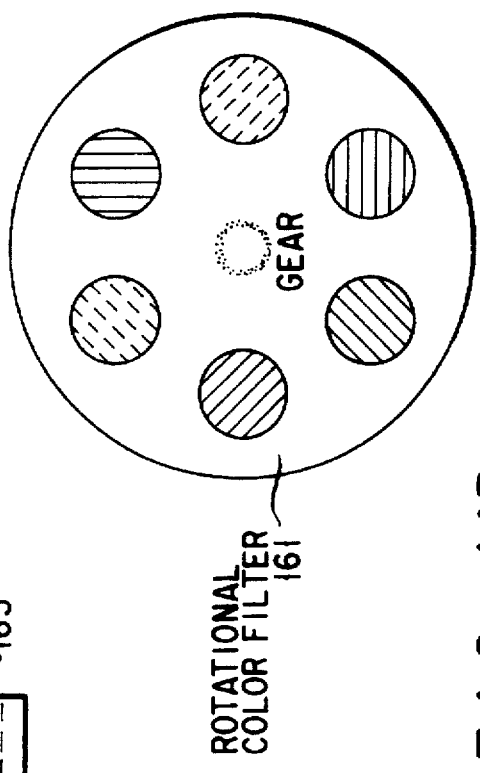
FIG. 11A
FIG. 11B

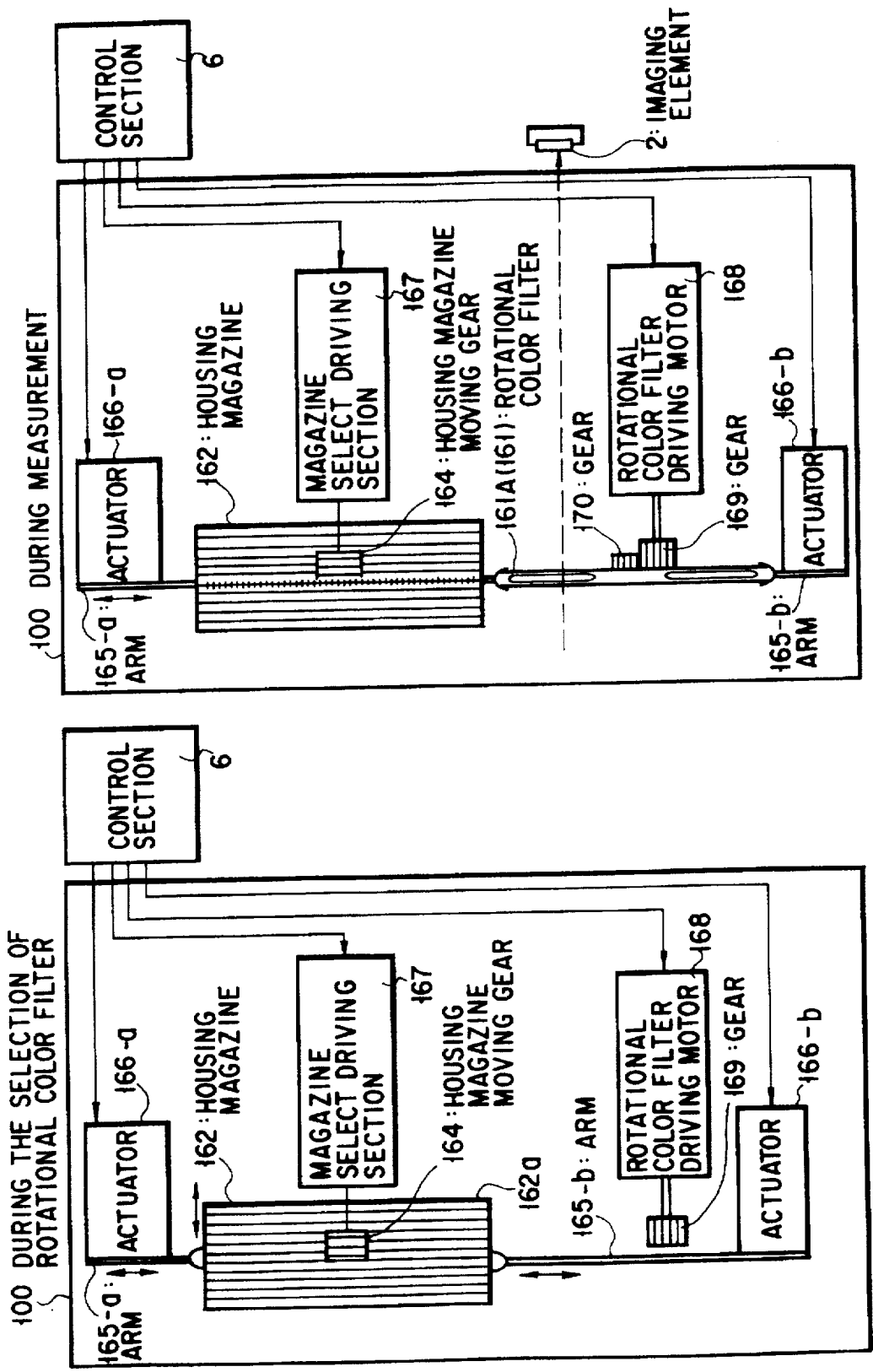

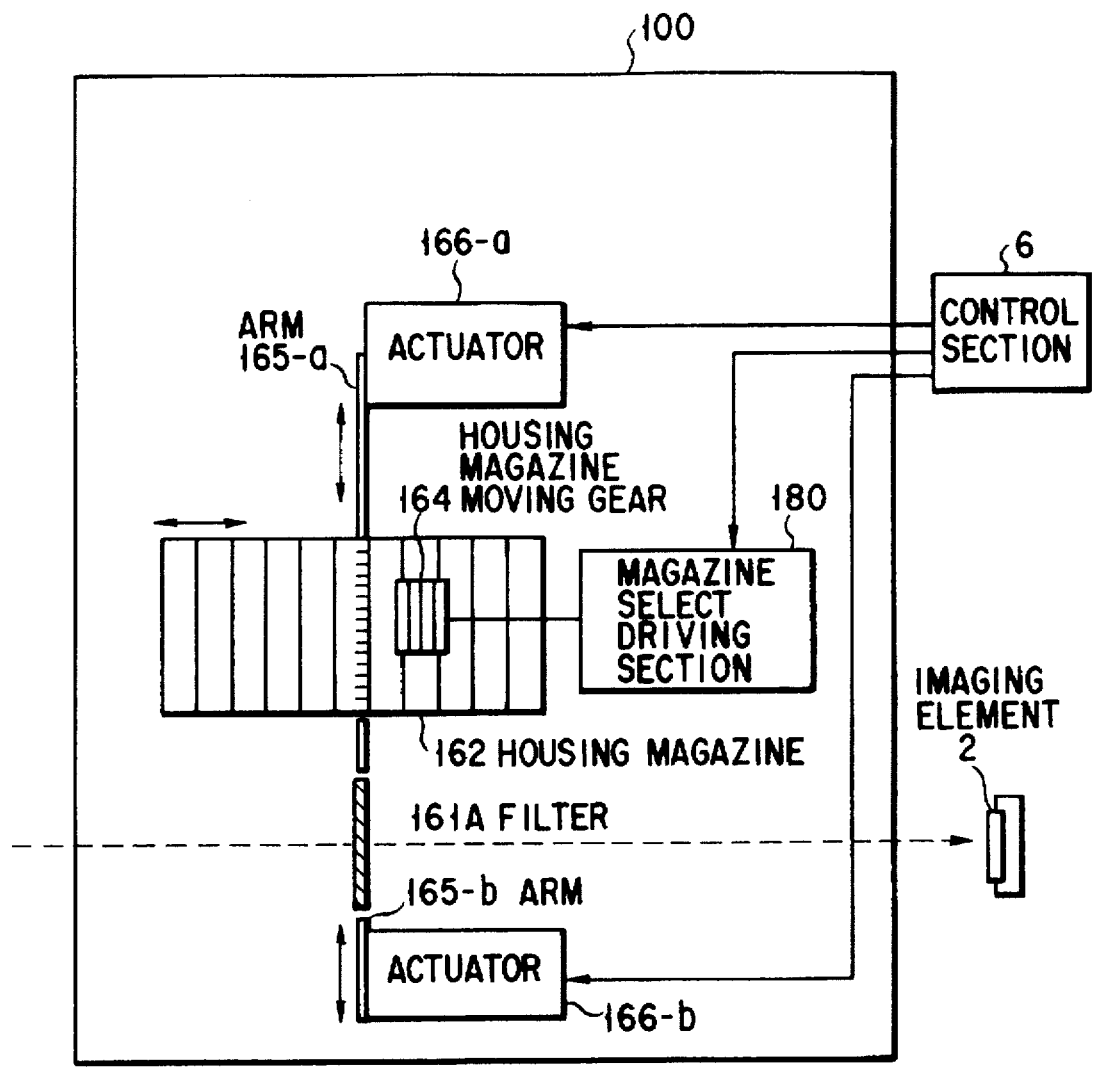
F I G. 13

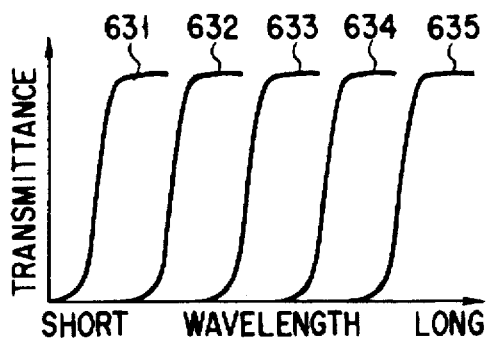
F I G. 16A
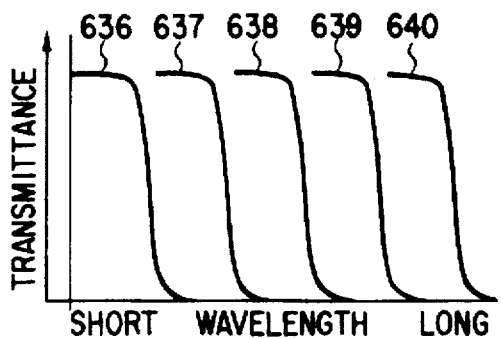
F I G. 16B
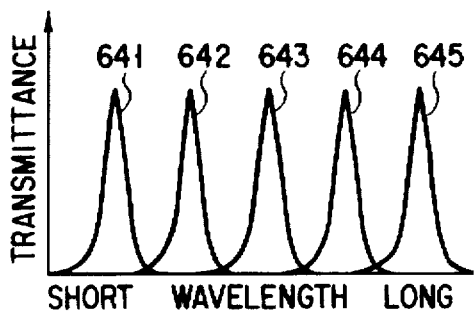
F I G. 16C
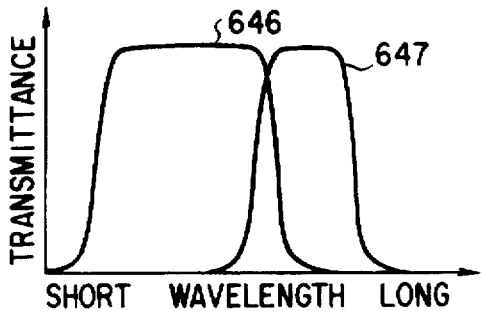
F I G. 16D
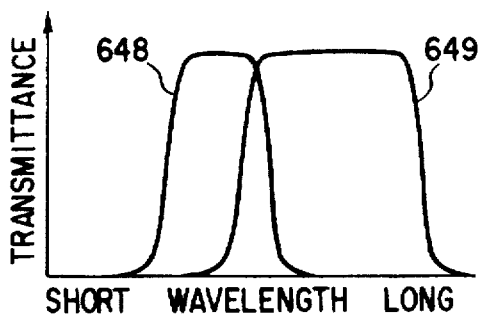
F I G. 16E
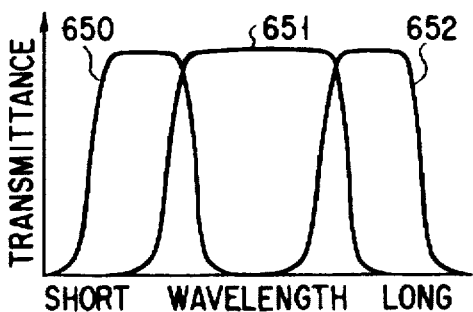
F I G. 16F
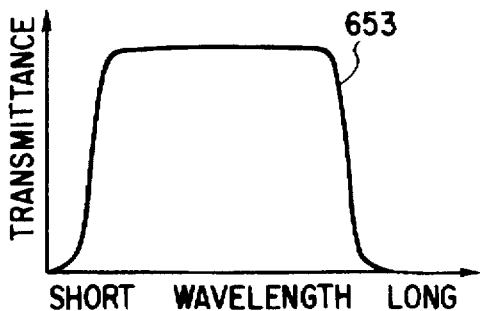
F I G. 16G
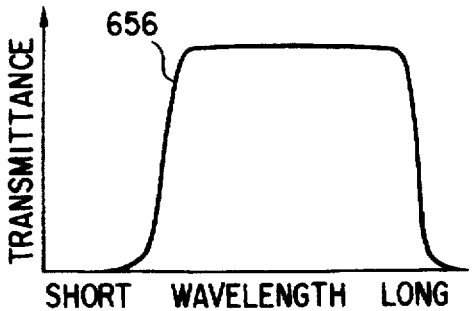
F I G. 16H

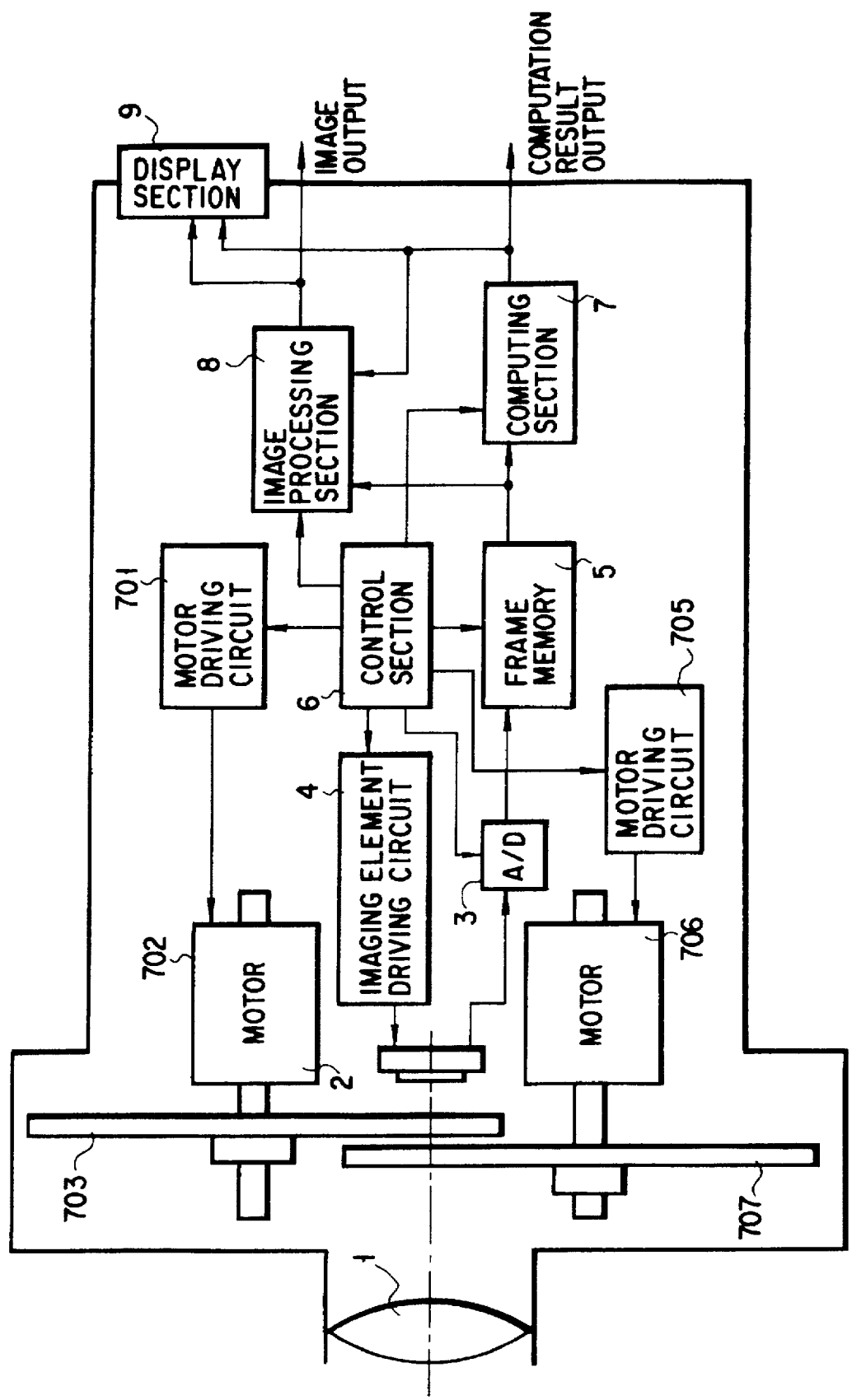
F I G. 17

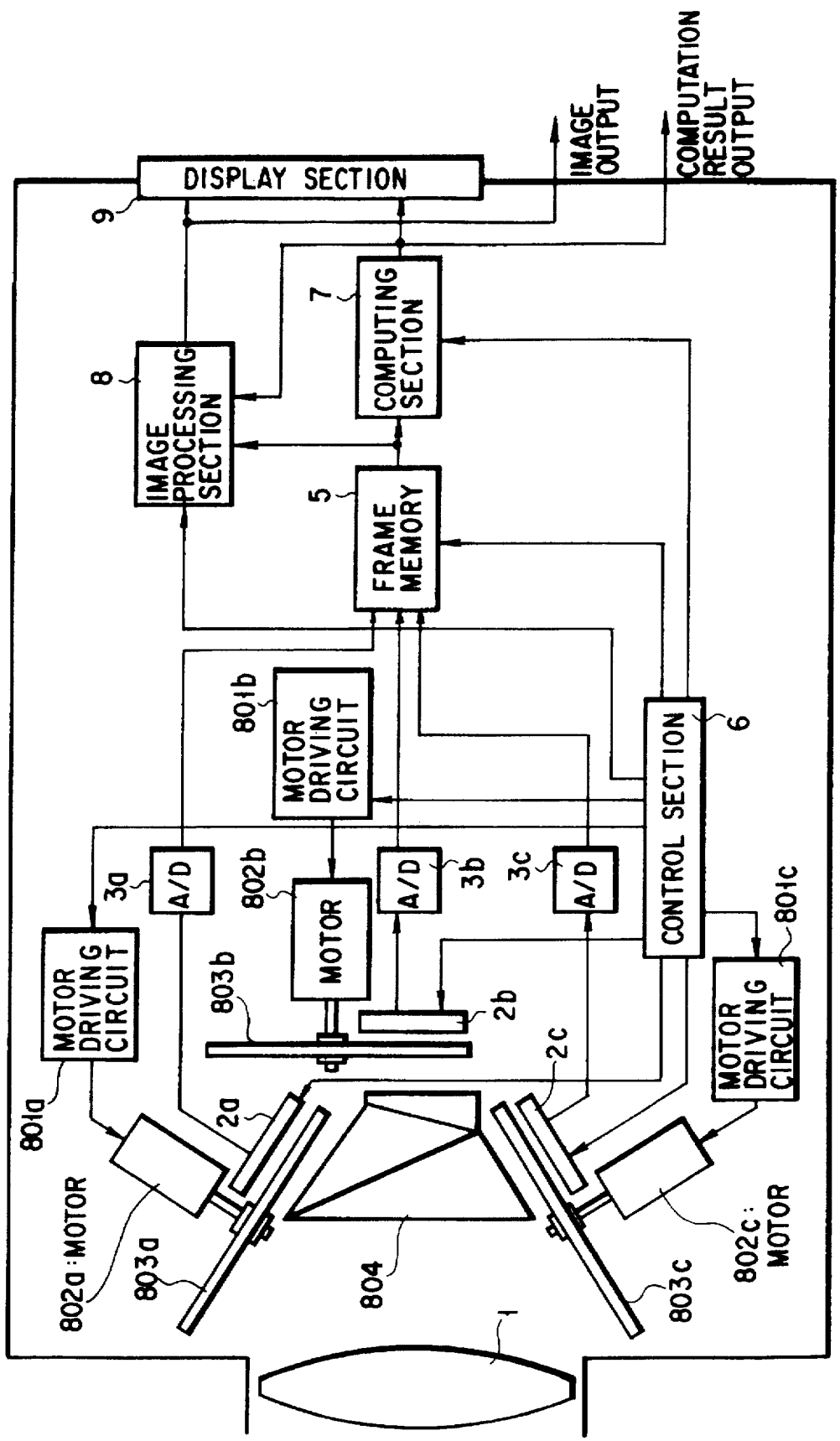
F I G. 19

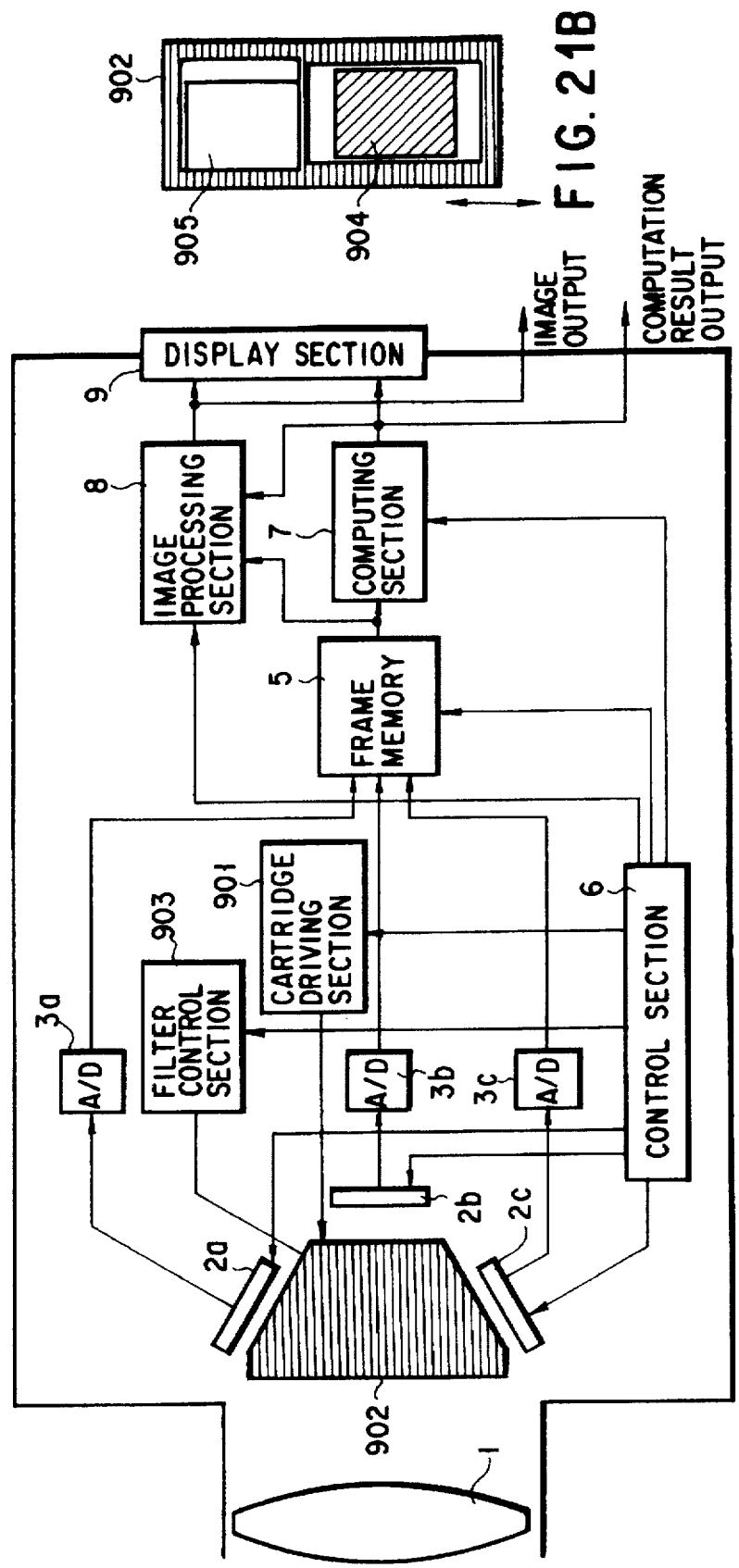

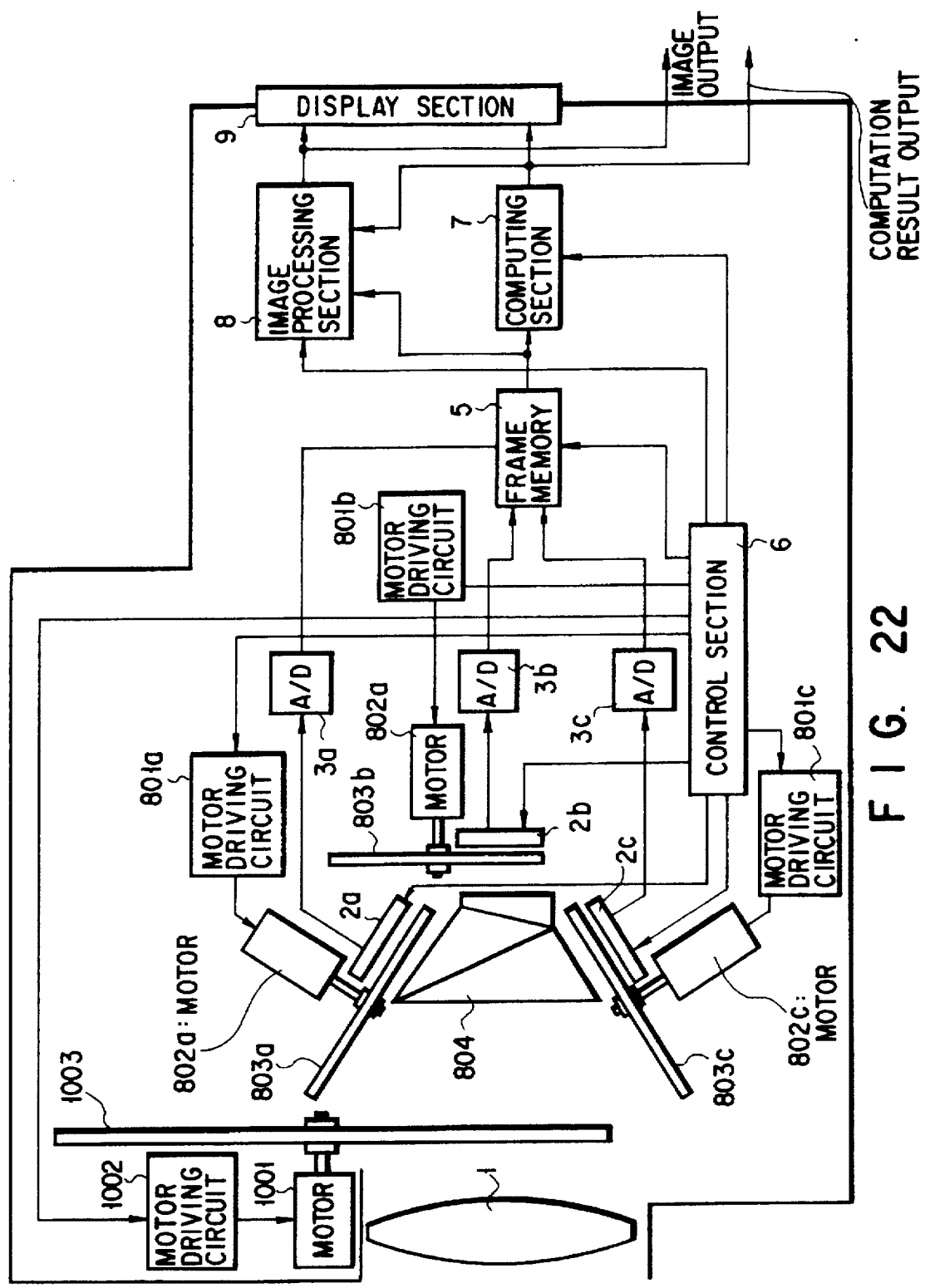
F I G. 22

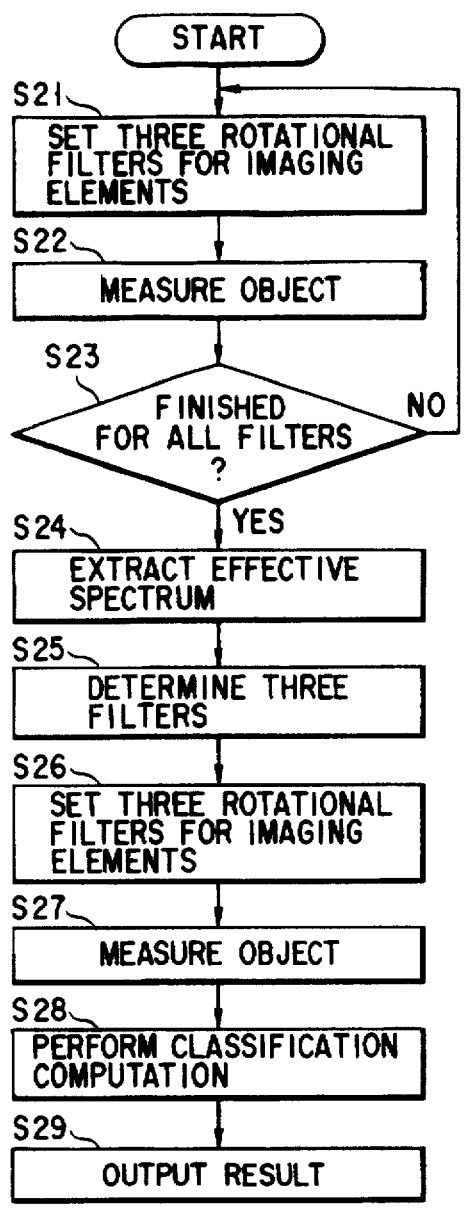
F I G. 25A
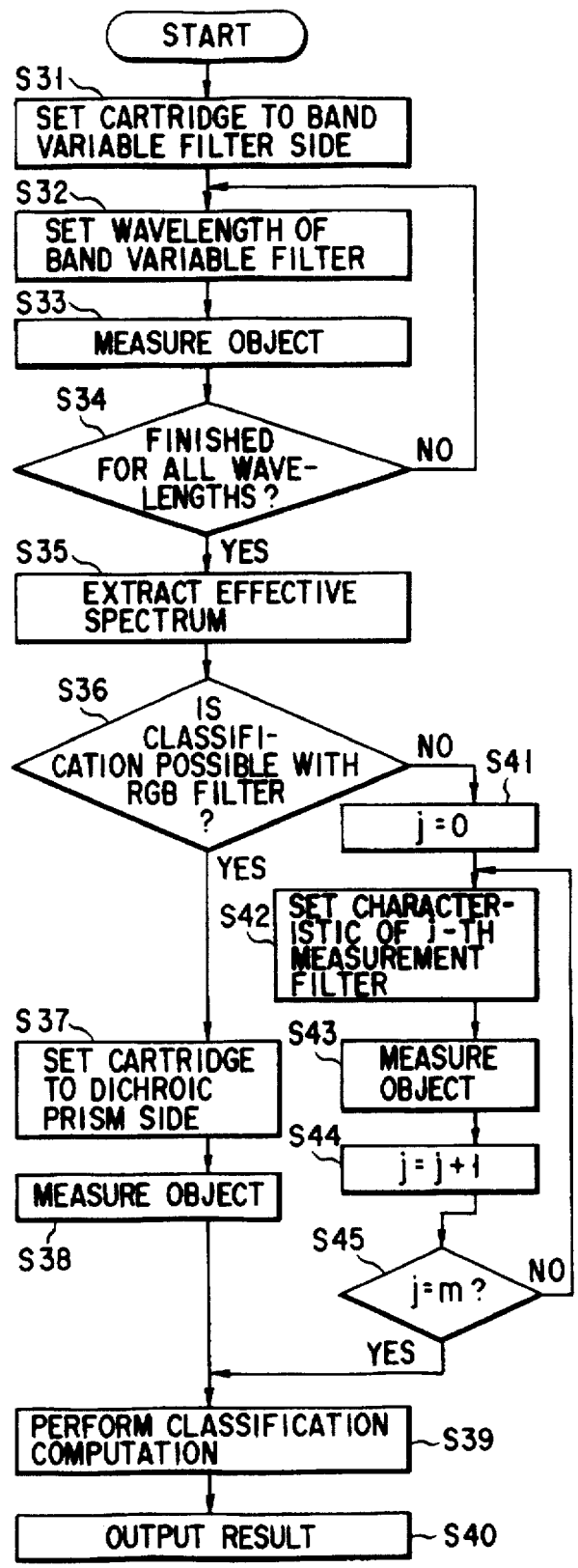
F I G. 25B

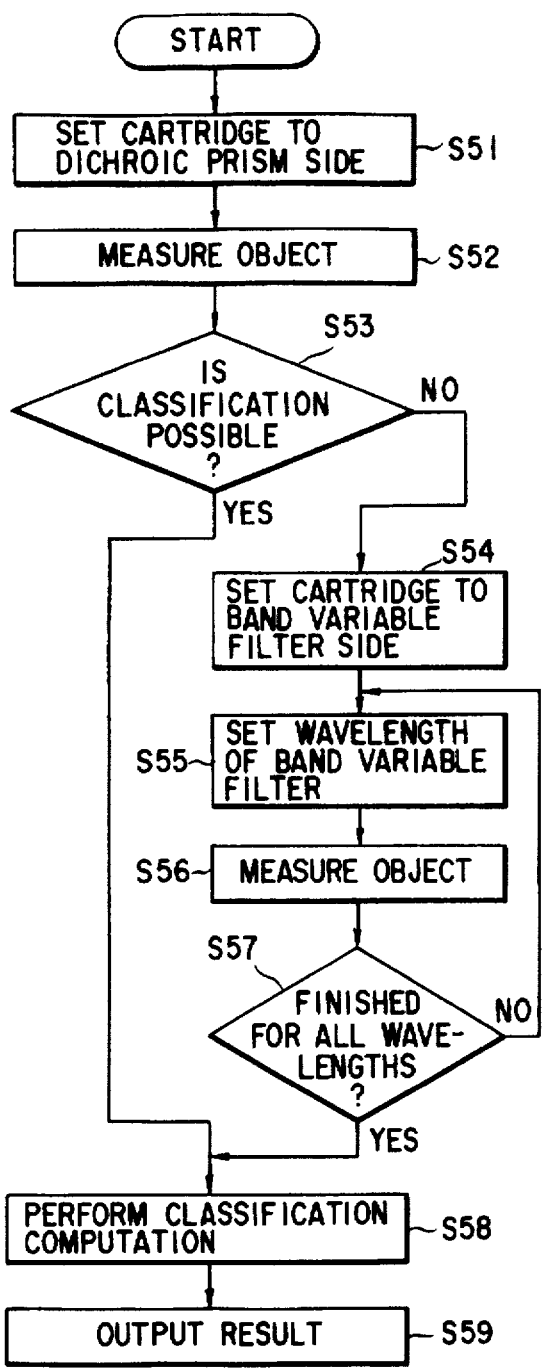
F I G. 26A
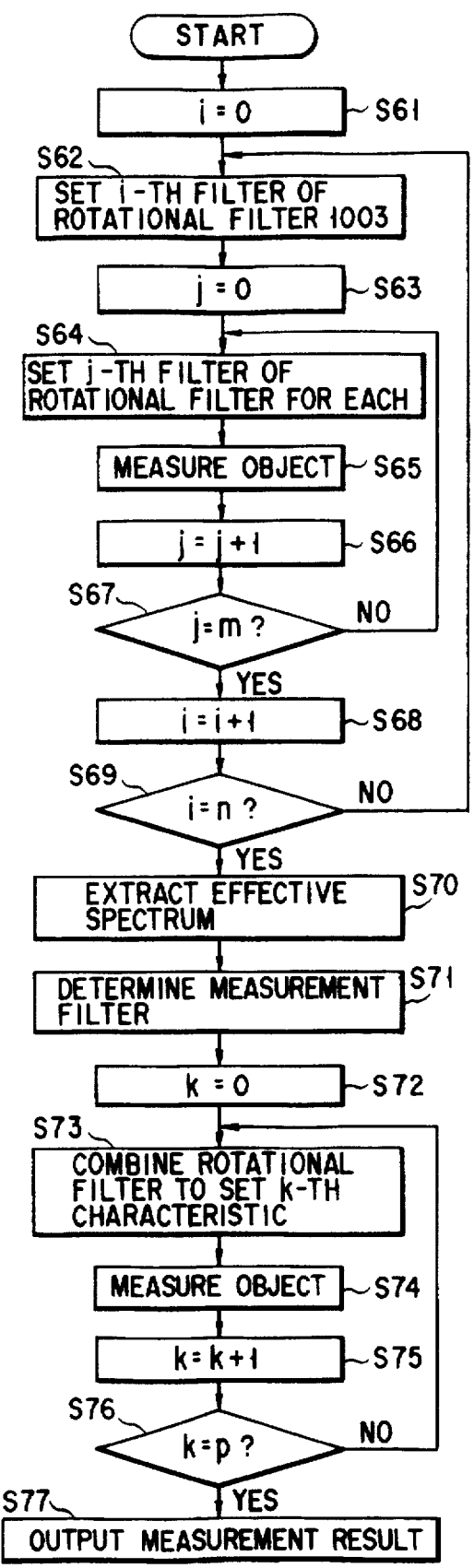
F I G. 26B

COLOR CLASSIFICATION SYSTEM AND METHOD CAPABLE OF AUTOMATICALLY EXCHANGING OPTICAL BAND-PASS FILTERS ACCORDING TO THE OBJECT

BACKGROUND OF THE INVENTION

1. Field of the Invention

The present invention relates generally to a color classification system, and more particularly to a color classification system and method for classifying, judging, and/or identifying objects by color.

2. Description of the Related Art

Color identifying systems that identify the colors of objects have been used in managing the painting of colors and the degree of dyeing at job sites in various industries, or in measuring the colors of products, or in measuring the colors of specimens in the medical and scientific fields.

For example, a color identifying system disclosed in U.S. Pat. No. 5,221,959 sorts the reflected spectral spectrum of an object into two classes by performing a statistical process on the spectrum.

Specifically, the reflected spectral spectrum of an object whose class is known is subjected to a statistical process using the Foley Sammon transform (FS transform) method (refer to Q. Tian, M. Barbaro, et al., "Image classification by the Foley-Sammon transform," Optical Engineering, Vol. 25, No. 7, 1986).

The FS transform method is an approach whereby a spectrum is sorted into two classes. Specifically, this approach is to find spectrum di that maximizes Fisher ratio R(di) from S1 and S2, when two objects are given:

$$R(di) = (di'S1di)/(di'S2di) \quad (1)$$

where di is a classification spectrum di' is a classification spectrum (transposition)

S1 is an interclass covariance matrix

S2 is an intraclass covariance matrix

Hereinafter, spectrum di for this classification is referred to as a classification spectrum.

Since the classification spectrum di has the same number of dimensions as the spectrum of the object, to be precise, it should be expressed as di(λ), but for the sake of simplicity, it is represented as di in the present specification.

Then, two types of classification spectrums that make the Fisher ratio larger are found. A classification spectrum di that maximizes the Fisher ratio is determined to be d1 and the one that maximizes the Fisher ratio of the spectrums crossing at right angles with d1 is determined to be d2.

By projecting each data item on the space composed of the two classification spectrums d1 and d2, a spectrum is sorted into two classes. The classification spectrums d1 and d2 are obtained using the following equation:

$$d1 = \alpha 1 S2^{-1}\Delta$$

$$d2 = \alpha 2 S2^{-1}\Delta[I - (\Delta'S2^{-2}\Delta)/(\Delta'S2^{-3}\Delta)S2^{-1}]\Delta \quad (2)$$

where $\alpha^1$ and $\alpha^2$ are normalization coefficients,

Δ is X1−X2 (the differential spectrum between class 1 and class 2), and I is a unit matrix.

To project each data item on the space composed of the classification spectrums d1 and d2 thus obtained, the inner product of the classification spectrum and the reflected spectral spectrum of the object is found.

If the reflected spectral spectrum of the object is expressed as f(λ) (λ=wavelength), the inner products t1 and t2 are expressed by the following equation:

$$t1 = f(\lambda) \cdot d1$$

$$t2 = f(\lambda) \cdot d2$$

where

"·" indicates an inner product operation.

With the system disclosed in U.S. Pat. No. 5,221,959, a classification boundary is determined from the values of t1 and t2 as shown in FIG. 33 and a filter having the classification spectral characteristic is realized using a diffraction grating G and a liquid-crystal filter F as shown in FIG. 36.

Since the classification spectrums d1 and d2 are generally complex in shape as shown in FIG. 37 and take positive or negative values, the accuracy with which the diffraction grating G and liquid-crystal filter F are mounted must be high.

If the installation position is shifted due to mechanical vibrations resulting from the movement of the apparatus, this will therefore decrease the classification accuracy seriously. There is another problem: the diffraction grating G is expensive.

Accordingly, there have been demands for color classification systems that have a simple configuration, that can be manufactured at low cost, and that can withstand mechanical vibrations.

The color identifying system disclosed in U.S. Pat. No. 5,221,959 has disadvantages in that because the system restricts the light source to a particular source (lamp L), it is not suited for classification with a different light source and cannot make good classification when the spectrum of the light source varies.

When color classification is effected in a factory or the like, the light source can be restricted. In general, however, there have been demands for a system capable of performing color classification without limiting the light source, even when the spectrum varies.

With this backdrop, the assignee of the present invention has filed a prior application for a patent on a color classification system that has a simple configuration, is manufactured at low cost, withstands mechanical vibrations, and is capable of effecting good color classification without limiting the light even when the spectrum varies. This prior application is U.S. Ser. No. 08/321,667.

The color classification system disclosed in U.S. Ser. No. 08/321,667 is characterized by comprising imaging means for imaging the reflected light from an object; a plurality of band-pass filters each having a different band and provided between the object and the imaging means; and classifying means for computing a classification spectrum for classification using a statistical approach from the reflected spectral spectrum of the object shot by the imaging means and classifying the object using the classification spectrum.

With the color classification system disclosed in U.S. Ser. No. 08/321,667, a plurality of band-pass filters each having a different band are prepared. Each of the band-pass filters is placed between the object and the imaging means.

Then, the classifying means computes a classification spectrum for classification using a statistical approach from the reflected spectral spectrum of the object shot by the imaging means and classifies the object using the classification spectrum.

First, the principle of the color classification system disclosed in U.S. Ser. No. 08/321,667 will be explained.

With the color classification system disclosed in U.S. Ser. No. 08/321,667, instead of forming a filter from a diffraction grating and a liquid-crystal filter as in the color classification system disclosed in U.S. Pat. No. 5,221,959, a simple, low-cost color classification system is realized by using a filter combining a plurality of band-pass filters (as shown in FIGS. 28B and 28C) that each transmit a specific wavelength as shown in FIG. 28A.

Furthermore, with the color classification system disclosed in U.S. Ser. No. 08/321,667, to perform color classification even under a different light source, the effect of the light source (illumination light) is removed by measuring the reflected spectral spectrum of a suitable reference plate under the same conditions as when an object is shot and correcting the reflected spectral spectrum of the object on the basis of the reflected spectral spectrum of the reference plate.

Specifically, if $\lambda$ is a wavelength, the reflected spectral spectrum of the object is $f(\lambda)$, the reflected spectral spectrum of the reference plate is $s(\lambda)$, the reflected spectral spectrum of illumination light is $L(\lambda)$, the sensitivity spectrum of the shooting system (including the transmission spectrum of the shooting lens and the sensitivity spectrum of the imaging element) is $M(\lambda)$, the shooting spectrum $gi(\lambda)$ of the object and the shooting spectrum $gs(\lambda)$ of the reference plate will be expressed respectively as:

$$gi(\lambda)=f(\lambda)\times L(\lambda)\times M(\lambda),$$

$$gs(\lambda)=s(\lambda)\times L(\lambda)\times M(\lambda)$$

and the spectrum of the object $gi'(\lambda)$ will be expressed as:

$$gi'(\lambda)=gi(\lambda)/gs(\lambda)=f(\lambda)/s(\lambda) \qquad (4)$$

By using the spectrum $gi'(\lambda)$ from which the effect of the reflected spectral spectrum $L(\lambda)$ of illumination light has been removed, color classification can be carried out even under a different light source.

Furthermore, when the luminance of the illumination light is different, the power of signal $gi'(\lambda)$ after removal of the effect is normalized.

Now, the color classification system disclosed in U.S. Ser. No. 08/321,667, which sorts objects into two classes, will be explained.

FIG. 27 shows the configuration of the color classification system disclosed in U.S. Ser. No. 08/321,667. The color classification system comprises an optical system 10 including a diaphragm and a lens, a rotational color filter 12 composed of a plurality of band-pass filters 12A, 12B, . . . , 12E as shown in FIG. 28A, a CCD 14 for taking in the images of object O and reference plate R, an A/D converter 16, a frame memory 18, a monitor for displaying the portion being shot, a CCD driver 22, a driving motor for the rotational color filter 12, a control section 26 for not only controlling the CCD driver 22 and rotational color filter driving motor 24 but also sending an instruction to a classification computing circuit 28, and the classification computing circuit 28 for performing classification.

The rotational color filter 12 is composed of several types of band-pass filters 12A to 12E as shown in FIG. 28B. Each filter has such a characteristic as permits a specific band width to pass through as shown in FIG. 28A.

Here, to simplify the drawings and explanation, the rotational color filter 12 is made up of five band-pass filters.

The optical system 10 and rotational color filter 12 may be arranged in the reverse order. That is, the rotational color filter 12 may be put before the optical system 10.

The classification computing circuit 28 comprises a luminance component extracting section 30 for extracting the luminance components of an object O, a classification computing section 32 for performing computation (e.g., FS transform) for classification, and a classification judging section 34 for performing the learning for classification judgment and making classification judgments.

As shown in FIG. 30, the luminance component extracting section 30 comprises three measurement area extracting sections 36A, 36B, and 36W for extracting the measurement areas of the object O and reference plate R of the shot picture, three luminance component averaging sections 38A, 38B, and 38W for averaging the measured luminance components, a luminance component memory "A" 40A into which the luminance component of data on shot class 1 or unknown class is written, a luminance component memory "B" 40B into which the luminance component of data on shot class 2 is written, a luminance component memory "W" 40W into which the luminance component of data on shot reference plate R is written, a correction circuit 42 for correcting the effect of the light source, a luminance spectrum memory "dta" 44A into which corrected class-1 or unknown-class data is written, and a luminance spectrum memory "dtb" 44B into which corrected class-2 data is written.

The luminance component memories 40A, 40B, and 40W are capable of storing as many luminance components as there are band-pass filters (in this example, five filters) constituting the rotational color filter 12.

The correction circuit 42 is composed of a divider $42_1$ as shown in FIG. 31A, or of a remover $42_1$ and a power normalization circuit $42_2$ as shown in FIG. 32B. In the following explanation, the configuration is assumed to be that of FIG. 31B.

The luminance spectrum memories 44A and 44B are capable of storing as many luminance components (each luminance component consists of as many data items as there are filters) as there are samples N of data items to be shot.

As shown in FIG. 31C, the classification computing section 32 comprises a selector switch "A" 46, a classification spectrum computing section 48 for determining a classification spectrum, a classification spectrum d1 memory 50 into which a classification spectrum d1 is written, a classification spectrum d2 memory 52 into which a classification spectrum d2 is written, a selector switch "B" 54, a multiplier 56, and an accumulative adder 58 composed of an adder 58A and a latch 58B which performs accumulative addition.

The classification judging section 34, as shown in FIG. 31, is made up of a selector "C" 60, a classification boundary deciding section 62, a classification boundary memory "c1" 64 into which the decided classification boundary is written, and a classification deciding section 66 that makes a classification judgment.

Using the color classification system having the above configuration, the process of sorting two classes of objects will be explained.

In this process, first, a learning mode for determining a classification boundary is executed, followed by a classification mode for performing color classification of unknown-class data items.

Explained first will be the learning mode.

In this mode, a classification spectrum for sorting two classes of objects O as shown in FIG. 32 is found.

First, the control section 26 adjusts the direction and focal distance of the optical system 10 so that the two classes of objects can be shot simultaneously.

Then, a focusing mechanism (not shown) makes focusing adjustments and on the basis of the photometric value from a photometric instrument, the diaphragm of the optical system 10 and the exposure time of the CCD 14 are set.

Next, the position of the rotational color filter 12 is controlled by the driving motor 24 via the control section 26 so that shooting may be done using a first band-pass filter (e.g., 12A) of the rotational color filter 12.

Then, a shooting command is sent to the CCD driver 22 via the control section 26, thereby shooting a first image.

After the first image has been taken in by the CCD 14, it undergoes A/D conversion at the A/D converter 16, which then transfers the converted data as image data to the frame memory 18, which stores it.

The image data stored in the frame memory 18 is read into the classification computing circuit 28.

In the classification computing section 28, the image data is first transferred to the luminance component extracting section 30.

The luminance component extracting section 30 extracts the classification object areas corresponding to class 1 and class 2 of the taken-in image data items at measurement area extracting sections 36A and 36B and then the luminance components for each pixel.

Then, the luminance component averaging sections 38A and 38B sense the averages of the luminance components for each extracted area and write the sensed averages into the luminance component memories 40A, 40B as data items da1, db1, respectively.

Next, the driving motor 24 rotates the rotational color filter 12 via the control section 26, enabling a second image to be shot via a second band-pass filter (e.g., 12B). As with the first image, the averages of the luminance components for each area extracted at the measurement area extracting sections 36A, 36B of the luminance component extracting section 30 are written into the luminance component memories 40A, 40B as data items da2, db2, respectively.

The same processes are repeated until the shooting via a fifth band-pass filter (e.g., 12E) has been finished. This enables not only data items da3, da4, da5 to be written into the luminance component memory "A" 40A but also data items db3, db4, db5 to be written into the luminance component memory "B" 40B.

By the series of operations, data item dai (i=1, 2, . . . , 5) is written into luminance component memory "A" 40A and data item dbi (i=1, 2, . . . , 5) is written into luminance component memory "B" 40B.

Then, the reference plate R is put in the vicinity of the object and a picture of the object is taken sequentially, using the five types of band-pass filters. This causes data item dwi (i=1, 2, . . . , 5) to be written into luminance component memory "W" 40W.

Thereafter, the correction circuit 42 reads the data from luminance component memory "A" 40A and luminance component memory "W" 40W and makes a correction for class 1, and reads the data from luminance component memory "B" 40B and luminance component memory "W" 40W and makes a correction for class 2.

These corrections are made by dividing the data in luminance component memory "A" 40A by the data in luminance component memory "W" 40W for each filter component at a divider $42_1$ using the following equations:

$$da^m i' = da^m i / dw i \quad (i=1, 2, \ldots, 5, m=1, 2, \ldots, N)$$

$$db^m i' = db^m i / dw i \quad (i=1, 2, \ldots, 5, m=1, 2, \ldots, N) \tag{5a}$$

where i indicates a band-pass filter number and m is a sample number.

These calculations eliminate the effect of a different light source (spectral characteristic).

A power normalization circuit $42_2$ uses the following equations including power values $Ca^m$ and $Cb^m$ to equalize the power values of the divided data items:

$$da^m i'' = da^m i' / Ca^m \quad (i=1, 2, \ldots 5, m=1, 2, \ldots, N)$$

$$db^m i'' = db^m i' / Cb^m \quad (i=1, 2, \ldots, 5, m=1, 2, \ldots, N) \tag{5b}$$

where the power values $Ca^m$ and $Cb^m$, $$Ca^m = \sum_{i=1}^{N} da^m i', \tag{5c}$$

$$Cb^m = \sum_{i=1}^{N} db^m i'$$

or $$Ca^m = \sum_{i=1}^{N} (da^m i')^2, \tag{5d}$$

$$Cb^m = \sum_{i=1}^{N} (db^m i')^2$$

The power normalization eliminates the effect of the luminance of the light source being different.

The thus obtained $da^m i''$ and $db^m i''$ are written into luminance spectrum memories "dta" 44A and "dtb" 44B, respectively, as luminance spectrum data items.

By making the aforementioned correction as many times as the number (N) of samples of the object, luminance spectrum data items are written into the luminance spectrum memories "dta" 44A and "dtb" 44B.

In this case, the object itself may be changed as samples of the object or different areas of the same object may be used as samples of the object.

In this way, as many luminance spectrum data items as the number (N) of samples of the object are written into the luminance spectrum memories "dta" 44A and "dtb" 44B.

Furthermore, when objects of two classes cannot be shot at the same time, the luminance spectrum data items are written into the luminance spectrum memories "dta" 44A and "dtb" 44B by shooting the object and reference plate class by class and making a correction. This operation is performed as many times as the number (N) of samples.

Then, in the classification computing section 32, the selector switch "A" 46 is switched to the b side.

Next, from the luminance spectrum memories "dta" 44A and "dtb" 44B, the luminance spectrum data items related to class 1 and class 2 are read out. Using FS transform, the classification spectrum computing section 48 finds a classification spectrum d1i (i=1, 2, . . . , 5) and a classification spectrum d2i (i=1, 2, . . . , 5) crossing at right angles with d1i. These classification spectrums d1i and d2i are written into the classification spectrum d1 memory 50 and classification spectrum d2 memory 52, respectively.

Next, the selector switch "A" 46 is switched to the a side and the selector switch "C" 60 in the classification judging section 34 is switched to the b side.

Then, the selector switch "B" 54 is switched to the a side. Luminance spectrum data item $da^m i$ is read from the luminance spectrum memory "dta" 44A and classification spectrum data item d1i is read from the classification spectrum d1 memory 50. The multiplier 56 and accumulative computing section 58 calculate the inner product of these data items as follows:

$$ta^m1 = \sum_{i=1}^{5} (da^mi" \times d1i) \tag{6}$$

The calculation result is transferred to the classification boundary deciding section 62 in the classification judging section 34.

Then, luminance spectrum data item $db^mi"$ is read from the luminance spectrum memory "dtb" 44B and classification spectrum data item $d1i$ is read from the classification spectrum d1 memory 50. Thereafter, the inner product of these data items are calculated as follows:

$$tb^m1 = \sum_{i=1}^{5} (db^mi" \times d1i) \tag{7}$$

The calculation results is transferred to the classification boundary deciding section 62.

Next, the selector switch "B" 54 is switched to the b side. Luminance spectrum data item $da^mi"$ is read from the luminance spectrum memory "dta" 44A and classification spectrum data item $d2i$ is read from the classification spectrum d2 memory 52. The inner product of these data items is calculated as follows:

$$ta^m2 = \sum_{i=1}^{5} (da^mi" \times d2i) \tag{8}$$

The calculation result is transferred to the classification boundary deciding section 62.

Then, luminance spectrum data item $db^mi"$ is read from the luminance spectrum memory "dtb" 44B and classification spectrum data item $d2i$ is read from the classification spectrum d2 memory 52. Thereafter, the inner product of these data items are calculated as follows:

$$tb^m2 = \sum_{i=1}^{5} (db^mi" \times d2i) \tag{9}$$

The calculation results is transferred to the classification boundary deciding section 62.

Using the inner product values obtained by performing the process as many times as the number of samples for each class, the classification boundary deciding section 62 determines a classification boundary as shown in FIG. 33 and writes it into the classification boundary memory "c1" 64.

Up until now the learning mode has been described.

Now, the classification mode will be explained.

In the classification mode, class-unknown object O, as shown in FIG. 34, to be classified are first shot as in the learning mode, and luminance spectrum dxi (i=1, 2, . . . , 5) is written into the luminance component memory "A" 40A.

Then, the reference plate R is shot under the same shooting conditions, and luminance spectrum dwi (i=1, 2, . . . , 5) is written into the luminance component memory "W" 40W.

Then, the data is read from these luminance component memories "A" 40A and "W" 40W and thereafter, the correction circuit 42 makes a correction using the following equation:

$$dxi'=dxi/dwi \ (i=1, 2, \ldots, 5) \tag{10}$$

The power normalization circuit $42_2$ normalizes the power value of the divided data using the following equation:

$$dxi"=dxi'/Cx \ (i=1 \text{ to } 5),$$

$$Cx = \sum_{i=1}^{5} dxi'$$

Then, spectrum sxi" is written into the luminance spectrum memory "dta" 44A.

Here, in the classification computing section 32, the selector switch "A" 46 is switched to the a side. In the classification judging section 34, the selector switch "C" is switched to the a side.

Then, the selector switch "B" 54 in the classification computing section 32 is first switched to the a side. Luminance spectrum dxi" is read from the luminance spectrum memory "dta" 44A and classification spectrum data item $d1i$ is read from the classification spectrum d1 memory 50. The multiplier 56 and accumulative computing section 58 calculate the inner product of these data items using the following equation:

$$tx1 = \sum_{i=1}^{5} (dxi" \times d1i) \tag{11}$$

tx1 is transferred to the classification deciding section 66 in the classification judging section 34.

Next, the selector switch "B" 54 is switched to the b side. Luminance spectrum data item dxi" is read from the luminance spectrum memory "dta" 44A and classification spectrum data item $d2i$ is read from the classification spectrum d2 memory 52. The inner product of these data items is calculated using the following equation:

$$tx2 = \sum_{i=1}^{5} (dxi" \times 2di) \tag{12}$$

tx2 is transferred to the classification deciding section 66.

Then, the classification deciding section 66 reads the classification boundary from the classification boundary memory "c1" 64, judges which side of the classification boundary the transferred inner product values tx1 and tx2 belong to, and outputs the classification result.

What has been described above is about the classification mode.

As described so far, with the color classification system disclosed in U.S. Ser. No. 08/321,667, because the difference in the spectral characteristic of the light source is corrected at the divider $42_1$ and the difference in luminance is corrected at the power normalization circuit $42_2$, it is possible to achieve a good classification even with a different light source.

As shown in FIG. 31B, use of the power normalization circuit $42_2$ enables good classification even when the luminance of the light source varies.

When only the luminance varies with the spectrum of the light source remaining unchanged, the divider circuit $42_1$ is not needed and only the power normalization circuit $42_2$ is necessary.

Furthermore, because the system has a simple configuration using the rotational color filter 12, it is not only manufactured at low cost but also is immune to mechanical vibration.

Since the system has the learning mode and the classification mode, it can deal with different classification purposes easily.

Furthermore, different classification purposes can be dealt with instantaneously by the classification computing section 32 shown in FIG. 35. Specifically, the classification computing section is provided with a plurality of sets of a pair of classification spectrum d1 and d2 memories 50 and 52 and a selector switch "B" 54 for selecting one of the pair. Different learned classification spectrums are stored in each set of classification spectrum d1, d2 memories 50, 52. A selector switch "C" 68 is used to select the desired set.

In this example, the rotational color filter 12 has the round filters 12A to 12E arranged on the same circle as shown in FIG. 28B. To stop the rotational color filter at each filter position, the position of the rotational color filter is controlled on a filter basis. If the filters 12A to 12E are formed into pie-shaped segments and these segments are arranged on the same circle to form a rotational color filter 12, this will make it unnecessary to stop the rotational color filter on a filter basis and control the position, which allows the rotational color filter to rotate all the time, therefore enabling a high-speed classification.

In this case, the exposure timing of the CCD14 must be synchronized with the rotation speed of the rotational color filter 12.

The classification result may be displayed in the form of an image colored differently according to the classified class or may be reported to the user in voice.

Because the color classification system disclosed in U.S. Ser. No. 08/321,667 uses the optimized optical band-pass filters according to the object, the optical band-pass filters must be changed when the object is changed or a totally unknown object is to be shot, leaving room for improvement in flexibility.

Furthermore, U.S. Ser. No. 08/321,667 has disclosed a system having means for changing a plurality of optical band-pass filters according to the light source, but it has not disclosed filter changing means for various objects.

SUMMARY OF THE INVENTION

It is, therefore, an object of the present invention to provide a new and improved color classification system and method having such a high flexibility that they can deal with various objects.

According to an aspect of the present invention, there is provided a color classification system comprising: imaging means for imaging light from an object; optical means for forcing the light from the object to form an image on the imaging means; a plurality of optical band-pass filters provided between the object and the imaging means, each having a different pass band; changeover means for changing the plurality of optical band-pass filters; and computing means for performing classification or judgment from the spectral characteristic of the imaged object through a statistical approach, wherein the plurality of optical band-pass filters include a plurality of measurement filters for measuring the color of the object, and a test filter for judging which one of the plurality of measurement filters should be applied to the object, and the changeover means changes the measurement filters and selects an effective one on the basis of the result sensed the test filter.

According to another aspect of the present invention, there is provided a color classification method comprising: the step of passing light from an object via an optical system through a plurality of optical band-pass filters each having a different pass band, while changing these filters, and thereby imaging the object; the step of performing classification or judgment from a spectral characteristic of the imaged object through a statistical approach; and the step of examining the spectral characteristic of the object beforehand and based on a result, selecting a specific optical band-pass filter from the plurality of optical band-pass filters and thereafter performing classification or judgment.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 shows a basic configuration of a color classification system according to the present invention;

FIGS. 2A, 2B, and 2C are a side view, a front view, and a rear view of the important portion of a filter changing section according to a first embodiment of the present invention, respectively;

FIGS. 3A and 3B illustrate the operating conditions of the filter changing section of the first embodiment during measurement and during the changing of the rotational color filter, respectively;

FIGS. 4A, 4B, and 4C are a side view, a front view, and a rear view of the important portion of a filter changing section according to a second embodiment of the present invention, respectively;

FIGS. 6A, 6B, and 6C are a side view, a front view, and a rear view of the important portion of a modification of the filter changing section of the second embodiment, respectively;

FIGS. 7A and 7B illustrate the operating conditions of the modification of the filter changing section of the second embodiment during measurement and during the changing of the rotational color filter, respectively;

FIGS. 8A and 8B are a sectional side view and a front view of the important portion of a filter changing section according to a third embodiment of the present invention, respectively;

FIGS. 11A and 11B are a front view of the important portion of a filter changing section according to a fourth and fifth embodiments of the present invention and a front view of a rotational color filter, respectively;

FIGS. 12A and 12B illustrate the operating conditions of the filter changing section of the fourth embodiment during the selection of the rotational color filter and during measurement, respectively;

FIG. 13 illustrates the operating condition of the filter changing section of the fifth embodiment;

FIGS. 16A to 16H are optical characteristic diagrams, including independent characteristics and composite characteristics, of two rotational color filters used in the sixth embodiment;

FIG. 17 shows the configuration of a color classification system according to a seventh embodiment of the present invention;

FIG. 19 shows the configuration of a color classification system according to an eighth embodiment of the present invention;

FIGS. 21A and 21B show the entire configuration of a color classification system according to a ninth embodiment of the present invention and a top view of its important portion, respectively;

FIG. 22 shows the configuration of a color classification system according to a tenth embodiment of the present invention;

FIGS. 25A and 25B are a flowchart for measurement in the eighth embodiment and a flowchart for first measurement in the ninth embodiment, respectively;

FIGS. 26A and 26B are a flowchart for measurement in the ninth embodiment and a flowchart for measurement in the tenth embodiment, respectively;

DETAILED DESCRIPTION OF THE PREFERRED EMBODIMENTS

Figure 5B:
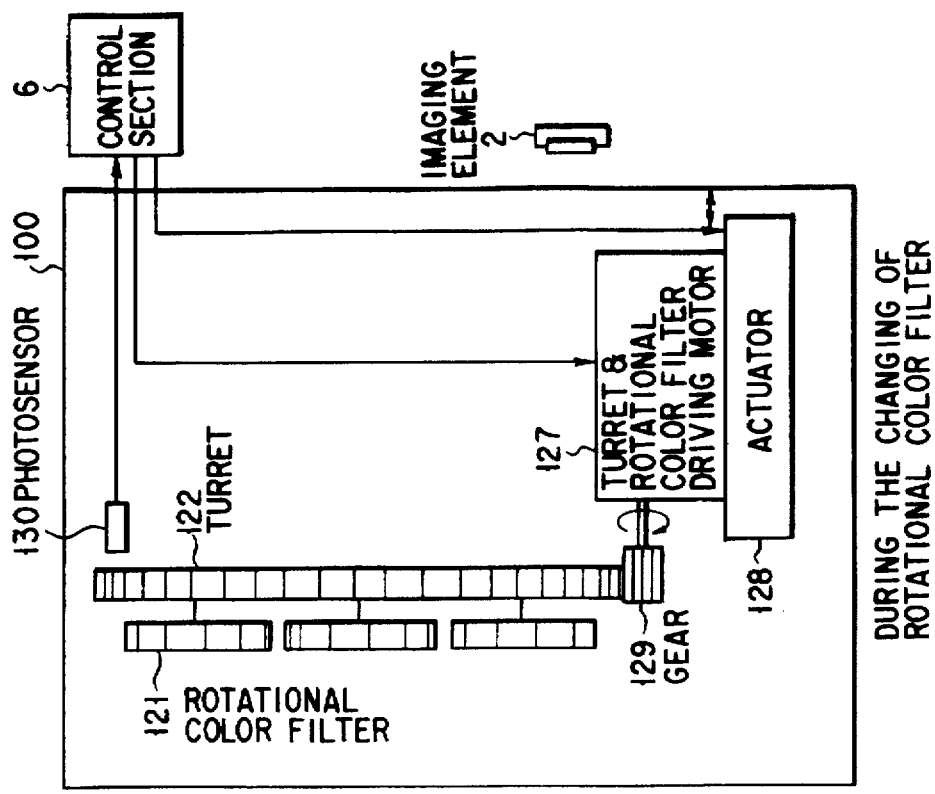
FIGS. 5A and 5B illustrate the operating conditions of the filter changing section of the second embodiment during measurement and during the changing of the rotational color filter, respectively.

Reference will now be made in detail to the presently preferred embodiments of the invention as illustrated in the accompanying drawings, in which like reference characters designate like or corresponding parts throughout the several drawings.

Hereinafter, referring to the accompanying drawings, embodiments of the present invention will be explained.

To improve the classification accuracy and give flexibility, a color classification system of the present invention is provided with a plurality of sets of rotational color filters that can be changed automatically according to a different object.

As shown in the basic configuration of FIG. 1, the color classification system comprises an optical system 1, a filter changing section 100 composed of a plurality of rotational color filters, a filter driving motor, etc., an imaging element located at the position at which an image is formed by the optical system 1, an A/D converter 3 that converts an image signal from the imaging element 2 into a digital signal, an imaging element driving circuit 4 that drives the imaging element 2, a frame memory 5 that stores the signal from the A/D converter 3, a control section 6 that controls each section, a computing circuit 7 that sorts or judges the signals from the frame memory 5, an image processing section 8 that performs a suitable image process according to the result from the computing section 7, and a display section 9 that displays the image signal from the image processing section 8 and the computation result from the computing section 7.

Concrete configurations of the filter changing section 100 will be described in each embodiment explained later.

The number of filters in the rotational color filter used in each filter changing section 100 need not be limited to the number shown in each embodiment.

The number of filters may be changed according to objects. The configuration of each section shown in FIGS. 29 and 30 and FIGS. 30A, 30B, and 30C are used as a concrete configuration of each section excluding the filter changing section 100.

(A First Embodiment)

First, the configuration of the filter changing section 100 used in a color classification system according to a first embodiment of the present invention will be explained by reference to FIGS. 2A, 2B, and 2C.

With the first embodiment, as shown in FIGS. 2A, 2B, and 2C, a plurality of sets of rotational color filters 101, 106 (in the figure, six filters), each set containing a plurality of filters having different band characteristics (in the figure, five to nine filters arranged with a specific pitch on the same circumference), are set on the same circumference with a specific pitch on a turret 102.

One of these sets is a rotational color filter 106 (test filter) for sensing the spectrum of an object.

FIGS. 2A and 2B are a side view and a front view of the filter changing section 100 of the first embodiment, and FIG. 2C is a rear view of the filter changing section looked at from the imaging element side.

The plurality of filters 101a and 106a used for the rotational color filter 101, 106 consist of band-pass filters each having a different band characteristic. The combinations of filters in the plurality of rotational color filters 101 correspond to objects.

Each of the rotational color filters 101, 106 is coupled with the turret 102 on its central axis, the tip of which is connected to a gear 103. The rotation of each gear 103 selectively causes each of the rotational color filters 101, 106 to be rotated as described later.

In the turret 102, light passing holes 104 as shown in FIG. 2C are made on the same circumference and an initial position sensing hole 105 for sensing the initial position of the turret 102 is made.

Onto the central axis of the turret, a gear 107 is coupled.

The turret 102 including such rotational color filters 101, 106 is provided within the filter changing section 100 as shown in FIG. 3A.

In the filter changing section 100 shown in FIG. 3A, the turret 102 including the rotational color filters 101 and a photosensor 108 for sensing the initial position sensing hole 105 are provided.

The filter changing section 100 further includes a turret and rotational color filter driving motor 109. A gear 110 selectively engaged with the gears 103 or 107 is connected onto the axis of rotation of the motor 109.

The turret and rotational color filter driving motor 109 is provided on an actuator 111, which enables the turret and rotational color filter driving motor 109 to move up and down, covering the central axis of the turret 102 as shown in FIG. 3B.

The turret and rotational color filter driving motor 109 and actuator 111 are controlled by a control section 6.

The signal from the photosensor 108 is sent to the control section 6.

The modules of the gears 103, 107, and 110 are assumed to coincide with each other.

Figure 23A:
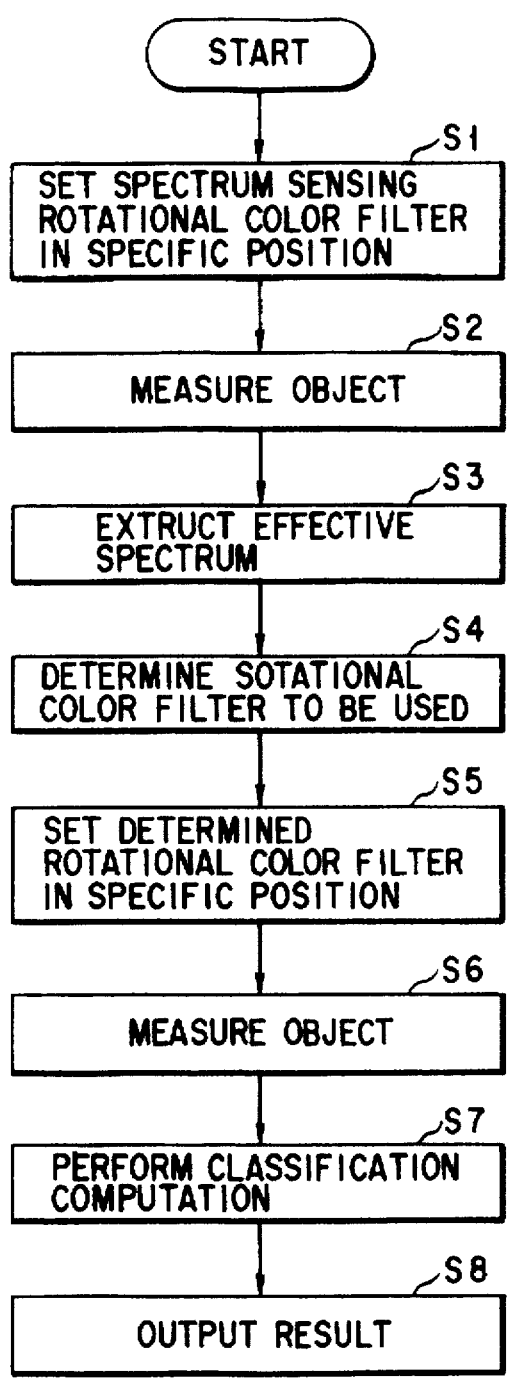
FIGS. 23A and 23B are a flowchart for measurement in the first, second, and fourth embodiments and a flowchart for measurement in the third embodiment, respectively.

The measurement of objects by the color classification system of the first embodiment thus constructed will be described by reference to FIGS. 1, 2A, 2B, 2C, 3A, and 3B and by using a flowchart shown in FIG. 23A.

First, at the beginning of measurement, the turret and rotational color filter driving motor 109 is engaged with the gear 103 extending from the rotational filter 101 or 106 as shown in FIG. 3A.

Here, the rotational color filter engaged with the motor is the object spectrum sensing rotational color filter 106 (step S1).

This state is called an initial state.

If the initial state has not been established, the control section 6 will send an instruction to the actuator 111 so that the actuator 111 may move the turret and rotational color filter driving motor 109 to a position where the gear 107 engages with the gear 110.

Next, as shown in FIG. 3B, with the gear 107 engaging with the gear 110, the turret and rotational color filter driving motor 109 will be driven until the turret 102 has been rotated to the extent that the photosensor 108 has sensed the initial position sensing hole 105 of the turret 102.

After the initial position sensing hole 105 has been sensed, the actuator 111 will move the turret and rotational color filter driving motor 109 until the gear 103 is engaged with the gear 110.

The resulting state thus obtained will be the initial state.

In the initial state, the turret and rotational color filter driving motor 109 is driven to rotate the object spectrum sensing rotational color filter 106 in such a manner that measurement is made one after another for each of the multiple filters 106a (step S2).

The measurement data is sensed by the imaging element 2, which sends the data to the computing circuit 7 via the A/D converter 3 and the frame memory 5.

The computing circuit 7 extracts the effective spectrum from the measurement data sent from the frame memory 5, determines the optimum one from the plurality of rotational color filters 101 (steps S3 and S4), and sends information on the optimum rotational color filter 101 to the control section 6.

The control section 6 sends an instruction to the filter changing section 100 to set the optimum rotational color filter 101.

Receiving the instruction from the control section 6, the actuator 111 moves the turret and rotational color filter driving motor 109 to a position where the gear 107 engages with the gear 110.

Next, as shown in FIG. 3B, with the gear 107 engaging with the gear 110, the turret and rotational color filter driving motor 109 is driven to rotate the turret 102 so that the selected rotational color filter 101 may be set at a specific position (the bottom portion in FIG. 3A) (step S5).

After the rotational color filter 101 has been set this way, the actuator 111 moves the turret and rotational color filter driving motor 109 to a position where the gear 103 engages with the gear 110 as shown in FIG. 3A, and in this state, an object is measured (step S6).

The measurement is made sequentially for each of the plurality of filters 101a as the rotational color filter 101 is rotated.

After the measurement data has been sensed by the imaging element 2 and A/D-converted, the resulting data is written into the frame memory 5. The data read from the frame memory is processed at the computing circuit 7 (steps S7 and S8).

As explained using FIGS. 29, 30, 30A, 30B, and 30C, the processes in steps S7 and S8 are the same as those disclosed in U.S. Ser. No. 08/321,667.

With the color classification system of the first embodiment, an object can be measured using a color filter having the spectral characteristic most suitable for the object by automatically changing the plurality of rotational color filters 101 according to the object.

Furthermore, with the color classification system of the first embodiment, the rotational color filters need not be removed, this saves us the trouble of changing the filter to the optimum one.

In the color classification system of the first embodiment, only one driving motor may be used both as the turret driving motor and the rotational color filter driving motor, instead of preparing these two motor, separately.

(A Second Embodiment)

Hereinafter, the configuration of a color classification system according to a second embodiment of the present invention will be described by reference to FIGS. 4A, 4B, and 4C.

With the second embodiment, as shown in FIGS. 4A, 4B, and 4C, a plurality of sets of rotational color filters 121, 124 (in the figure, six filters), each set containing a plurality of filters having different band characteristics (in the figure, four to eight filters arranged with a specific pitch on the same circumference), are set on the same circumference with a specific pitch on a turret 122.

One of these sets is an object spectrum sensing rotational color filter 124.

The periphery of each of the rotational color filters 121, 124 and turret 122 is shaped like a gear.

FIGS. 4A and 4B are a side view and a front view of the filter changing section 100 of the second embodiment, and FIG. 4C is a rear view of the filter changing section looked at from the imaging element side.

The plurality of filters 121a and 124a used for the rotational color filter 121, 124 consist of band-pass filters each having a different band characteristic. The combinations of filters in the plurality of rotational color filters correspond to objects.

Each of the rotational color filters 121, 124 is coupled with the turret 122 on its central axis.

The diameter of each of the rotational color filters 121, 124 is varied in proportion to the number of filters provided on it, so that the number of revolutions of the motor 127 (see FIGS. 5A and 5B) driving each rotational color filter need not be changed even when measurement is made with a rotational color filter having a different number of filters.

In the turret 122, light passing holes 125 as shown in FIG. 4C are made on the same circumference and an initial position sensing hole 126 for sensing the initial position of the turret 122 is made.

Figure 5A:
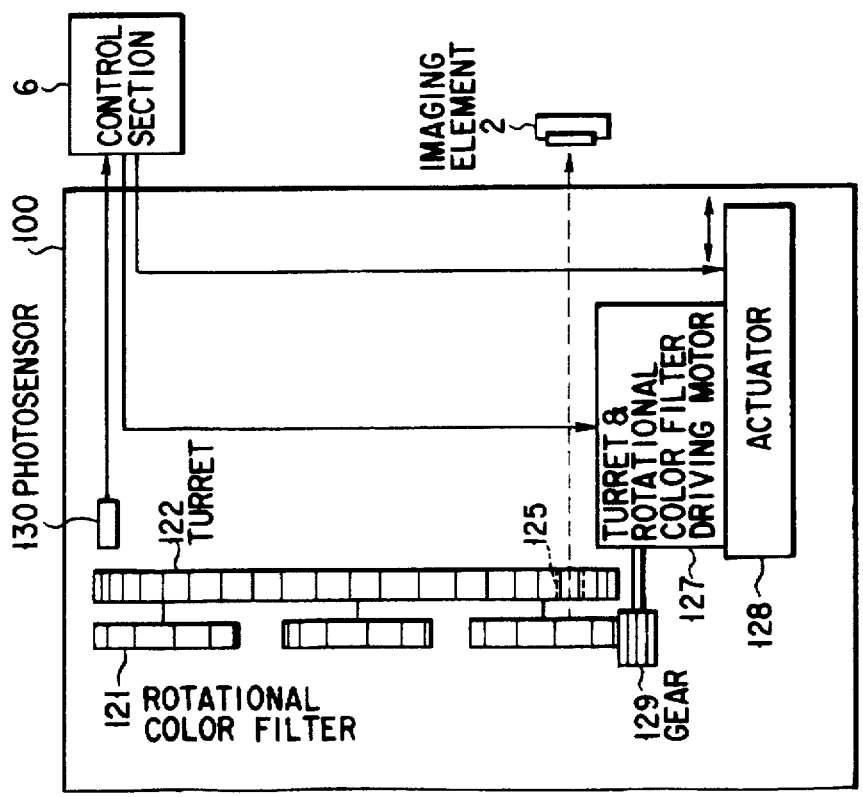

The turret 122 including the rotational color filters 121, 124 is provided within the filter changing section 100 as shown in FIG. 5A.

The turret and rotational color filter driving motor 127 having a gear 129 on its rotation axis is located on an actuator 128 and can move from right to left in FIG. 5A.

In the filter changing section, a photosensor 130 for sensing the initial position sensing hole 126 is provided.

The signal from the photosensor 130 is sent to the control section 6.

The turret and rotational color filter driving motor 127 and actuator 128 are controlled by the control section 6.

The modules of the gears of the rotational color filters 121, 124, the gear of turret 122, and the gear 129 are assumed to coincide with each other.

The measurement of objects by the color classification system of the second embodiment thus constructed will be described by reference to FIGS. 1, 4A, 4B, 4C, 5A, and 5B and by using a flowchart shown in FIG. 23A.

First, at the beginning of measurement, the gear 129 of the turret and rotational color filter driving motor 127 is engaged with the gear of the rotational color filter 121 or 124.

Here, the rotational color filter engaged with the gear of the motor is the object spectrum sensing rotational color filter 124 (step S1).

This state is called an initial state.

If the initial state has not been established, the control section 6 will send an instruction to the actuator 128 so that the actuator 128 may move the turret and rotational color filter driving motor 127 to a position where the gear 129 engages with the gear of the turret 122.

Next, as shown in FIG. 5B, with the gear of the turret 122 engaging with the gear 129 of the turret and rotational color filter driving motor 127, the turret and rotational color filter driving motor 127 will be driven until the turret 122 has been rotated to the extent that the photosensor 130 has sensed the initial position sensing hole 125 of the turret 122.

After the initial position sensing hole 125 has been sensed, the actuator 128 will move the turret and rotational color filter driving motor 127 until the gear 129 is engaged with the gear of the object spectrum sensing rotational color filter 124.

The resulting state thus obtained will be the initial state.

In the initial state, the turret and rotational color filter driving motor 127 is driven to rotate the object spectrum sensing rotational color filter 124 so as to make measurements as in the first embodiment (step S2).

The measurement data is sensed by the imaging element 2, which sends the data to the computing circuit 7 via the A/D converter 3 and the frame memory 5.

The computing circuit 7 extracts the effective spectrum from the measurement data sent from the frame memory 5, determines the optimum one from the plurality of rotational color filters 121 (steps S3 and S4), and sends information on the optimum rotational color filter 121 to the control section 6.

The control section 6 sends an instruction to the filter changing section 100 to set the optimum rotational color filter 121.

Receiving the instruction from the control section 6, the actuator 128 moves the turret and rotational color filter driving motor 127 to a position where the gear 129 engages with the gear of the turret 122.

Next, as shown in FIG. 5B, with the gear of the turret 122 engaging with the gear 129 of the turret and rotational color filter 127, the turret and rotational color filter driving motor 137 is driven to rotate the turret 122 so that the selected optimum rotational color filter 121 may be set at a specific position (the bottom portion in FIG. 5A) (step S5).

After the optimum rotational color filter 121 has been set this way, the actuator 128 moves the turret and rotational color filter driving motor 127 to a position where the gear 129 engages with the gear of the rotational color filter 121 as shown in FIG. 5A, and in this state, an object is measured as in the first embodiment (step S6).

After the measurement data has been sensed by the imaging element 2 and A/D-converted, the resulting data is written into the frame memory 5. The data read from the frame memory is processed at the computing circuit 7 (steps S7 and S8).

As explained using FIGS. 29, 30, 30A, 30B, and 30C, the processes in steps S7 and S8 are the same as those disclosed in U.S. Ser. No. 08/321,667.

As described above, with the color classification system of the second embodiment, an object can be measured using a color filter having the spectral characteristic most suitable for the object by automatically changing the rotational color filters 121 according to the object, resulting in an increase in the classification accuracy.

Furthermore, with the color classification system of the second embodiment, the rotational color filters need not be removed, this saves us the trouble of changing the filter to the optimum one.

In the color classification system of the second embodiment, only one driving motor may be used both as the turret driving motor and the rotational color filter driving motor, instead of preparing these two motor separately.

Since the diameter of each rotational color filter 121 is changed according to the number of filters provided on the rotational color filter 121, measurement can be made without changing the number of revolutions of the driving motor, even when measurement is made with a different rotational color filter.

Next, as a modification of the second embodiment, a case where the turret is not shaped like a gear will be described by reference to FIGS. 6A, 6B, and 6C and FIGS. 7A and 7B.

With a modification of the second embodiment, as shown in FIGS. 4A, 4B, and 4C, a plurality of sets of rotational color filters 131, 134 (in the figure, six filters), each set containing a plurality of filters having different band characteristics (in the figure, four to eight filters arranged with a specific pitch on the same circumference), are set on the same circumference with a specific pitch on a turret 132.

One of these sets is an object spectrum sensing rotational color filter 134.

The periphery of each of the rotational color filters 131 and 134 is shaped like a gear.

FIGS. 6A and 6B are a side view and a front view of the filter changing section 100 of the modification of the second embodiment, and FIG. 6C is a rear view of the filter changing section looked at from the imaging element side.

The plurality of filters 131a and 134a used for the rotational color filter 131, 134 include band-pass filters each having a different band characteristic. The combinations of filters in the plurality of rotational color filters correspond to objects.

Each of the rotational color filters 131, 134 is coupled with the turret 132 on its central axis.

In the turret 132, light passing holes 135 as shown in the figure are made on the same circumference and an initial position sensing hole 132 for sensing the initial position of the turret 132 is made.

The turret 132 including the rotational color filters 131, 134 is provided within the filter changing section 100 as shown in FIG. 7A.

The rotation axis of the turret driving motor 137 is connected directly to the central axis of the turret 132 so that the turret driving motor 137 may rotate the turret 132.

On the rotation axis of the rotational color filter driving motor 139, a gear 140 is provided.

In the filter changing section, a photosensor 138 for sensing the initial position sensing hole 135 of the turret 132 is provided.

The signal from the photosensor 138 is sent to the control section 6.

The turret driving motor 137 and rotational color filter driving motor 139 are controlled by the control section 6.

The diameter of each of the rotational color filters 131, 134 is changed according to the number of filters provided on it, making it unnecessary to change the number of revolutions of the motor 139 (see FIGS. 7A and 7B) driving each rotational color filter, even when measurement is made with a different rotational color filter.

The modules of the gear 140 on the rotation axis of the rotational color driving motor 139, and the gears of the rotational color filters 131, 134 are assumed to coincide with each other.

The measurement of objects by the color classification system of the modification of the second embodiment thus constructed will be described by reference to FIGS. 1, 6A, 6B, 6C, 7A, and 7B and by using a flowchart shown in FIG. 23A.

First, at the beginning of measurement, the gear 140 on the rotation axis of the rotational color filter driving motor 139 is engaged with the gear of the rotational color filter 131 or 134 as shown in FIG. 7A.

Here, the rotational color filter engaged with the gear of the motor is the object spectrum sensing rotational color filter 134 (step S1).

This state is called an initial state.

If the initial state has not been established, the control section 6 will send an instruction so that the turret driving motor 137 may rotate the turret 132 until the object spectrum sensing rotational color filter 134 has reached a specific position (the bottom portion in FIG. 7A).

This is a place where the photosensor 138 senses the initial position sensing hole 135 of the turret 132.

The resulting state thus obtained will be the initial state.

In the initial state, the rotational color filter driving motor 139 is driven to rotate the object spectrum sensing rotational color filter 134 so as to make measurements as in the first embodiment (step S2).

The measurement data is sensed by the imaging element 2, which sends the data to the computing circuit 7 via the A/D converter 3 and the frame memory 5.

The computing circuit 7 determines the optimum rotational color filter 131 from the measurement data sent from the frame memory 5 and sends information on the optimum rotational color filter 131 to the control section 6 (steps S3 and S4).

The control section 6 sends a signal to the filter changing section 100 to set the optimum rotational color filter 131.

Receiving the instruction from the control section 6, the filter changing section 100 rotates the driving turret 132 via the turret driving motor 137 to set the selected rotational color filter 131 at a specific position (the bottom portion in FIG. 7A) (step s5).

After the optimum rotational color filter 131 has been set this way, the gear 140 is engaged with the gear of the selected rotational color filter 131 as shown in FIG. 7A.

In this state, as the rotational color filter 131 is rotated, an object is measured as in the first embodiment (step S6).

After the measurement data has been sensed by the imaging element 2 and A/D-converted, the resulting data is written into the frame memory 5. The data read from the frame memory is processed at the computing circuit 7 (steps S7 and S8).

As explained using FIGS. 29, 30, 30A, 30B, and 30C, the processes from this time on are the same as those disclosed in U.S. Ser. No. 08/321,667.

As described above, with the modification of the second embodiment, an object can be measured using a filter having the spectral characteristic most suitable for the object by automatically changing the rotational color filters 131 according to the object, resulting in an increase in the classification accuracy.

Furthermore, with the modification of the second embodiment, the rotational color filters need not be removed, this saves us the trouble of changing the filter.

Still furthermore, with the modification of the second embodiment, since the driving motor need not be moved and the diameter of each rotational color filter is changed according to the number of filters on it, measurements can be made without changing the number of revolutions of the driving motor, even when measurements are made with a different rotational color filter.

(A Third Embodiment)

The configuration of a filter changing section 100 used in a color classification system according to a third embodiment of the present invention will be described by reference to FIGS. 8A and 8B.

In the third embodiment, a rotational color filter 150 as shown in FIGS. 8A and 8B is used.

At the rotational color filter 150, a large number of filters 150a are set radially.

A filter set most suitable for each object is provided on the same circumference having a specific distance from the center of the rotational color filter 150.

The outermost filter 150a group is an object spectrum sensing filter set.

When the rotational color filter 150 is rotated, the filter set is changed by changing the distance between the imaging element 2 and the center of the rotational color filter 150. The number of filter sets may not be the same.

Figure 9B:
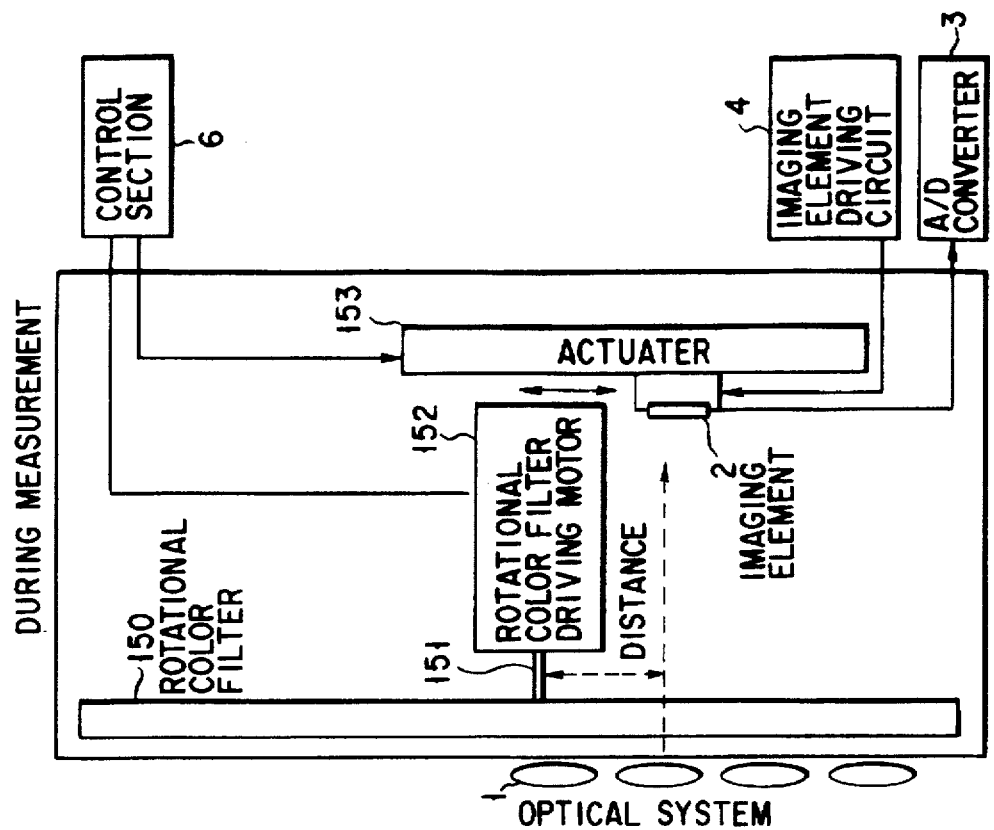
FIGS. 9A and 9B illustrate the operating conditions of the filter changing section of the third embodiment during the selection of the rotational color filter and during measurement, respectively.
Figure 9A:
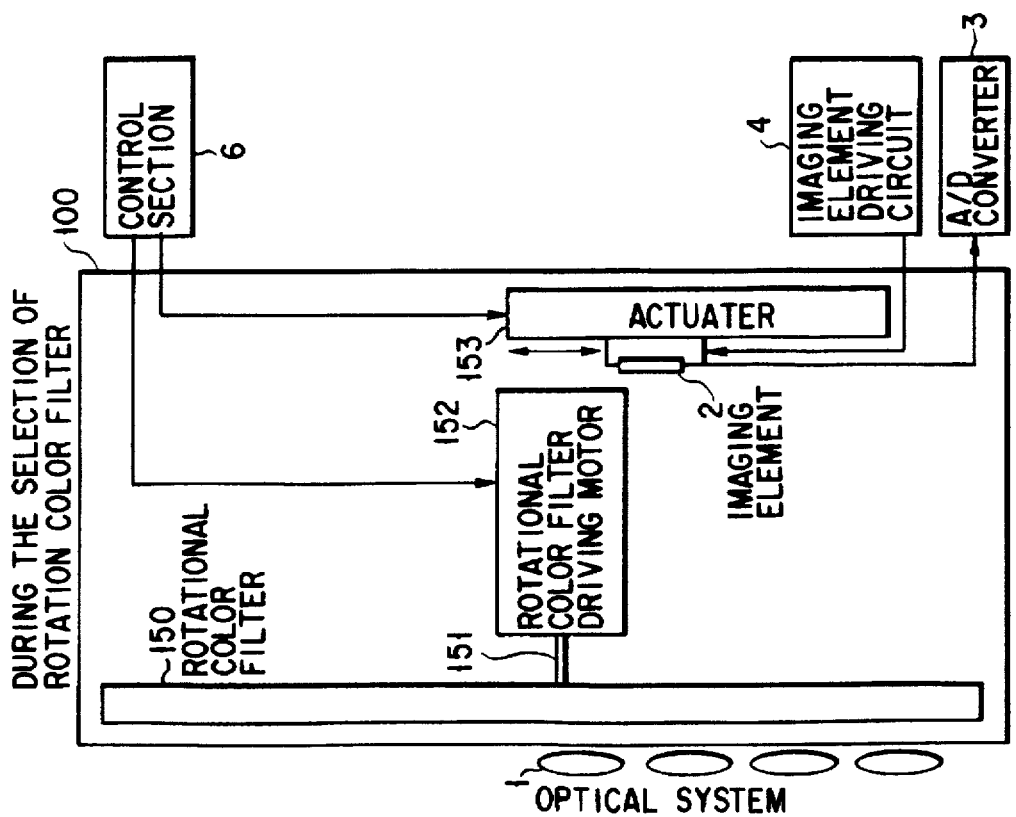

The rotational color filter is provided in the filter changing section 100 as shown in FIG. 9A.

The central axis 151 of the rotational color filter 150 is connected directly to the rotation axis of a rotational color filter driving motor 152, which rotates the rotational color filter 150.

The image element 2, which is located outside the filter changing section 100 in the first and second embodiments, is provided on an actuator 153 and can be moved up and down in FIG. 9A.

Figure 23B:
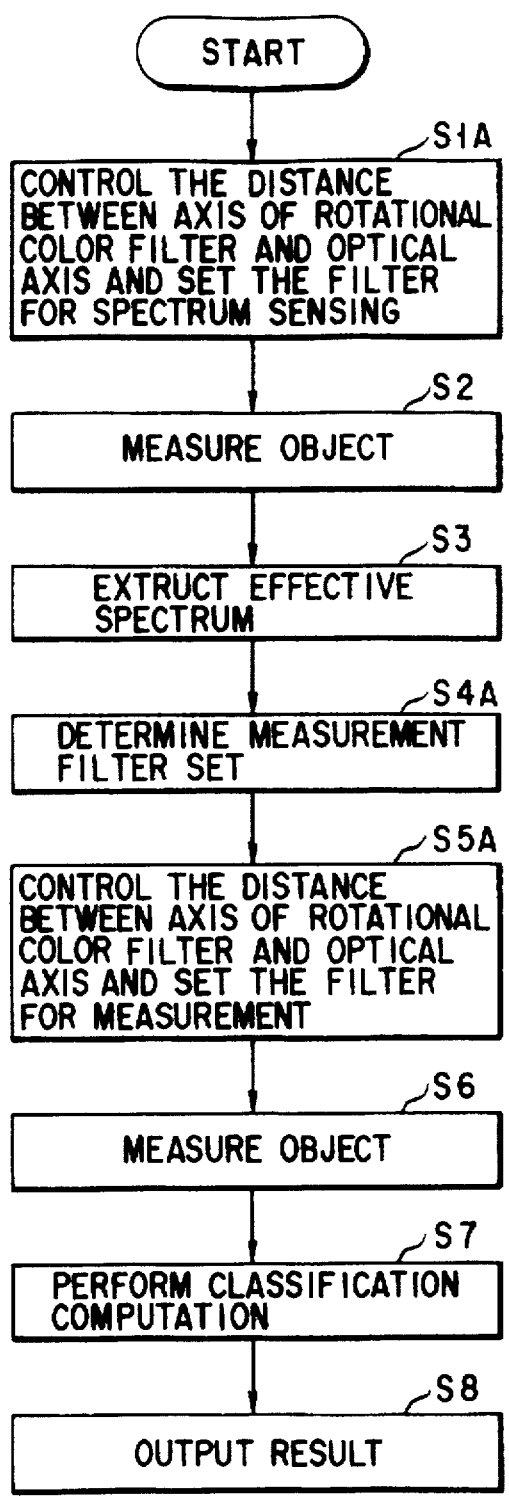

The measurement of objects by the color classification system of the third embodiment thus constructed will be described by reference to FIG. 1, FIGS. 8A and 8B, FIGS. 9A and 9B, and by using a flowchart shown in FIG. 23B.

First, the imaging element 2 is set at the bottom portion by the actuator 153 (step S1A). This state is called an initial state.

If the initial state has not been established, the control section 6 will control the actuator 153 to set the imaging element 2 at the bottom portion.

In this state, as the rotational color filter 150 is rotated by the rotational color filter driving motor 152, measurements are made as in the first embodiment (step S2).

In the measurement, the light from the object passes through an optical system 1 and the filter 150a and is sensed by the imaging element 2.

In this case, the optical system 1 is provided with lens groups corresponding to the individual filter sets.

The measurement data is sensed by the imaging element 2, which sends the data to the computing circuit 7 via the A/D converter 3 and the frame memory 5.

The computing circuit 7 determines the optimum filter set (the distance from the central axis of the rotational color filter) from the measurement data sent from the frame memory 5 and sends information on the optimum filter set to the control section 6 (steps S3 and S4A).

The control section 6 sends an instruction signal to the filter changing section 100 to set the filter set.

Receiving the instruction signal, the filter changing section 100 controls the actuator 153 to set the imaging element 2 at a specific position as shown in FIG. 9B (step S5A).

In this state, measurement is made (step S6).

After the measurement data has been sensed by the imaging element 2 and A/D-converted, the resulting data is written into the frame memory 5. The data read from the frame memory is processed at the computing circuit 7 (steps S7 and S8).

As explained using FIGS. 29, 30, 30A, 30B, and 30C, the processes from this time on are the same as those disclosed in U.S. Ser. No. 08/321,667.

The filter set may be changed by fixing the imaging element 2 and moving the rotational color filter driving motor.

Figure 10B:
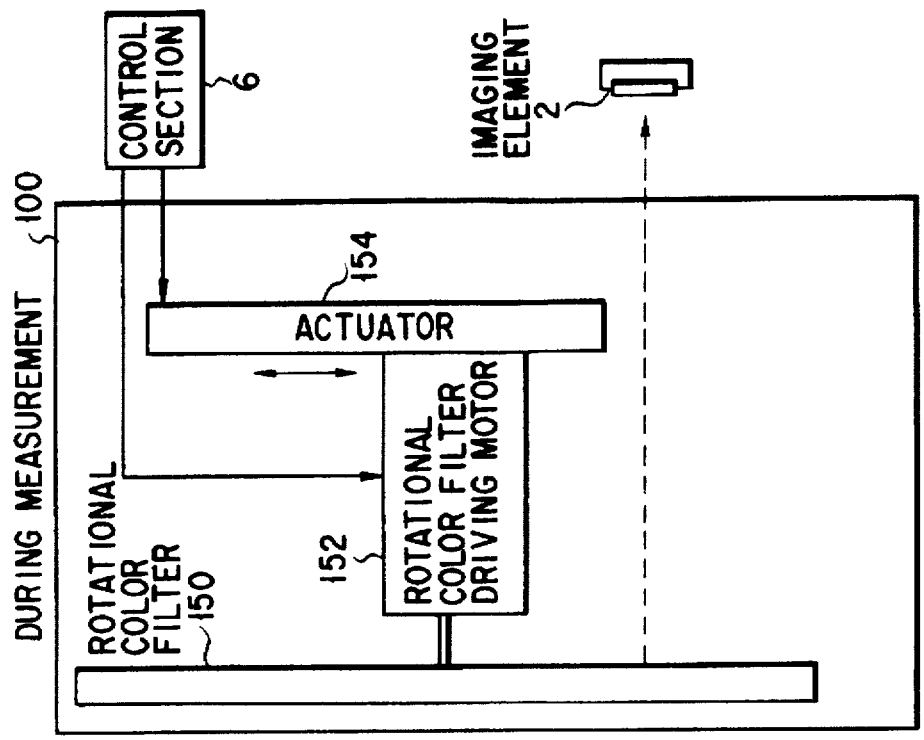
FIGS. 10A and 10B illustrate the operating conditions of a modification of the filter changing section of the third embodiment during the selection of the rotational color filter and during measurement, respectively.
Figure 10A:
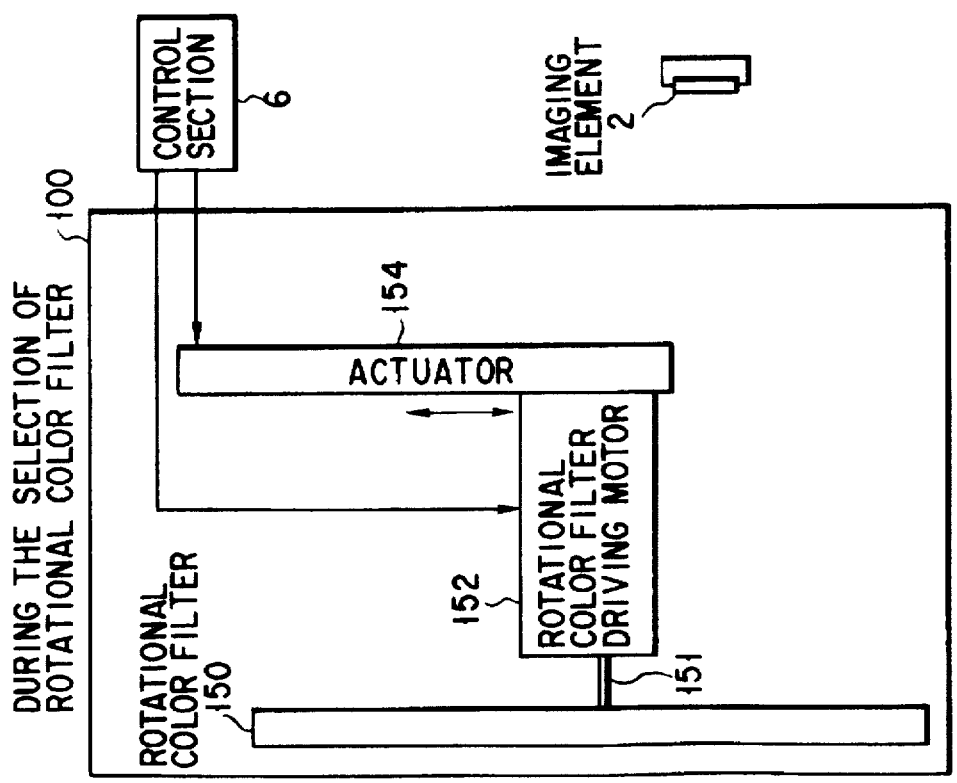

In this case, as shown in FIGS. 10A and 10B, the central axis 151 of the rotational color filter 150 is connected directly to the rotation axis of the rotational color filter driving motor 152, which rotates the rotational color filter 150.

The driving motor 152 is on the actuator 154 and can be moved up and down in FIGS. 10A and 10B. The rotational color filter 150 is designed to move up and down together with the driving motor 152 in FIGS. 10A and 10B.

The measurement of objects by the color classification system of a modification of the third embodiment thus constructed will be described by reference to FIG. 1, FIGS. 8A and 8B, FIGS. 10A and 10B, and by using a flowchart shown in FIG. 23B.

First, the actuator 154 sets the rotational color filter driving motor 152 at the top portion for spectrum sensing (step S1A).

This state is called an initial state.

If the initial state has not been established, the control section 6 will control the actuator 154 to set the rotational color filter 152 at the top portion.

In this state, as the rotational color filter 150 is rotated by the rotational color filter driving motor 152, measurements are made as in the first embodiment (step S2).

In the measurement, the light from the object passes through the optical system 1 and the filter 150a and is sensed by the imaging element 2.

The measurement data is sensed by the imaging element 2, which sends the data to the computing circuit 7 via the A/D converter 3 and the frame memory 5.

The computing circuit 7 extracts the effective spectrum from the measurement data sent from the frame memory 5 and determines the optimum filter set (the distance from the central axis of the rotational color filter) and sends information on the optimum filter set to the control section 6 (steps S3 and S4A).

The control section 6 sends a signal to the filter changing section 100 to set the filter set.

Receiving the signal, the filter changing section 100 controls the actuator 154 to set the rotational color filter driving motor 152 at a specific position (step S5A). In this state, measurement is made (step S6).

As explained using FIGS. 29, 30, 30A, 30B, and 30C, the processes from this time on are the same as those disclosed in U.S. Ser. No. 08/321,667 (steps S7 and S8).

As described above, with the modification of the third embodiment, an object can be measured using a filter having the spectral characteristic most suitable for the object by automatically changing the filter set according to the object, resulting in an increase in the classification accuracy.

Furthermore, with the modification of the third embodiment, the rotational color filter need not be removed, this saves us the trouble of changing the filter. A filter set having a different number of filters can be set on the same rotational color filter.

(A Fourth Embodiment)

The configuration of a filter changing section 100 used in a color classification system according to a fourth embodiment of the present invention will be explained by reference to FIGS. 11A and 11B.

In the fourth embodiment, as shown in FIGS. 11A and 11B, the individual rotational color filters 161 are housed in a housing magazine 162.

The housing magazine 162 is designed as shown in FIG. 11A.

FIG. 11A is a front view of the housing magazine 162 and FIG. 11B shows a rotational color filter 161.

A plurality of grooves (not shown) are cut in the top and bottom inner walls of the housing magazine 162. In the grooves, a plurality of rotational color filters 161 are housed.

At the top portion of the housing magazine 162, there is a tooth impression 162a, whose module coincides with the module of a housing magazine moving gear 164.

The rotation of the housing magazine moving gear 164 causes the housing magazine 162 to move.

A rotational color filter outlet 163 is at the side of the housing magazine 162.

Outside the housing magazine 162, arms 165-a and 165-b for taking out a rotational color filter 161 from the housing magazine 162 are provided on both sides in such a manner that the arms can expand and contract as shown in the figure. The arms 165-a and 165-b are controlled by actuators 166-a and 166-b, respectively.

The arms 165-a, 165-b are used to take out or house a rotational color filter 161 from or in the housing magazine 162.

Arc-like grooves 165-c and 165-d for holding the rotational color filter 161 are cut in the tips of the arms 165-a, 165-b.

The configuration of the filter changing section 100 including the housing magazine 162 will be described by reference to FIGS. 12A and 12B.

The housing magazine 162 and its vicinity are as shown in FIGS. 12A and 12B. Specifically, a magazine select driving section 167 is connected to the housing magazine moving gear 164 and a gear 169 is connected onto the rotation axis of a rotational color filter driving motor 168.

The actuators 166-a, 166-b, magazine select driving section 167, and rotational color filter driving motor 168 are controlled by the signals from the control section 6.

The measurement of objects by the color classification system of the fourth embodiment thus constructed will be described by reference to FIG. 1, FIGS. 11A and 11B, FIGS. 12A and 12B, and by using a flowchart shown in FIG. 23A.

First, the magazine select driving section 167 moves the housing magazine 162 so that an object spectrum sensing rotational color filter 161 may correspond to the outlet 163, and in this state, takes out the object spectrum sensing rotational color filter 161 by means of the arm 165 (the state in FIG. 12B).

In this state, a gear 170 on the central axis of the rotational color filter 161 is engaged with the gear 169 of the rotational color filter driving motor 168.

The modules of these gears are assumed to coincide with each other.

In the initial state, as the rotational color filter 161 is rotated by the rotational color filter driving motor 168, an object is measured as in the first embodiment (steps S1, S2).

The measurement data is sensed by the imaging element 2, which sends the data to the computing circuit 7 via the A/D converter 3 and the frame memory 5.

The computing circuit 7 extracts the effective spectrum from the measurement data sent from the frame memory 5 and determines the optimum rotational color filter 161 (steps S3 and S4) and sends information on the optimum rotational color filter 161 to the control section 6, which sends a signal to the filter changing section 100 to take out the rotational color filter 161.

Receiving the signal, the filter changing section 100 controls the actuators 166-a, 166-b, and the magazine select driving section 167 and houses the object spectrum sensing rotational color filter 169 in the housing magazine 162. Thereafter, the filter changing section takes out the selected rotational color filter 161 from the housing magazine 162 in the same procedure as described above and measures the object (steps S5 and S6).

As explained using FIGS. 29, 30, 30A, 30B, and 30C, the processes from this time on are the same as those disclosed in U.S. Ser. No. 08/321,667 (steps S7 and S8).

As described above, with the color classification system of the fourth embodiment, an object can be measured using a filter having the spectral characteristic most suitable for the object by automatically changing the rotational color filter according to the object, resulting in an increase in the classification accuracy.

Furthermore, with the color classification system of the fourth embodiment, the rotational color filter need not be removed, this saves us the trouble of changing the filter. Unlike the first embodiment, the fourth embodiment uses no turret, making the system more compact.

(A Fifth Embodiment)

The configuration of a filter changing section 100 used in a color classification system according to a fifth embodiment of the present invention will be explained by reference to FIG. 13.

The configuration of the fifth embodiment is almost the same as that of the fourth embodiment except that a rotational color filter 161 of the fourth embodiment are replaced by a single filter 161A.

Because in the fifth embodiment, a rotational color filter 161 is replaced by a single filter 161A, the system is more compact.

The measurement of objects by the color classification system of the fifth embodiment thus constructed will be described by reference to FIG. 1 and FIG. 13, and by using a flowchart shown in FIG. 24A.

First, the control section 6 controls the magazine select section 180 and actuators 166-a, 166-b to take out the filter 161A from the housing magazine 162.

Then, using the filter 161A taken out of the housing magazine 162, the object is measured.

The measurements are made sequentially for a preset filter set and the measurement of the object is finished (steps S11 to S15).

That is, as the object sensing filters 161 A are taken out one by one from the filters 161A set in the housing magazine 162, measurements are made.

The measurement data is sensed by the imaging element 2, which sends the data to the computing circuit 7 via the A/D converter 3 and the frame memory 5.

The computing circuit 7 extracts the effective spectrum from the measurement data sent from the frame memory 5 and determines the optimum filter (steps S16 and S17) and sends information on the optimum filter to the control section 6.

The control section 6 sends a signal to the filter changing section 100 to set the filter.

Receiving the signal, the filter changing section 100 controls the actuators 166-a, 166-b, and the magazine select driving section 180 to house the object sensing filter set in the housing magazine 162. Thereafter, the filter changing section takes out filters from the preset filter set one by one and measures the object (steps S18 to S22).

As explained using FIGS. 29, 30, 30A, 30B, and 30C, the processes from this time on are the same as those disclosed in U.S. Ser. No. 08/321,667 (steps S23 and S24).

In the flowchart of FIG. 24, it is assumed that the number of filters necessary for spectrum sensing is n and its variable is i (the same holds hereinafter).

As described above, with the color classification system of the fifth embodiment, an object can be measured using a filter having the spectral characteristic most suitable for the object by automatically changing the combination of filters according to the object, resulting in an increase in the classification accuracy.

Furthermore, the color classification system of the fifth embodiment can be applied to not only a filter set having a different number of filters but also an unknown object. Unlike the first embodiment, the fifth embodiment uses no turret, making the system more compact.

(A Sixth Embodiment)

Figure 14:
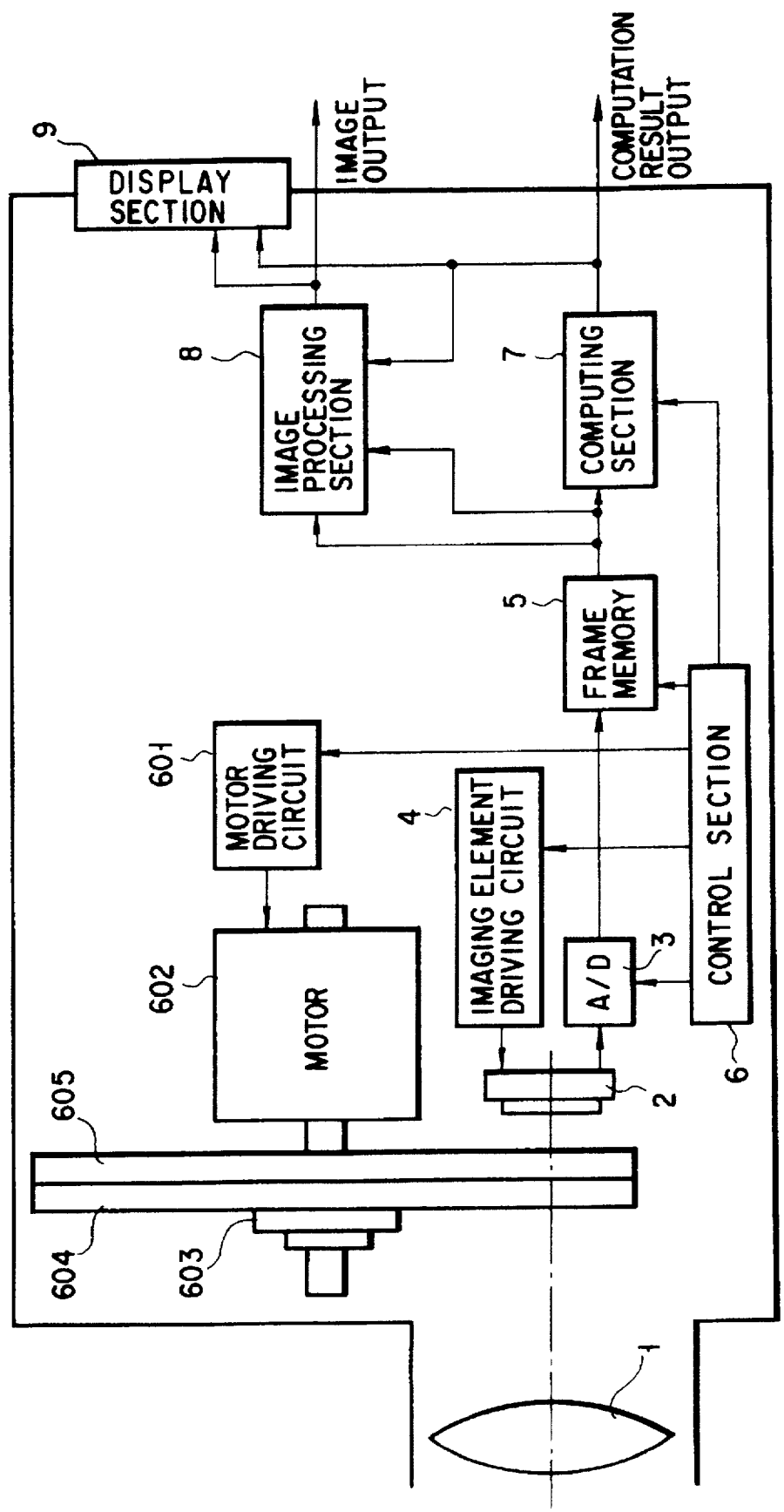
FIG. 14 shows the configuration of a color classification system according to a sixth embodiment of the present invention.

Now, the configuration of a color classification system according to a sixth embodiment of the present invention will be explained by reference to FIG. 14.

The sixth embodiment comprises: an optical system 1; a solid-state imaging element 2 located at the image forming position of the optical system; rotational color filters 605, 604 located between the imaging element and the optical system; a clamp 603 that secure two rotational color filters, a motor 602 that rotates the rotational color filters; a motor driving circuit 601 that drives the motor; an imaging element driving circuit 4 that drives the solid-state imaging element; an A/D converter 3 that converts the image signal from the imaging element into a digital signal; a frame memory 5 that stores the signal from the A/D converter 3; a computing section 7 that classifies or judges the signal from the frame memory 5; an image processing section 8 that effects a suitable image processing on the basis of the result from the computing section 7; a display section 9 that displays the image signal from the image processing section 8 and the computation result from the computing section 7; and a control section 6 that controls each section.

Figure 15A:
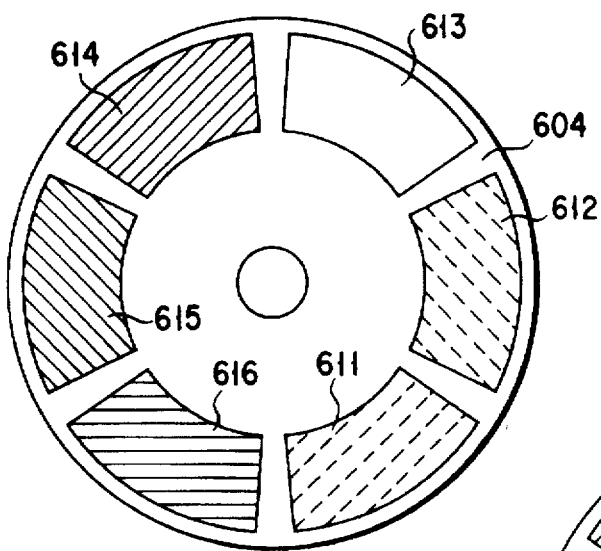
FIGS. 15A, 15B, and 15C illustrate the connection relationship between the rotational color filter and the motor as a concrete example of members used in the sixth embodiment.
Figure 15B:
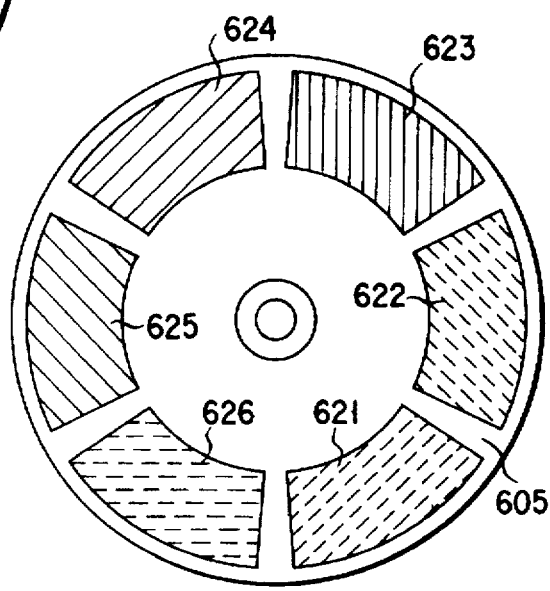

Explanation of the rotational color filters 604 and 605 will be given by reference to FIGS. 15A and 15B.

The rotational color filter 604, which has a hole made in its center, is provided with optical filters 611, 612, ... , 616.

Similarly, the rotational color filter 605, which has a hole made in its center with the periphery of the hole projecting cylindrically, is provided with optical filters 621, 622, ... , 626.

The hole of the rotational color filter 605 is for installation on the shaft of the motor 602. The center hole of the rotational color filter 604 is for installation on the projecting cylindrical portion of the rotational color filter 605.

Figure 15C:
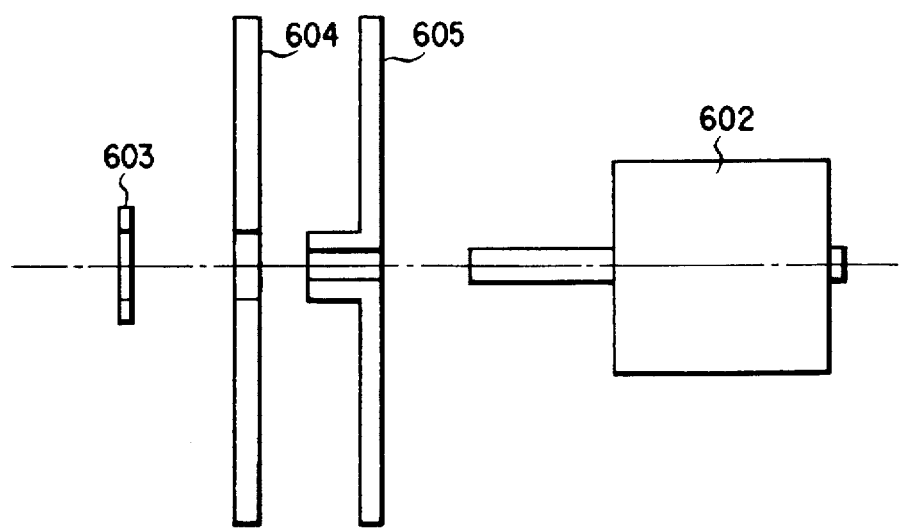

As shown in FIG. 15C, the rotational color filter 604 is installed together with the rotational color filter 605 by means of the clamp 603, with these two filters sharing the same axis.

The installation may be such that the cylindrical portion of the rotational color filter 605 and the clamp are threaded and the rotational color filter 604 is fastened by the clamp 603 or that the clamp 603 and the rotational color filters 604, 605 are tightened with screws.

The optical filters 611, 612, ... , 616 of the rotational color filter 604 are secured at such positions as correspond to the optical filters 621, 622, ... , 626 of the rotational color filter 605.

As the rotational color filters 605, 604 thus constructed are rotated in front of the solid-state imaging element 2, the image signals having the spectrums of the characteristics obtained from the combinations of the optical filters 611, 612, ... , and 616, 621, 622, ... , 626 form images on the solid-state imaging element 2.

The signals obtained from the images formed on the solid-state imaging element 2 are processed as in the embodiments described above. The processing result is allowed to appear on the display section 9.

The optical filters used for the rotational color filters 604 and 605 will be described by reference to FIGS. 16A to 16H.

A short-wavelength cut filter having the characteristic as shown in FIG. 16A is used as the optical filter 611 of the rotational color filter 604.

Similarly, it is assumed that the optical filter 612 has the characteristic 632, the optical filter 613 has the characteristic 633, the optical filter 614 has the characteristic 634, and the optical filter 615 has the characteristic 635.

Transparent glass is used for the optical filter 616.

A long-wavelength cut filter having the characteristic as shown in FIG. 16B is used as the optical filter 621 of the rotational color filter 605.

Similarly, it is assumed that the optical filter 622 has the characteristic 637, the optical filter 623 has the characteristic 638, the optical filter 624 has the characteristic 639, and the optical filter 625 has the characteristic 640.

Transparent glass is used for the optical filter 626.

By fixing the rotational color filters 604 and 605 together so that the filter 611 and the filter 621 may be located in the same position, an image with the spectrum having the characteristics 641, 642, ... , 645 as shown in FIG. 16C is obtained.

By placing the filter 611 and the filter 622 in the same position, an image with the spectrum having the characteristics 650, 648, 647, 652, 635, 636 is obtained.

Similarly, by placing the filter 611 and the filter 623 in the same position, an image with the spectrum having the characteristics 646, 651, 649, 634, 637 is obtained.

Furthermore, by placing the filter 611 and the filter 624 in the same position, an image with the spectrum having the characteristics 653, 656, 633, 638 is obtained.

As described above, by combining two filers, data items having various spectral characteristics can be obtained (FIGS. 16D to 16H).

In this case, combinations of ten filters provide a maximum of 24 spectral characteristics.

Figure 24A:
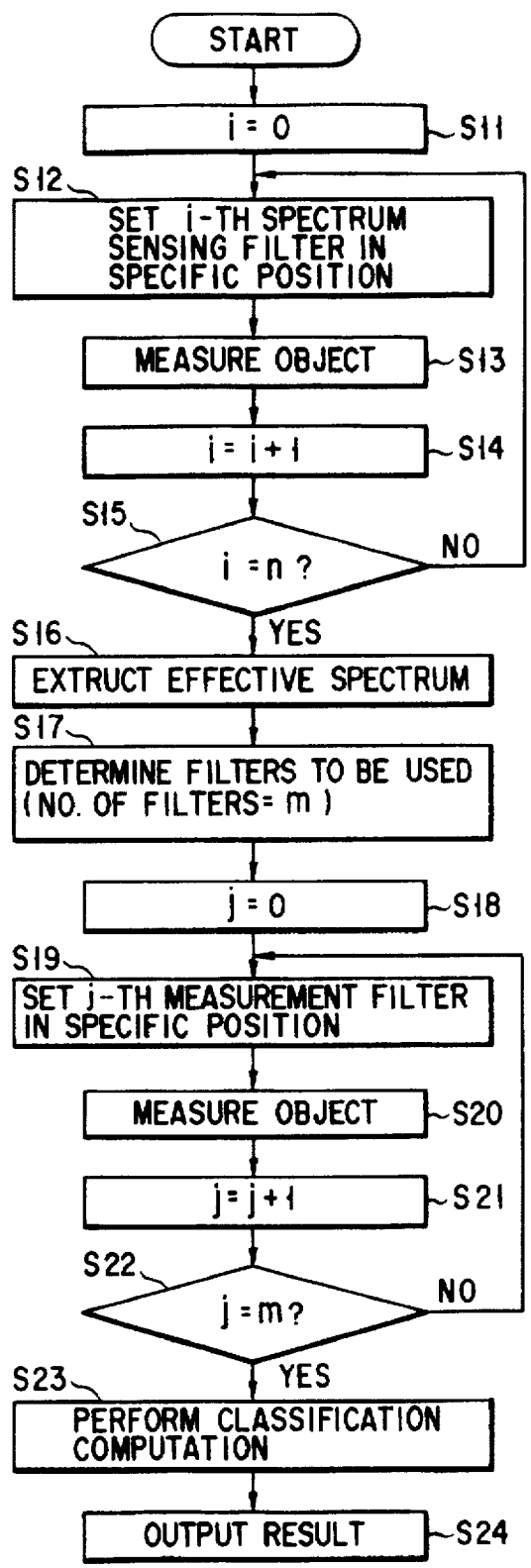
FIGS. 24A and 24B are a flowchart for measurement in the fifth embodiment and a flowchart for measurement in the sixth and seventh embodiments, respectively.
Figure 24B:
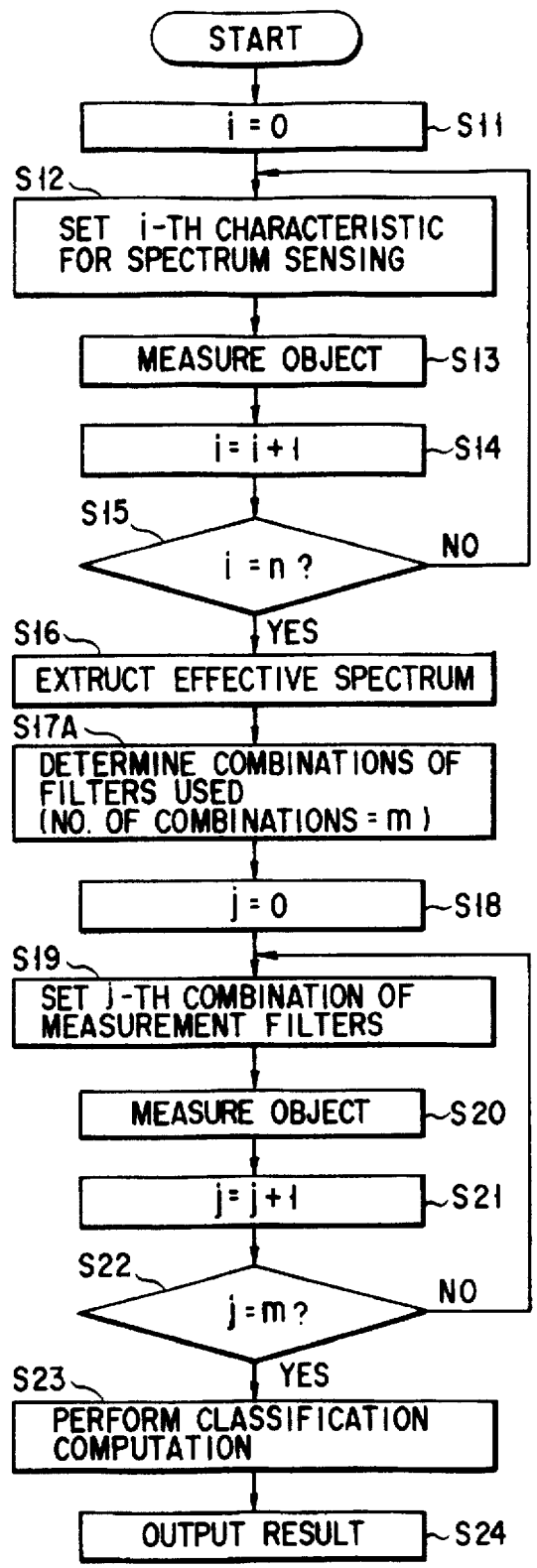
Figure 27:
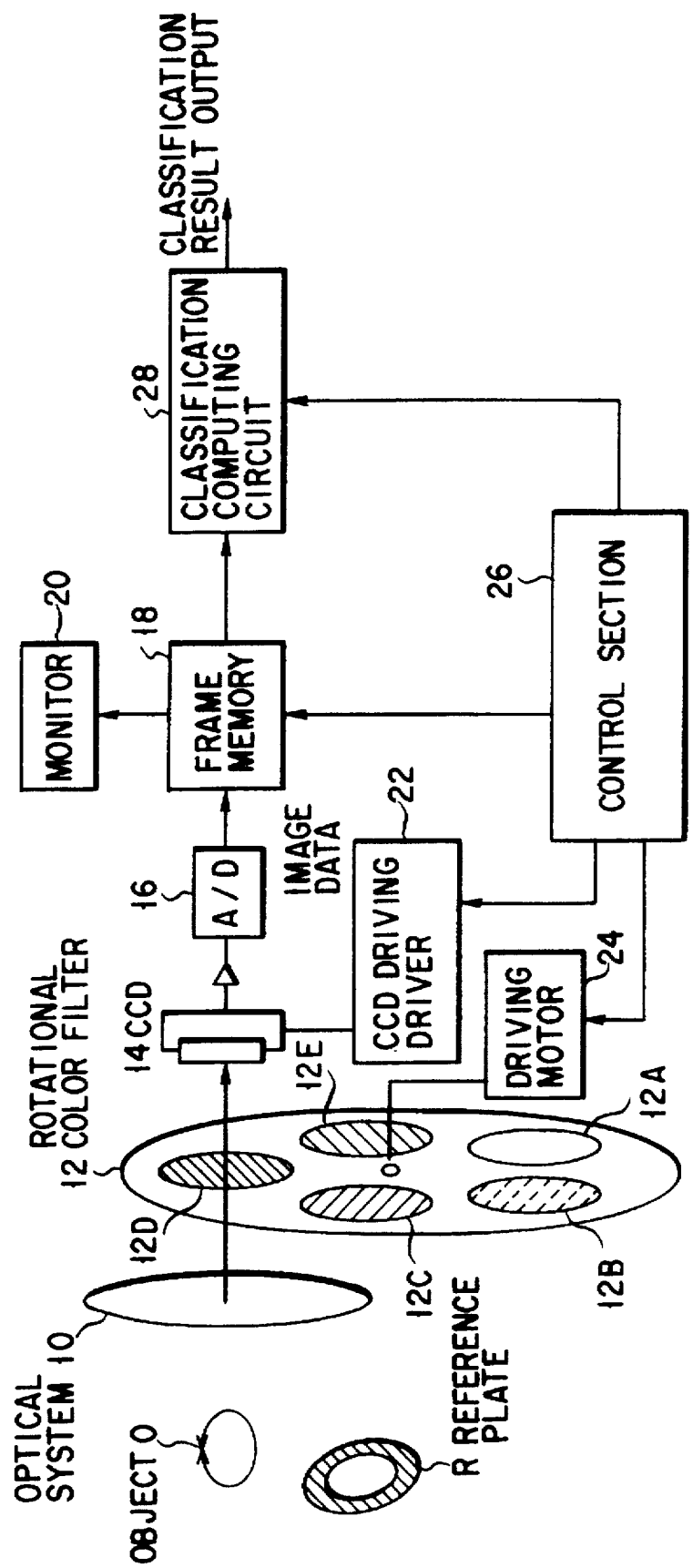
FIG. 27 shows the configuration of a color classification system related to a prior application against the present application.
Figure 28A:
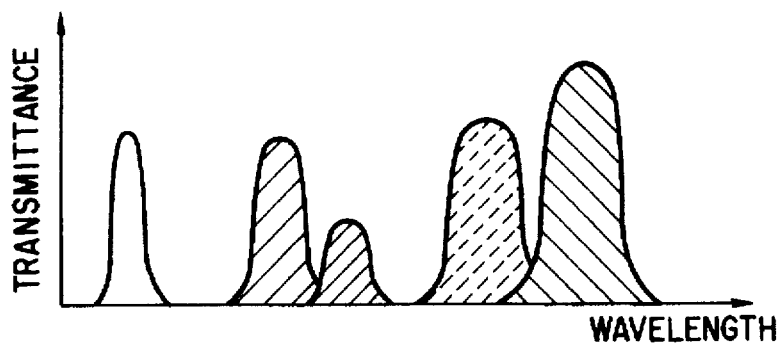
FIGS. 28A, 28B, and 28C show the characteristics of a plurality of band-pass filters used for a rotational color filter used in the color classification system in the prior application and the configuration of the rotational color filter.
Figure 28B:
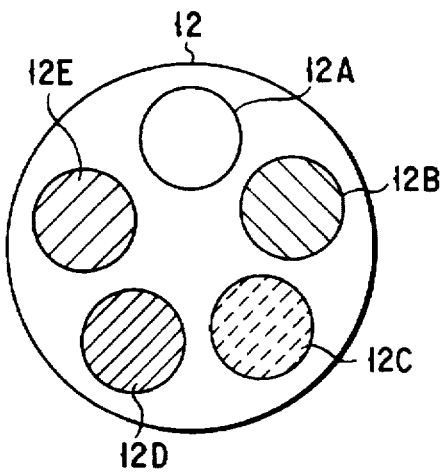
Figure 28C:
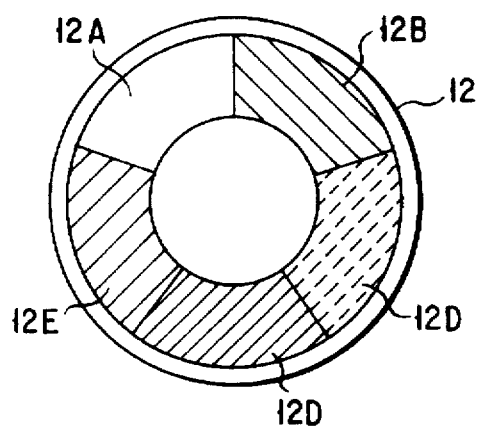
Figure 29:
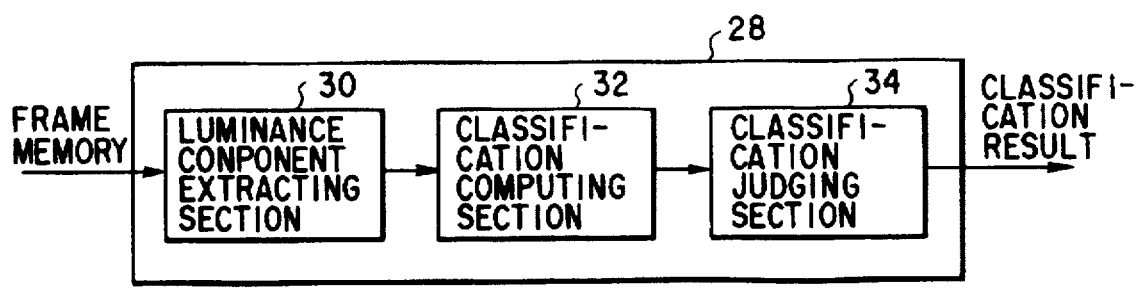
FIG. 29 is a block diagram of the classification computing circuit of FIG. 27.
Figure 30:
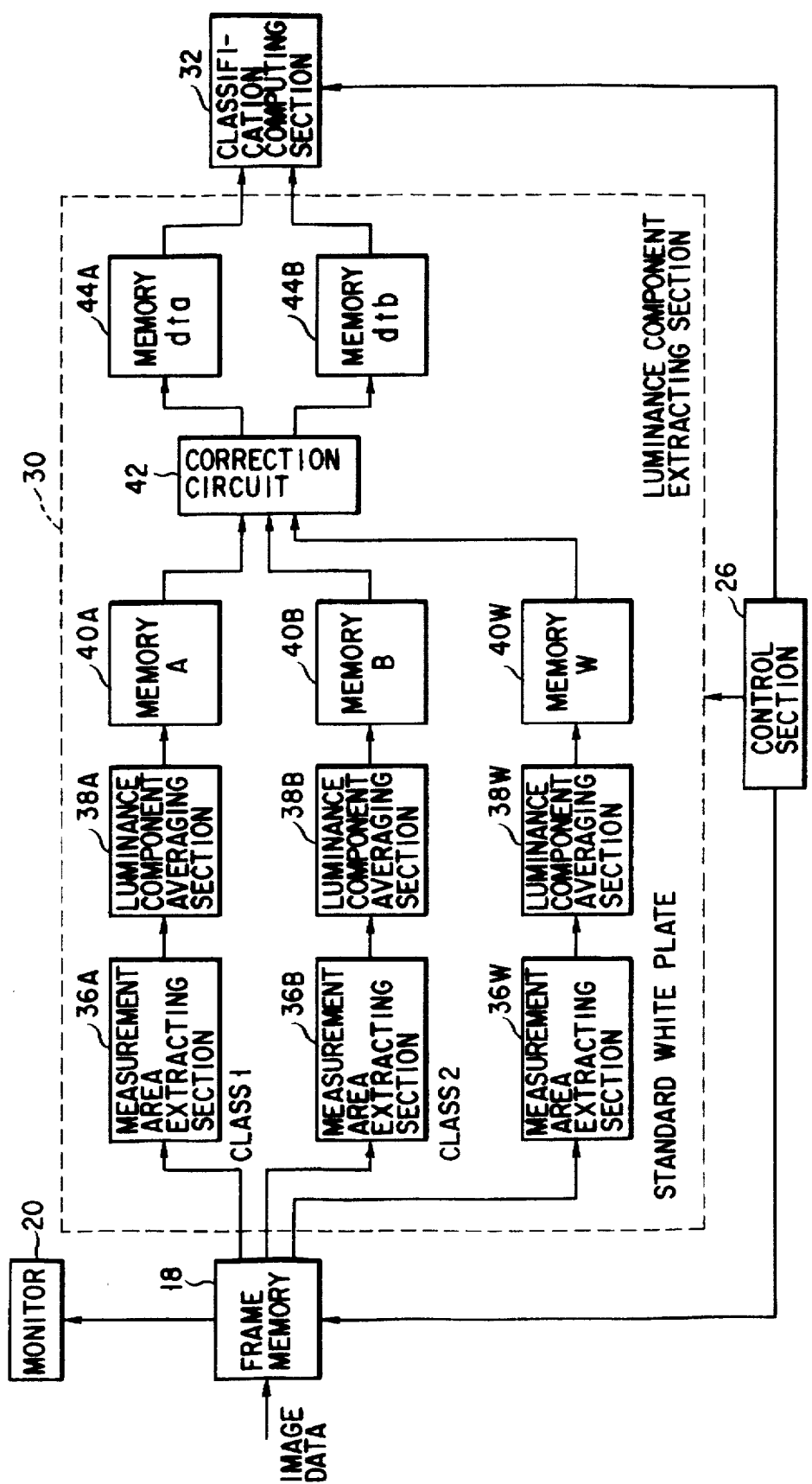
FIG. 30 shows the configuration of the luminance component extracting section of FIG. 29.
Figure 31A:
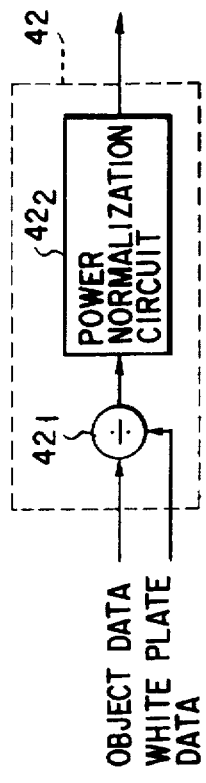
FIGS. 31A, 31B, and 31C show the configuration of the correction circuit, that of the classification computing section, and that of the classification judging section in FIG. 30.
Figure 31B:
Figure 31C:
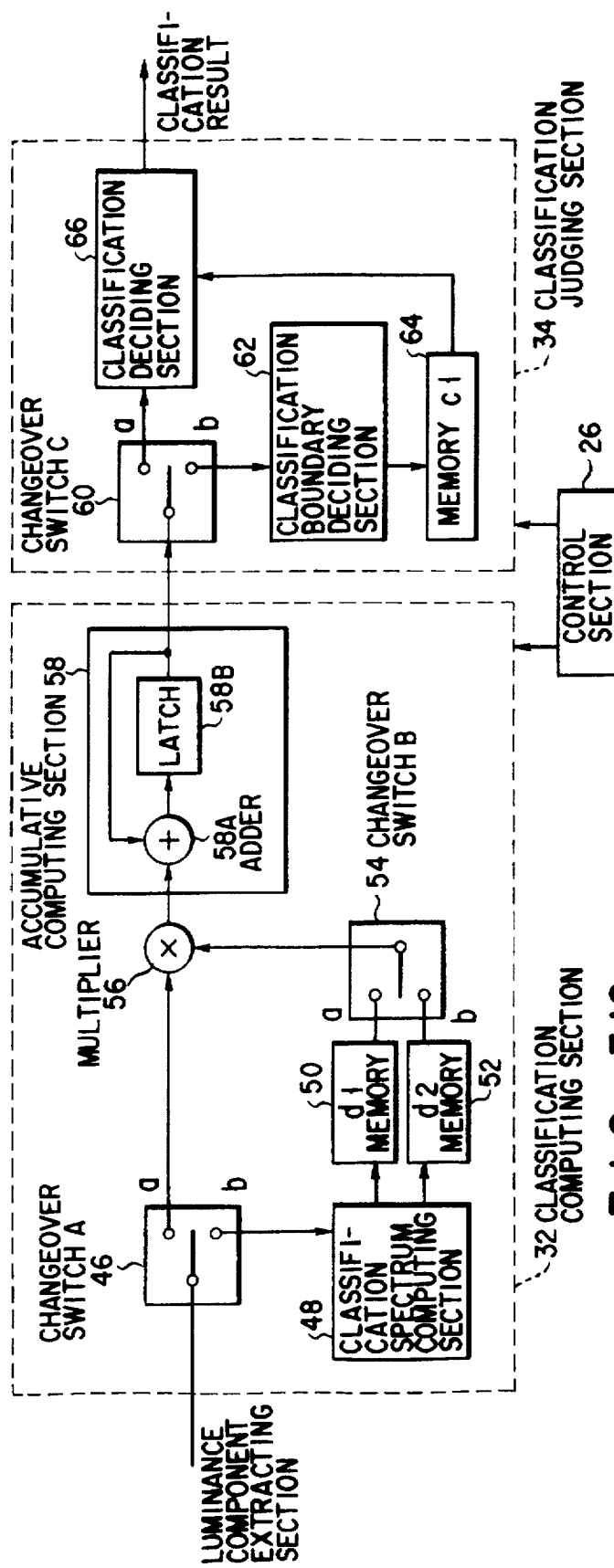
Figure 32:
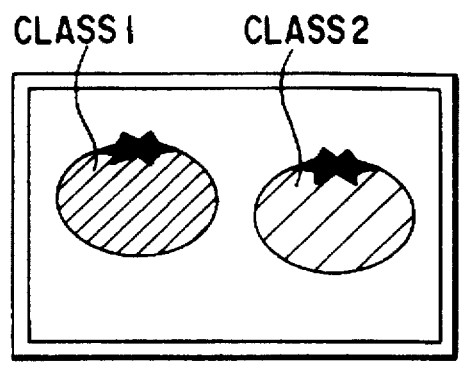
FIG. 32 illustrates objects of two classes.
Figure 33:
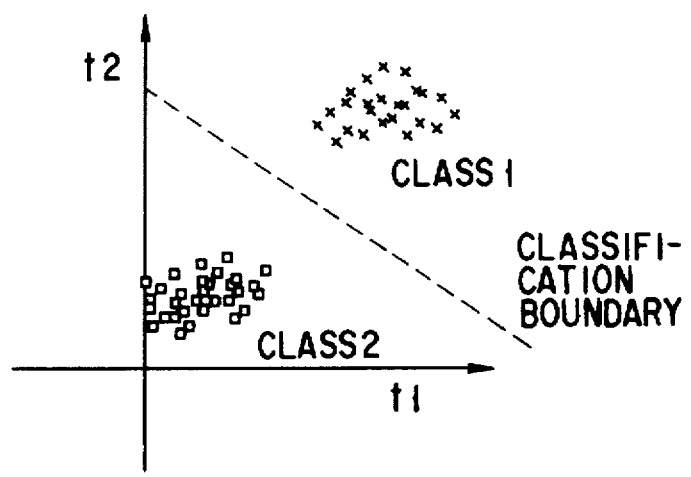
FIG. 33 is a diagram showing a classification boundary determined in the learning mode in the color classification system in the prior application.
Figure 34:
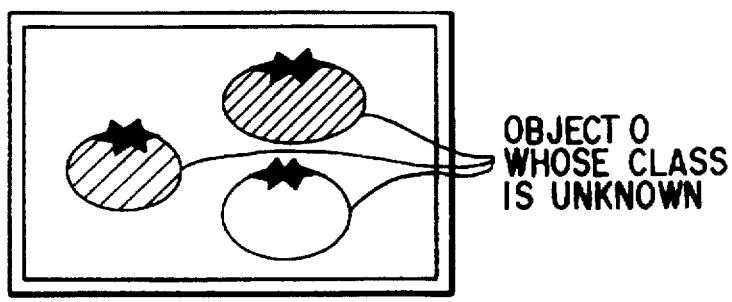
FIG. 34 illustrates objects of unknown classes to be classified.
Figure 35:
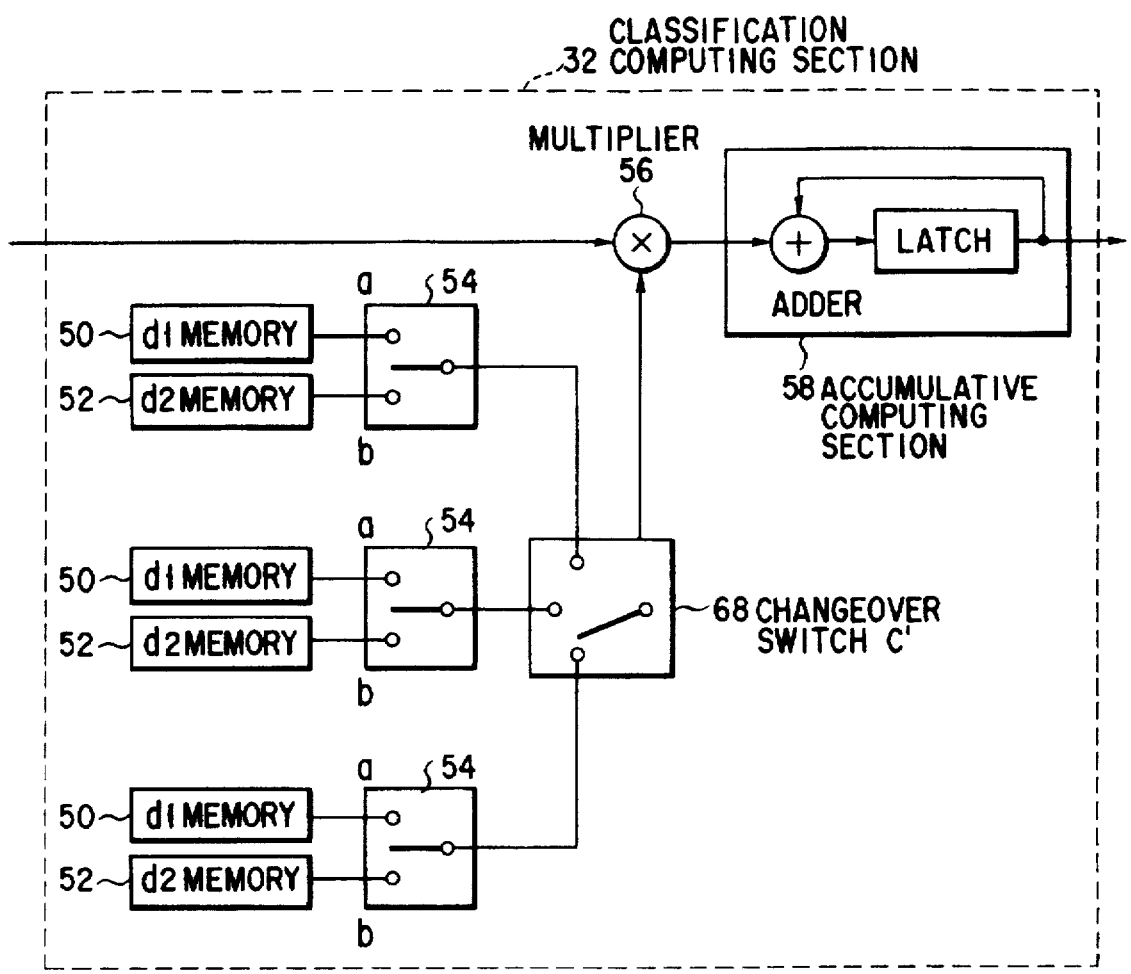
FIG. 35 shows another configuration of the classification computing section in the prior application.
Figure 36:
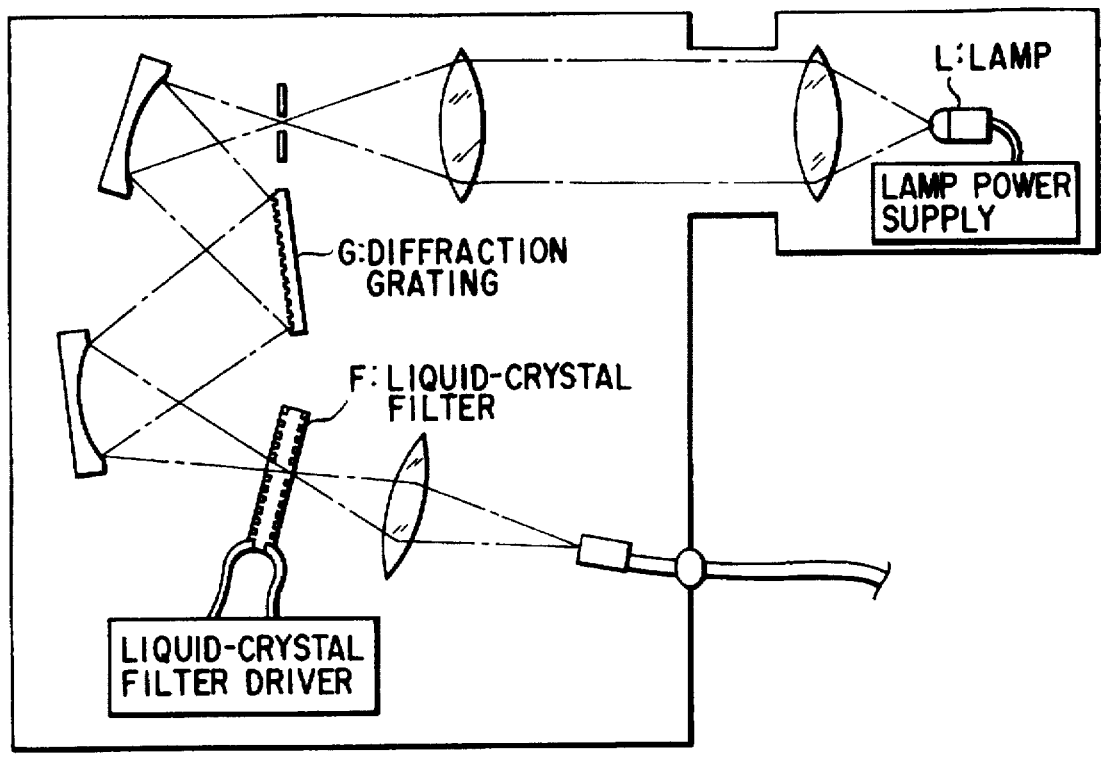
FIG. 36 shows the configuration of a filter having the classification spectrum characteristic in a conventional color judgment system.
Figure 37:
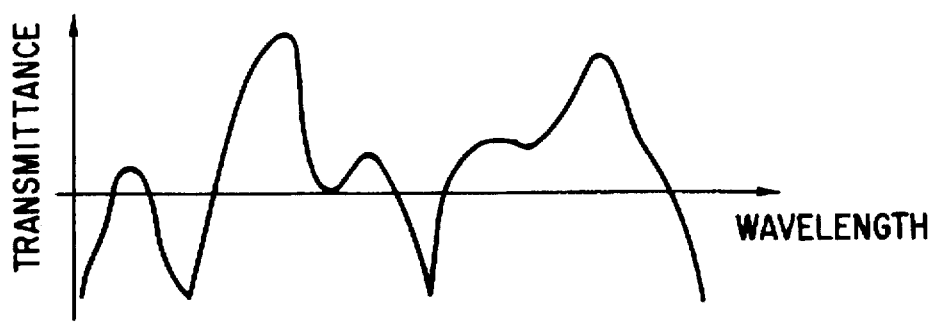
FIG. 37 is a diagram to help explain a classification spectrum.

The measurement flow in the sixth embodiment is shown in FIG. 24B, which conforms to FIG. 24A.

As described above, with the color classification system of the sixth embodiment, short-wavelength cut filters and long-wavelength cut filters are used as the optical filters provided on the rotational color filters 604 and 605. Use of band-pass filters that allow only a specific wavelength band to pass through or special band-pass filters that allow several specific wavelength bands to pass through makes it possible to realize more various spectral characteristics.

While in the sixth embodiment, the number of filters provided on each rotational color filter is 6, use of more filters on the rotational color filter achieves more various spectral characteristics.

It goes without saying that in the sixth embodiment, the decrease of the number of filters shortens the time required to image the object.

(A Seventh Embodiment)

Now, the configuration of a color classification system according to a seventh embodiment of the present invention will be explained by reference to FIG. 17.

The seventh embodiment is provided with a motor driving circuit 701, a motor 702, a rotational color filter 703, a motor driving circuit 705, a motor 706, and a rotational color filter 707, in place of the motor driving circuit 601, motor 602, rotational color filters 604, 605, and clamp 603.

The motors 702 and 706 are located on both sides of the imaging element 2 and rotate the rotational color filters 703 and 707, respectively.

The light passed through the optical system 1 passes through the rotational color filters 707 and 703 and forms an image on the imaging element 2.

The data on the formed image is processed in the same manner as in the above embodiments.

The rotational color filters 703 and 707 are almost the same as the rotational color filter 605 shown in FIG. 5B.

The rotational color filters 703 and 707 can be rotated independently by the motors 702 and 706, respectively.

By controlling the rotation angle of these motors, two filters of the rotational color filters can be combined arbitrarily, one filter from each rotational color filter.

As described in the sixth embodiment, short-wavelength cut filters, long-wavelength cut filters, and band-pass filters can be combined optimally as the optical filters provided on each rotational color filter.

The measurement flow in the seventh embodiment is the same as in the sixth embodiment as shown in FIG. 24A.

With the color classification system of the seventh embodiment, use of two motors enables the individual rotational color filters to be rotated independently, which achieves various spectral characteristics without recombining the rotational color filters, giving the system more flexibility.

Next, a modification of the case of using two motors will be explained by reference to FIGS. 18A and 18B.

Figure 18:
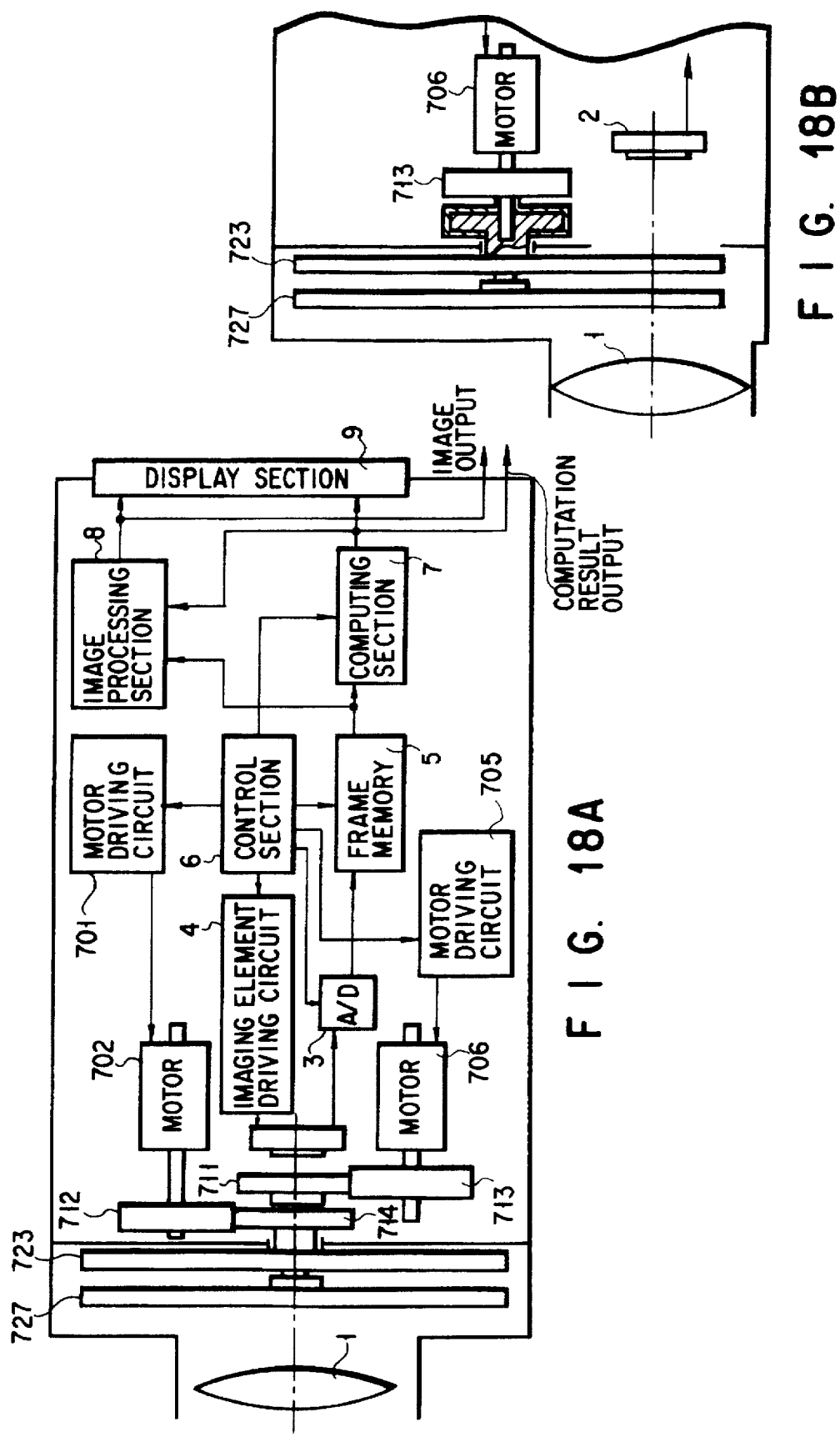
FIGS. 18A and 18B is a top view and a side view of the important portion of a modification of the color classification system of the seventh embodiment, respectively.

FIG. 18A is a top view of the system and FIG. 18B is a side view of the important portion of the system.

The modification is such that the motor 702 rotates the rotational color filter 723 via the gears 712, 714 and the motor 706 rotates the rotational color filter 727 via the gears 713, 711.

The rotational color filter 723 has a hollow shaft in its center and is provided on the housing so as not to prevent the filter from rotating. The hollow shaft is provided with a gear 714.

An axis of the rotational color filter 727 passes through the hollow shaft and is provided with a gear 711.

Specifically, the rotational color filters 727 and 723 are provided so as to share the same axis and can be rotated independently.

As described above, with the color classification system of the seventh embodiment, use of two motors enables the individual rotational color filters to be rotated independently, which achieves various spectral characteristics without recombining the rotational color filters, giving the system more flexibility. Although two rotational color filters are used, it is possible to make the system as compact as when a single rotational color filter is used.

(An Eighth Embodiment)

Now, the configuration of a color classification system according to an eighth embodiment of the present invention will be explained by reference to FIG. 19 and a flowchart shown in FIG. 25A.

The eighth embodiment is characterized by comprising: an optical path splitter prism 804 that splits the optical path of the imaging light from the optical system 1; solid-state imaging elements 2a, 2b, and 2c on which the rays of the imaging light split by the prism form images; rotational color filters 803a, 803b, and 803c that rotate between the solid-state imaging elements 2a, 2b, 2c and the optical path splitter prism 804, respectively; motors 802a, 802b, and 802c that rotate the rotational color filters 803a, 803b, 803c, respectively; motor driving circuits 801a, 801b, and 801c that drive the motors 802a, 802b, 802c, respectively; and A/D converters 3a, 3b, and 3c connected to the solid-state imaging elements 2a, 2b, 2c, respectively. After the outputs of the A/D converters 3a, 3b, 3c have been sent to the frame memory 5, they are processed as in the above embodiments (steps S21 to S29).

It is assumed that the optical path splitter prism 804 reflects 30% of the amount of light at the first reflecting surface and 50% of the amount of light at the second reflecting surface.

On the rotational color filters 803a, 803b, 803c, optical filters that each allow a different wavelength band to pass through are provided as on the rotational color filter 605 of the sixth embodiment.

Providing six optical filters on each rotational color filter achieves 18 spectral characteristics.

If an object can be measured using three optical filters, an image of the object can be entered through a single shot by setting each of the three optical filters on a different rotational color filter 803 and controlling the individual motors so as to position the three optical filters in front of the corresponding solid-state imaging elements 2.

As described above, with the color classification system of the eighth embodiment, use of plural solid-state imaging elements shortens the time required to enter images.

A dichroic prism such as is used in a three plate color camera may be used as the optical path splitter prism 804. In this case, after color separation into three colors, R, G, and B, has been performed, the light is allowed to pass through the rotational color filter 803.

In this case, if one of the six optical filters provided on each rotational color filter is transparent (or infrared ray cutoff) glass, the normal RGB color output can be obtained when the glass is set.

Figures 20B, 20C:
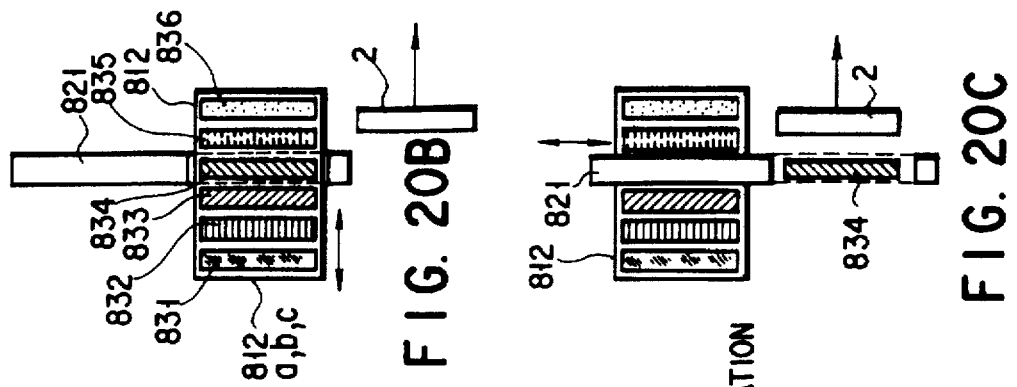
FIGS. 20A to 20C show the entire configuration of a modification of the eighth embodiment and filter magazine sections used in the modification, respectively.
Figure 20A:
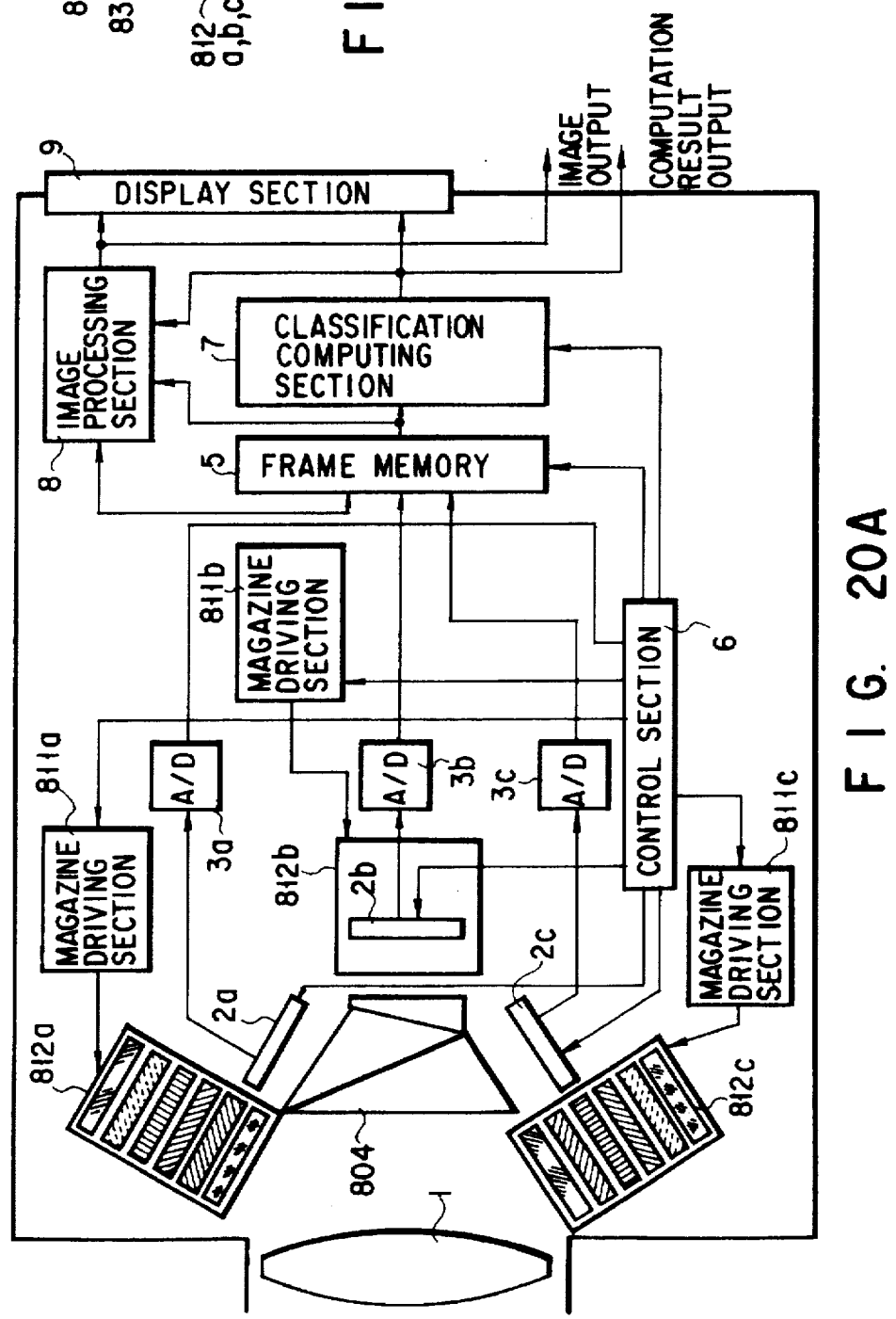

Referring to FIG. 20A, a modification of the eighth embodiment will be explained which uses a filter magazine 812 that houses optical filters 831 to 836 in place of the rotational color filters 803 in the eighth embodiment.

Specifically, the modification comprises filter magazines 812a, 812b, 812c and magazine driving sections 811a, 811b, 811c that drive these filter magazines.

Each filter magazine houses the optical filters 831, 832, . . . , 836 as shown in FIG. 20B is moved by an actuator (not shown) from right to left in the figure.

By stopping the filter magazine at a given position and moving up and down by an actuator (not shown) as shown in FIG. 20C, any filter can be inserted between the imaging element and the optical path splitter prism 804.

(A Ninth Embodiment)

Now, the configuration of a color classification system according to a ninth embodiment of the present invention will be explained by reference to FIGS. 21A and 21B and the flowcharts shown in FIG. 25B and 26A.

Like the eight embodiment, the ninth embodiment has three imaging elements. In this embodiment, a filter cartridge 902 is provided in a place where a dichroic prism would be located in an ordinary three plate color camera.

The ninth embodiment comprises a cartridge driving section 901 that drives the filter cartridge 902 and a filter control section 903 that controls a band variable optical filter 904 explained later.

FIG. 21B is a top view of the filter cartridge 902.

The filter cartridge 902 includes a dichroic prism 905 and the band variable optical filter 904 and is moved up and down by an actuator (not shown) (or moves in the normal direction to the paper surface in FIG. 21A).

During normal monitoring, the dichroic prism 905 is set and the RGB color signal is outputted.

When an object whose color difference is relatively large is subjected to color judgment or classification, measurement can be made by processing the RGB signal.

To increase the accuracy of classification or judgment, a signal is sent to the cartridge driving section 901 to set the cartridge to the band variable optical filter 904 side (in this case, the signals from the imaging elements 2a and 2c are invalid).

A signal is sent to the filter control section 903, which sets the pass band of the band variable optical filter 904 at a desired value. Thereafter, the object is imaged.

By changing the pass band characteristic sequentially in this way, the necessary spectrum data can be obtained.

The measurement flow in the ninth embodiment is processed as in the above embodiments according to the flowcharts of FIG. 25B and 26A (steps S31 to S40 and steps S51 to S59).

With the ninth embodiment, because natural color images can be obtained during monitoring or relatively easy color judgment, they do not give us a sense of incongruity. In addition, the system may be used as a RGB color camera.

(A Tenth Embodiment)

The configuration of a color classification system according to a tenth embodiment of the present invention is the same as that of the eighth embodiment except that a rotational color filter 1003 is provided between the optical path splitter prism 804 and the optical system 1 of the eighth embodiment and a motor 1001 that rotates the filter 1003 and a motor driving circuit 1002 that drives the motor 1001 are additionally provided.

The optical filters provided on the rotational filter 1003 are short-wavelength cut filters having the characteristics 631 to 635 shown in FIG. 16. Various long-wavelength cut filters are used as the rotational color filters 803, 803b, 803c.

The measurement flow in the tenth embodiment is processed as in the above embodiments according to the flowchart shown in FIG. 26B (steps S61 to S77).

As described above, with the color classification system of the tenth embodiment, by rotating the rotational color filters 1003, 803a, 803b, 803c independently and thereby controlling each of them to a specific rotation angle, images with various spectral characteristics can be obtained.

According to the present invention, the following configurations of a color classification system are obtained.

(1) A color classification system comprising: imaging means for imaging light from an object; optical means for forcing the light from the object to form an image on the imaging means; a plurality of optical band-pass filters provided between the object and the imaging means, each having a different pass band; changeover means for changing the plurality of optical band-pass filters; and computing means for performing classification or judgment from the spectral characteristic of the imaged object through a statistical approach, wherein the plurality of optical band-pass filters include a plurality of measurement filters for measuring the color of the object, and a test filter for judging which one of the plurality of measurement filters should be applied to the object, and the changeover means changes the measurement filters and selects an effective one on the basis of the result sensed the test filter.

This color classification system does not limit an object to be measured to only one and has a great deal of flexibility. Because it measures an object using the optimum filter, the accuracy of classification is improved.

(2) A color classification system according to item (1), wherein the plurality of optical band-pass filters include a plurality of filter sets each of which has one or more filters, and the changeover means includes filter changeover means for changing the optical band-pass filters in one of the filter sets, and filter-set changeover means for changing the plurality of filter sets.

This configuration makes it easy to change the filter set according to the change of the object.

(3) A color classification system according to item (2), wherein each of the filter sets includes a rotational color filter having optical band-pass filters arranged on a circumference, and the filter-set changeover means is a turret having a plurality of units of the rotational filter on a circumference.

This configuration enables the rotation angles of both of the turret and rotational color filters to be controlled, which allows them to share the control section, helping simplify the system.

(4) A color classification system according to item (3), wherein each of the rotational filters is a gear-like member having a mating teeth portion on its outer periphery with respect to a center of rotation.

With this configuration, even when the number of optical band-pass filters used differs, resulting in a rotational color filter with a different diameter, a rotation angle of the driving motor need not be changed in changing optical band-pass filters.

(5) A color classification system according to item (4), wherein the turret of the filter changeover means is a gear-like member having a mating teeth portion on its outer periphery with respect to a center of rotation.

This configuration enables the turret driving motor to also serve as the rotational color filter driving motor, making the system simpler.

(6) A color classification system according to item (2), wherein the plurality of filter sets include a rotational color filter having the optical band-pass filters in a filter set arranged on a circumference and the optical band-pass filters in another filter set arranged on another circumference sharing the same center with the preceding circumference, and the filter-set changeover means for changing the optical band-pass filters so that the distance between the central axis of the rotational color filter and the optical axis of the optical system may be changed.

With this configuration, only one rotational color filter is sufficient for filter sets differing in the number of filters, which helps simplify the system.

(7) A color classification system according to item (2), wherein each of the filter sets includes a rotational color filter having optical band-pass filters arranged on a circumference, and the filter-set changeover means includes rotational filter housing means for housing a plurality of units of the rotational color filter and allowing them to be got in and out of, rotational filter housing moving means for moving the rotational filter housing means, and rotational filter moving means for moving one of the plurality of filter sets from the filter set housing means to a specific position of the optical system.

With this configuration, because no turret is used, it is possible to make the system more compact.

(8) A color classification system according to item (1), wherein the changeover means includes housing means for housing the plurality of optical band-pass filters, first moving means for moving the housing means, and second moving means for moving one of the plurality of optical band-pass filters from the housing means to a specific position on the optical axis of the optical system.

With this configuration, the entire system can be made more compact. It is easy to increase the types of optical band-pass filters used. There is almost no limitation on the number of optical filters contained in the filter sets.

(9) A color classification system according to item (1), wherein the plurality of optical band-pass filters are realized by filter combining means for combining a plurality of optical filters each having a different band characteristic in such a manner that two or more of these optical filters are superposed one on top of another in the optical axis direction.

This configuration enables a small number of optical filters to achieve a large number of optical band-pass characteristics.

(10) A color classification system according to item (9), wherein the filter combining means controls the rotation angle of each of the plurality of rotational color filters independently.

This configuration makes it possible to change the combination of the optical filters provided on the plurality of rotational color filters so as to obtain the desired band characteristic.

(11) A color classification system according to item (1), wherein the optical system includes a prism that branches the light from the object in a plurality of directions, a plurality of units of the imaging element are used and arranged in positions where branched rays of light from the object form an image, one element for one position, and the changeover means includes a plurality of changeover means that change optical band-pass filters between the prism and the plurality of imaging elements.

This configuration enables the plurality of imaging elements to obtain information on different band characteristics simultaneously, which shortens the imaging time for measurement, enabling high-speed measurements.

(12) A color classification system according to item (1), wherein the optical system includes a dichroic prism that branches the light from the object in a plurality of directions according to wavelength, a plurality of units of the imaging element are used and arranged in positions where branched rays of light from the object form an image, one element for one position, the changeover means includes a plurality of changeover means that change optical band-pass filters between the dichroic prism and the plurality of imaging elements, and the filter combining means realizes an optical filter having a plurality of different band characteristics by combining the dichroic filter of the dichroic prism and the optical band-pass filters changed by the changeover means.

This configuration makes it possible to change the optical band-pass filters so as to output normal RGB color video signals.

(13) A color classification system according to item (1), wherein the optical system includes a dichroic prism that branches the light from the object in a plurality of directions according to wavelength, a plurality of units of the imaging element are used and arranged in positions where branched rays of light from the object form an image, one element for one position, the plurality of optical band-pass filters include the dichroic filter of the dichroic prism and a band variable optical filter whose pass band can be changed by an electric signal, and the changeover means includes a filter cartridge provided with the dichroic prism and the band variable optical filter and cartridge driving means for moving the filter cartridge to position either the dichroic prism or the band variable filter on the optical axis of the optical system.

This configuration enables high-speed measurement and high-accuracy measurement to be selected automatically according to the object.

Furthermore, the configuration enables the system to be used as an RGB camera.

(14) A color classification system according to item (1), wherein the optical system includes a prism that branches the light from the object in a plurality of directions, a plurality of units of the imaging element are used and arranged in positions where branched rays of light from the object form an image, one element for one position, the changeover means includes first changeover means that changes optical band-pass filters between the prism and the object and a plurality of second changeover means that change optical band-pass filters between the prism and the plurality of imaging elements, and the filter combining means realizes an optical filter having a plurality of different band characteristics by combining the optical band-pass filters changed by the first changeover means and the second changeover means.

With this configuration, use of a plurality of second changeover means enables more combinations of filters, achieving higher-accuracy measurements.

Furthermore, use of a plurality of imaging elements makes it possible to images a plurality of spectrums simultaneously, enabling high-speed measurements.

(15) A color classification system according to item (1), wherein the optical system includes a dichroic prism that branches the light from the object in a plurality of directions according to wavelength, a plurality of units of the imaging element are used and arranged in positions where branched rays of light from the object form an image, one element for one position, the changeover means includes first changeover means that changes optical band-pass filters between the dichroic prism and the object and a plurality of second changeover means that change optical band-pass filters between the prism and the plurality of imaging elements, and the filter combining means realizes an optical filter having a plurality of different band characteristics by combining the optical band-pass filters changed by the first changeover means and the dichroic filter of the dichroic prism and the optical band-pass filters changed by the second changeover means.

With this configuration, use of a plurality of second changeover means and a dichroic filter enables more filter combinations, achieving higher-accuracy measurements.

Furthermore, use of a plurality of imaging elements makes it possible not only to image a plurality of spectrums simultaneously, enabling high-speed measurements, but also to use the system as an RGB camera.

(16) A color classification method comprising:

the step of passing light from an object via an optical system through a plurality of optical band-pass filters each having a different pass band, while changing these filters, and thereby imaging the object; the step of performing classification or judgment from a spectral characteristic of the imaged object through a statistical approach; and the step of examining the spectral characteristic of the object beforehand and based on a result, selecting a specific optical band-pass filter from the plurality of optical band-pass filters and thereafter performing classification or judgment.

With this configuration, because the optimum filter can be selected for each of various objects beforehand and a measurement be made without limiting the objects to be measured for color classification, it is possible to improve the classification accuracy and achieve more flexibility.

As described above, with the present invention, it is possible to provide a color classification system and method which has a simple configuration, is manufactured at low cost, and is immune to mechanical vibration, and which do not limit a light source, enable good classification even when the spectrum varies, and have a great deal of flexibility, being applicable to various objects.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

What is claimed is:

1. A color classification system comprising:

an optical system for utilizing light from an object to form an image on an imaging device;

a plurality of optical band-pass filters each having a different pass band provided between the object and said imaging device; said plurality of optical band-pass filters including a plurality of measurement filters for use in measuring a color of the object and attest filter for use in judging which one of said plurality of measurement filters should be applied to the object;

a changeover section for changing between said plurality of optical band-pass filters;

a computing circuit for performing at least one of a color classification and a color judgment based on a spectral characteristic of the imaged object through a statistical approach; and a control section for causing said changeover section to select an effective one of said plurality of measurement filters based on a judgment by said computing circuit of a result sensed by said test filter, wherein said plurality of optical band-pass filters are arranged in a plurality of filter sets, each of said sets including at least one filter, and wherein said changeover section includes a filter changeover mechanism for changing between the optical band-pass filters in one of said filter sets, and a filter-set changeover mechanism for changing between said plurality of filter sets.

2. The color classification system according to claim 1, wherein each of said filter sets comprises a rotational color filter having circumferentially arranged optical band-pass filters, and wherein said filter-set changeover mechanism comprises a turret.

3. The color classification system according to claim 2, wherein each of said rotational filters comprises a gear-like member having a mating teeth portion on its outer periphery with respect to a center of rotation of each of said rotational filters.

4. The color classification system according to claim 3, wherein said turret comprises a gear-like member having a mating teeth portion on its outer periphery with respect to a center of rotation of said turret.

5. The color classification system according to claim 1, wherein said plurality of filter sets include a rotational color filter having a first set of optical band-pass filters arranged on a first circumference and a second set of optical band-pass filters arranged on second circumference sharing a same center with the first circumference, and wherein said filter-set changeover mechanism is capable of changing the optical band-pass filters such that a distance between a central axis of said rotational color filter and an optical axis of said optical system may be changed.

6. The color classification system according to claim 1, wherein each of said filter sets includes a rotational color filter having optical band-pass filters arranged on a circumference thereof, and wherein said filter-set changeover mechanism comprises a rotational filter housing for housing a plurality of units of said rotational color filter such that said units can be inserted into and removed therefrom, a rotational filter housing moving mechanism for moving said rotational filter housing, and a rotational filter moving mechanism for moving one of said plurality of filter sets from said filter set housing to a specific position within said optical system.

7. The color classification system according to claim 1, wherein said optical system includes a prism that branches the light from the object in a plurality of directions, wherein a plurality of units of said imaging element are arranged in positions where branched rays of light from the object form an image, one element for one position, and wherein said changeover section includes a plurality of changeover mechanisms for changing optical band-pass filters between said prism and said plurality of imaging elements.

8. The color classification system according to claim 1, wherein said optical system includes a dichroic prism that branches the light from the object in a plurality of directions according to wavelength, wherein a plurality of units of said imaging element are arranged in positions where branched rays of light from the object form an image, one element for one position, wherein said changeover section comprises a plurality of changeover mechanisms for changing optical band-pass filters between said dichroic prism and said plurality of imaging elements, and wherein a filter combining mechanism realizes an optical filter having a plurality of different band characteristics by combining a dichroic filter of said dichroic prism and the optical band-pass filters changed by said changeover section.

9. The color classification system according to claim 1, wherein said optical system includes a dichroic prism that branches the light from the object in a plurality of directions according to wavelength, wherein a plurality of units of said imaging element are arranged in positions where branched rays of light from the object form an image, one element for one position, wherein said plurality of optical band-pass filters include a dichroic filter of said dichroic prism and a band variable optical filter whose pass band can be changed by an electric signal, and wherein said changeover section includes a filter cartridge provided with said dichroic prism and said band variable optical filter, and a cartridge driving mechanism for is moving said filter cartridge to position one of said dichroic prism and said band variable filter based on an optical axis of said optical system.

10. The color classification system according to claim 1, wherein said optical system includes a prism that branches the light from the object in a plurality of directions, wherein a plurality of units of said imaging element are arranged in positions where branched rays of light from the object form an images one element for one position, wherein said changeover section includes a first changeover mechanism for changing optical band-pass filters between said prism and said object and a plurality of second changeover mechanisms for changing optical band-pass filters between said prism and said plurality of imaging elements, and wherein a filter combining mechanism realizes an optical filter having a plurality of different band characteristics by combining the optical band-pass filters changed by said first changeover mechanism and said second changeover mechanism.

11. The color classification system according to claim 1, wherein said optical system includes a dichroic prism that branches the light from the object in a plurality of directions according to wavelength, wherein a plurality of units of said imaging element are arranged in positions where branched rays of light from the object form an image, one element for one position, wherein said changeover section includes a first changeover mechanism for changing optical band-pass filters between said dichroic prism and said object and a plurality of second changeover mechanisms for changing optical band-pass filters between said prism and said plurality of imaging elements, and wherein a filter combining mechanism realizes an optical filter having a plurality of different band characteristics by combining the optical band-pass filters changed by said first changeover mechanism and a dichroic filter of said dichroic prism and the optical band-pass filters changed by said second changeover mechanism.

12. A color classification system comprising:

an optical system for utilizing light from an object to form an image on an imaging device;

a plurality of optical band-pass filters each having a different pass band provided between the object and said imaging device, said plurality of optical band-pass filters including a plurality of measurement filters for use in measuring a color of the object and a test filter for use in judging which one of said plurality of measurement filters should be applied to the object;

a changeover section for changing between said plurality of optical band-pass filters;

a computing circuit for performing at least one of a color classification and a color judgment based on a spectral characteristic of the imaged object through a statistical approach; and a control section for causing said changeover section to select an effective one of said plurality of measurement filters based on a judgment by said computing circuit of a result sensed by said test filter, wherein said plurality of optical band-pass filters are realized by a filter combining mechanism for combining a plurality of optical filters each having a different band characteristic in such a manner that two or more of the optical filters are superposed one on top of another in an optical axis direction.

13. The color classification system according to claim 12, wherein said filter combining mechanism independently controls a rotation angle of each of said plurality of rotational color filters.

14. The color classification system according to claim 12, wherein said optical system includes a prism that branches the light from the object in a plurality of directions, wherein a plurality of units of said imaging element are arranged in positions where branched rays of light from the object form an image, one element for one position, and wherein said changeover section includes a plurality of changeover mechanisms for changing optical band-pass filters between said prism and said plurality of imaging elements.

15. The color classification system according to claim 12, wherein said optical system includes a dichroic prism that branches the light from the object in a plurality of directions according to wavelength, wherein a plurality of units of said imaging element are arranged in positions where branched rays of light from the object form an image, one element for one position, wherein said changeover section comprises a plurality of changeover mechanisms for changing optical band-pass filters between said dichroic prism and said plurality of imaging elements, and wherein said filter combining mechanism realizes the plurality of optical filters each having different band characteristics by combining a dichroic filter of said dichroic prism and the optical band-pass filters changed by said changeover section.

16. The color classification system according to claim 12, wherein said optical system includes a dichroic prism that branches the light from the object in a plurality of directions according to wavelength, wherein a plurality of units of said imaging element are arranged in positions where branched rays of light from the object form an image, one element for one position, wherein said plurality of optical band-pass filters include a dichroic filter of said dichroic prism and a band variable optical filter whose pass band can be changed by an electric signal, and wherein said changeover section includes a filter cartridge provided with said dichroic prism and said band variable optical filter, and a cartridge driving mechanism for moving said filter cartridge to position one of said dichroic prism and said band variable filter based on an optical axis of said optical system.

17. The color classification system according to claim 12, wherein said optical system includes a prism that branches the light from the object in a plurality of directions, wherein a plurality of units of said imaging element are arranged in positions where branched rays of light from the object form an image, one element for one position, wherein said changeover section includes a first changeover mechanism for changing optical band-pass filters between said prism and said object and a plurality of second changeover mechanisms for changing optical band-pass filters between said prism and said plurality of imaging elements, and wherein said filter combining mechanism realizes the plurality of optical filters each having different band characteristics by combining the optical band-pass filters changed by said first changeover mechanism and said second changeover mechanism.

18. The color classification system according to claim 12, wherein said optical system includes a dichroic prism that branches the light from the object in a plurality of directions according to wavelength, wherein a plurality of units of said imaging element are arranged in positions where branched rays of light from the object form an image, one element for one position, wherein said changeover section includes a first changeover mechanism for changing optical band-pass filters between said dichroic prism and said object and a plurality of second changeover mechanisms for changing optical band-pass filters between said prism and said plurality of imaging elements, and wherein said filter combining mechanism realizes the plurality of optical filters each having different band characteristics by combining the optical band-pass filters changed by said first changeover mechanism and a dichroic filter of said dichroic prism and the optical band-pass filters changed by said second changeover mechanism.

19. A color classification method comprising the steps of:

preliminarily testing the spectral characteristic of an object by using a measurement filter, and then selecting at least two measurement filters from a plurality of measurement filter sets comprising at least one of a plurality of optical band-pass filters having different pass bands;

superposing the at least two selected measurement filter sets one on top of another in an optical axis direction, and passing light from the object therethrough while changing a combination of said optical band-pass filters; and performing at least one of a color classification and a color judgment of the object based on an optical characteristic of the imaged object.

\* \* \* \* \*